United States Patent
Kung et al.

(10) Patent No.: US 11,838,936 B2
(45) Date of Patent: Dec. 5, 2023

(54) METHOD AND APPARATUS FOR SIDELINK RESOURCE ALLOCATION MODE CONFIGURATION IN A WIRELESS COMMUNICATION SYSTEM

(71) Applicant: ASUSTek Computer Inc., Taipei (TW)

(72) Inventors: Yi-Hsuan Kung, Taipei (TW); Wei-Yu Chen, Taipei (TW); Li-Chih Tseng, Taipei (TW); Li-Te Pan, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 71 days.

(21) Appl. No.: 16/728,781

(22) Filed: Dec. 27, 2019

(65) Prior Publication Data
US 2020/0229198 A1    Jul. 16, 2020

Related U.S. Application Data

(60) Provisional application No. 62/795,753, filed on Jan. 23, 2019, provisional application No. 62/791,500, filed on Jan. 11, 2019.

(51) Int. Cl.
*H04W 72/00* (2023.01)
*H04W 72/54* (2023.01)

(52) U.S. Cl.
CPC ................. *H04W 72/54* (2023.01)

(58) Field of Classification Search
CPC .. H04W 72/04; H04W 72/0406; H04W 72/08
See application file for complete search history.

(56) References Cited

U.S. PATENT DOCUMENTS

2020/0107171 A1*  4/2020  Chen ...................... H04L 47/24
2021/0153065 A1*  5/2021  Adjakple .......... H04W 28/0263

FOREIGN PATENT DOCUMENTS

| CN | 106470384 | 3/2017 |
| EP | 3206452 A1 | 8/2017 |
| KR | 20160108383 | 9/2016 |
| KR | 20180080989 | 7/2018 |

OTHER PUBLICATIONS

Notice of Submission of Opinion from Korean Intellectual Property Office in corresponding KR Application No. 10-2019-0177157, dated Dec. 9, 2020.
Catt, "SLRB Configuration Procedure based on the QoS Framework", 3GPP TSG-RAN WG2 Meeting #105bis R2-1903174, Xi'an, China, Apr. 8-12, 2019.

* cited by examiner

Primary Examiner — Rhonda L Murphy
(74) Attorney, Agent, or Firm — Cooper Legal Group LLC

(57) ABSTRACT

A method and apparatus are disclosed from the perspective of a UE (User Equipment). In one embodiment, the method includes the UE receiving a first signaling containing mapping between resource allocation mode(s) and attribute(s) of sidelink data of the UE from a base station. The method further includes the UE performing a sidelink transmission of the sidelink data based on the mapping between the resource allocation mode(s) and the attribute(s) of the sidelink data.

15 Claims, 47 Drawing Sheets

| Destination index$_1$ | LCG ID$_1$ | Buffer Size$_1$ | Oct 1 |
| Buffer Size$_1$ | Destination index$_2$ | | Oct 2 |
| LCG ID$_2$ | Buffer Size$_2$ | | Oct 3 |
| ... | | | |
| Destination index$_{N-1}$ | LCG ID$_{N-1}$ | Buffer Size$_{N-1}$ | Oct 1.5*N-2 |
| Buffer Size$_{N-1}$ | Destination index$_N$ | | Oct 1.5*N-1 |
| LCG ID$_N$ | Buffer Size$_N$ | | Oct 1.5*N |

| Destination index₁ | LCG ID₁ | Buffer Size₁ | Oct 1 |
| Buffer Size₁ | Destination index₂ | | Oct 2 |
| LCG ID₂ | Buffer Size₂ | | Oct 3 |
| ... | | | |
| Destination index_N | LCG ID_N | Buffer Size_N | Oct 1.5*N-0.5 |
| Buffer Size_N | R R R R | | Oct 1.5*N+0.5 |

FIG. 7 (PRIOR ART)

R/R/E/LCID sub-header

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming, V2X messages Electricity distribution – medium voltage, Process automation - monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13) | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| ... | | | | | | | |

FIG. 13A (PRIOR ART)

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| ... | | | | | | | |
| 5 | Non-GBR (NOTE 1) | 10 | 100 ms NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g., www, e-mail, chat, ftp, p2p file sharing, progressive video, etc.) |
| 9 | | 90 | | | | | |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| ... | | | | | | | |

FIG. 13B (PRIOR ART)

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| ... | | | | | | | |
| 70 (NOTE 12) | | 55 | 200 ms (NOTE 7, NOTE 10) | $10^{-6}$ | N/A | N/A | Mission Critical Data (e.g. example services are the same as 5QI 6/8/9) |
| 79 | | 65 | 50 ms (NOTE 10, NOTE 13) | $10^{-2}$ | N/A | N/A | V2X messages |
| 80 | | 68 | 10 ms (NOTE 5, NOTE 10) | $10^{-6}$ | N/A | N/A | Low Latency eMBB applications Augmented Reality |
| 82 | Delay Critical GBR | 19 | 10 ms (NOTE 4) | $10^{-4}$ | 255 bytes | 2000 ms | Discrete Automation (see TS 22.261 [2]) |
| 83 | | 22 | 10 ms (NOTE 4) | $10^{-4}$ | 1354 bytes (NOTE 3) | 2000 ms | Discrete Automation (see TS 22.261 [2]) |
| 84 | | 24 | 30 ms (NOTE 6) | $10^{-5}$ | 1354 bytes (NOTE 3) | 2000 ms | Intelligent transport systems (see TS 22.261 [2]) |
| 85 | | 21 | 5 ms (NOTE 5) | $10^{-5}$ | 255 bytes | 2000 ms | Electricity Distribution-high voltage (see TS 22.261 [2]) |
| ... | | | | | | | |

FIG. 13C (PRIOR ART)

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| ... | | | | | | | |

NOTE 1:     A packet which is delayed more than PDB is not counted as lost, thus not included in the PER.
NOTE 2:     It is required that default MDBV is supported by a PLMN supporting the related 5QIs.
NOTE 3:     This MDBV value is set to 1354 bytes to avoid IP fragmentation for the IPv6 based, IPSec protected GTP tunnel to the 5G-AN node (the value is calculated as in Annex C of TS 23.060 [56] and further reduced by 4 bytes to allow for the usage of a GTP-U extension header).
NOTE 4:     A delay of 1 ms for the delay between a UPF terminating N6 and a 5G-AN should be subtracted from a given PDB to derive the packet delay budget that applies to the radio interface.
NOTE 5:     A delay of 2 ms for the delay between a UPF terminating N6 and a 5G-AN should be subtracted from a given PDB to derive the packet delay budget that applies to the radio interface.
NOTE 6:     A delay of 5 ms for the delay between a UPF terminating N6 and a 5G-AN should be subtracted from a given PDB to derive the packet delay budget that applies to the radio interface.
NOTE 7:     For Mission Critical services, it may be assumed that the UPF terminating N6 is located "close" to the 5G_AN (roughly 10 ms) and is not normally used in a long distance, home routed roaming situation. Hence delay of 10 ms for the delay between a UPF terminating N6 and a 5G_AN should be subtracted from this PDB to derive the packet delay budget that applies to the radio interface.
NOTE 8:     In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
NOTE 9:     It is expected that 5QI-65 and 5QI-69 are used together to provide Mission Critical Push to Talk service (e.g., 5QI-5 is not used for signalling). It is expected that the amount of traffic per UE will be similar or less compared to the IMS signalling.

FIG. 13D (PRIOR ART)

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| ... | | | | | | | |

| |
|---|
| ... |
| NOTE 10: In both RRC Idle and RRC Connected mode, the PDB requirement for these 5QIs can be relaxed for the first packet(s) in a downlink data or signalling burst in order to permit battery saving (DRX) techniques. |
| NOTE 11: In RRC Idle mode, the PDB requirement for these 5QIs can be relaxed for the first packet(s) in a downlink data or signalling burst in order to permit battery saving (DRX) techniques. |
| NOTE 12: This 5QI value can only be assigned upon request from the network side. The UE and any application running on the UE is not allowed to request this 5QI value. |
| NOTE 13: A delay of 20 ms for the delay between a UPF terminating N6 and a 5G-AN should be subtracted from a given PDB to derive the packet delay budget that applies to the radio interface. |
| NOTE 14: This 5QI is not supported as it is only used for transmission of V2X messages over MBMS bearers as defined in TS 23.285 [72]. |

FIG. 13E (PRIOR ART)

| 0 | 0 | 0 | 0 | 0 | 1 | 0 | 1 | Destination index bitmap |
|---|---|---|---|---|---|---|---|---|

| Destination index$_1$ | | | LCG ID$_1$ | | Buffer Size$_1$ | | |
|---|---|---|---|---|---|---|---|
| Buffer Size$_1$ | | | | Destination index$_3$ | | | |
| LCG ID$_2$ | Buffer Size$_2$ | | | | | | |

FIG. 35

METHOD AND APPARATUS FOR SIDELINK RESOURCE ALLOCATION MODE CONFIGURATION IN A WIRELESS COMMUNICATION SYSTEM

CROSS-REFERENCE TO RELATED APPLICATIONS

The present Application claims the benefit of U.S. Provisional Patent Application Ser. No. 62/791,500 filed on Jan. 11, 2019, and U.S. Provisional Patent Application Ser. No. 62/795,753 filed on Jan. 23, 2019, the entire disclosures of which are incorporated herein in its entirety by reference.

FIELD

This disclosure generally relates to wireless communication networks, and more particularly, to a method and apparatus for sidelink resource allocation mode configuration in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE receiving a first signaling containing mapping between resource allocation mode(s) and attribute(s) of sidelink data of the UE from a base station. The method further includes the UE performing a sidelink transmission of the sidelink data based on the mapping between the resource allocation mode(s) and the attribute(s) of the sidelink data.

BRIEF DESCRIPTION OF THE DRAWINGS

FIG. 7 is a reproduction of FIG. 6.1.3.1a-2 of 3GPP TS 36.321 V15.3.0.

FIGS. 13A-13E are a reproduction of Table 5.7.4-1 of 3GPP TS 36.321 V15.3.0.

FIG. 35 is a diagram according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: RAN2 #104 Chairman's Note; TS 24.386 V15.1.0, "User Equipment (UE) to V2X control function; protocol aspects"; TS 36.321 V15.3.0, "Evolved Universal Terrestrial Radio Access (E-UTRA); Medium Access Control (MAC) protocol specification"; TS 23.501 V15.4.0, "System Architecture for the 5G System"; TR 23.786 V1.0.0, "Study on architecture enhancements for EPS and 5G System to support advanced V2X services"; 3GPP RAN1#94 chairman's note; 3GPP RAN2 email discussion [103bis #36]; and TS 36.331 V15.3.0, "Evolved Universal Terrestrial Radio Access (E-UTRA); Radio Resource Control (RRC); Protocol specification". The standards and documents listed above are hereby expressly incorporated by reference in their entirety.

Figure 1:
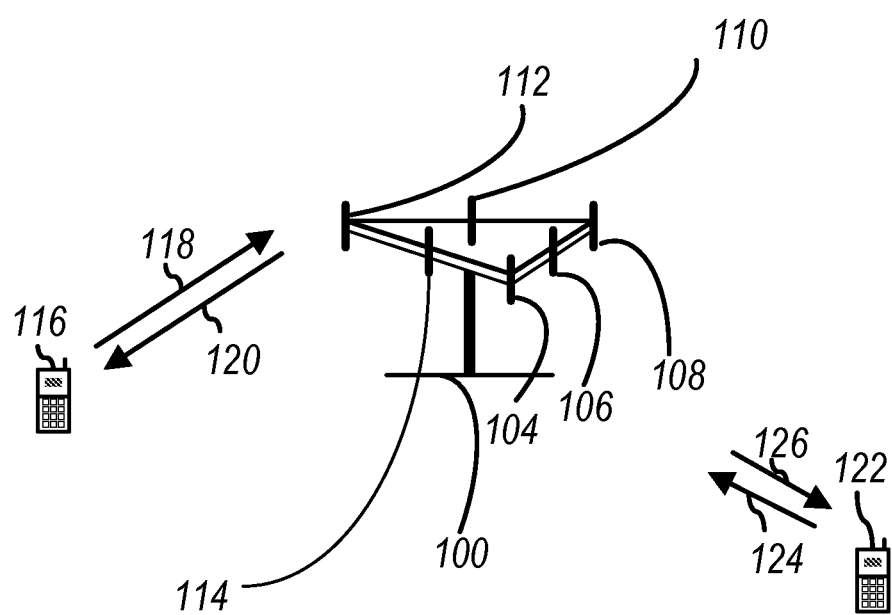
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
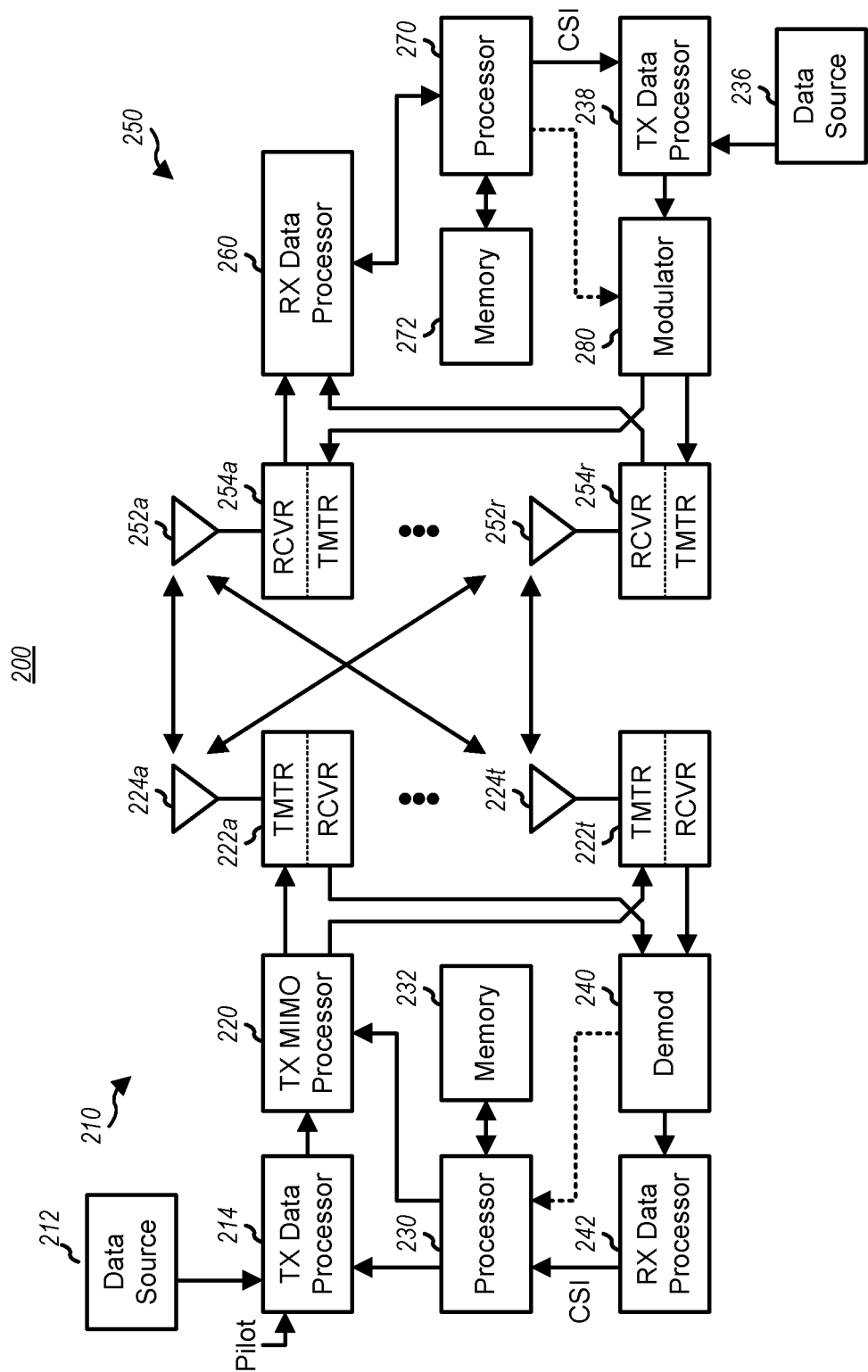
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
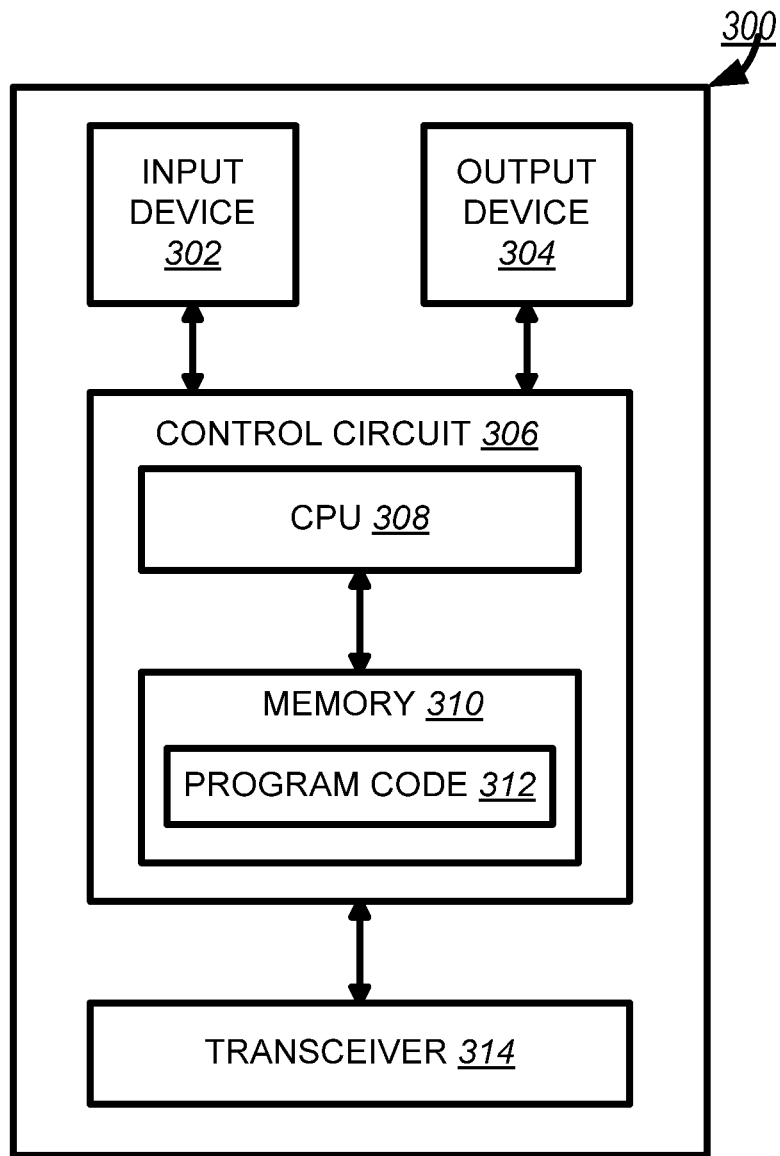
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
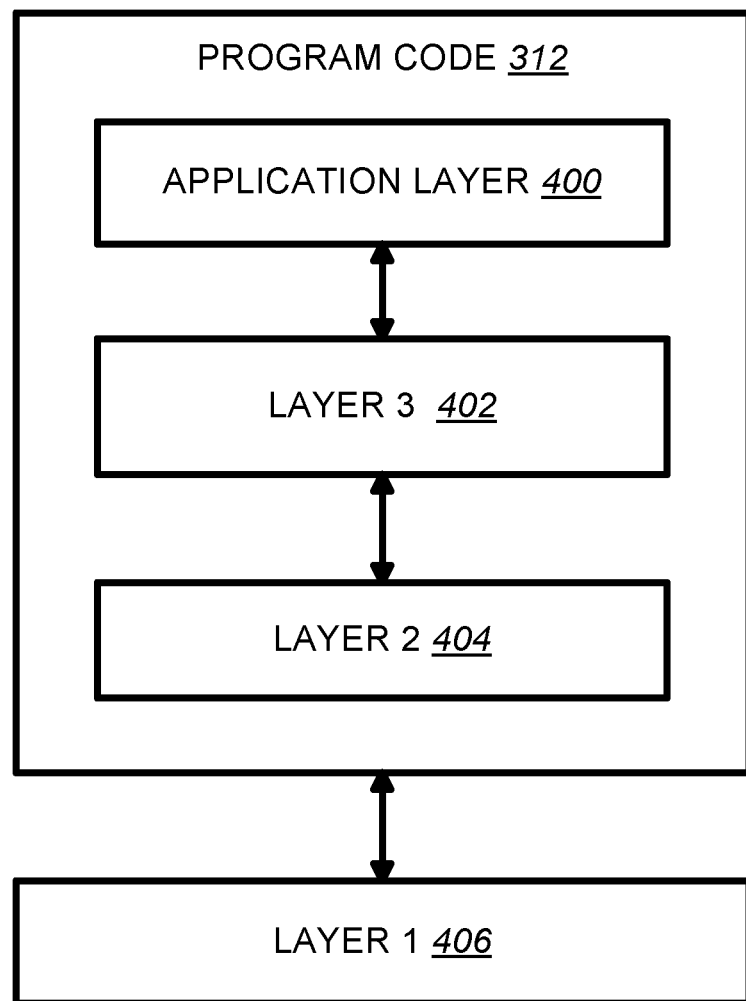
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In LTE TS 24.386 V15.1.0, configuration parameters and transmission behaviors related to destination layer-2 ID, and source layer-2 ID are discussed as follows:

5.2.4 Configuration Parameters for V2X Communication Over PC5

The configuration parameters for V2X communication over PC5 consist of:
a) an expiration time for the validity of the configuration parameters for V2X communication over PC5;
b) a list of PLMNs in which the UE is authorized to use V2X communication over PC5 when the UE is served by E-UTRAN for V2X communication;
c) an indication of whether the UE is authorized to use V2X communication over PC5 when the UE is not served by E-UTRAN for V2X communication;
d) per geographical area:
   1) radio parameters for V2X communication over PC5 applicable when the UE is not served by E-UTRAN for V2X communication and is located in the geographical area, with an indication of whether these radio parameters are "operator managed" or "non-operator managed";
e) a list of the V2X services authorized for V2X communication over PC5. Each entry of the list contains:
   1) a V2X service identifier; and
   2) a destination Layer-2 ID;
f) PPPP to PDB mapping rules between the ProSe Per-Packet Priority (PPPP) and the Packet Delay Budget (PDB) for V2X communication over PC5;
g) optionally, a default destination Layer-2 ID;
h) optionally, a configuration for the applicability of privacy for V2X communication over PC5, containing:
   1) a T5000 timer indicating how often the UE shall change the source Layer-2 ID and source IP address (for IP data) self-assigned by the UE for V2X communication over PC5; and
   2) a list of the V2X services which require privacy for V2X communication over PC5. Each entry in the list contains:
      A) a V2X service identifier; and
      B) optionally, one or more associated geographical areas;
i) optionally, V2X service identifier to V2X frequency mapping rules between the V2X service identifiers and the V2X frequencies with associated geographical areas for V2X communication over PC5; and
j) optionally, a list of the V2X services authorized for ProSe Per-Packet Reliability (PPPR). Each entry of the list contains a V2X service identifier and a ProSe Per-Packet Reliability (PPPR) value; and
k) optionally, V2X service identifier to Tx Profile mapping rules between the V2X service identifiers and the Tx Profile for V2X communication over PC5.

[ . . . ]

6.1.2.2 Transmission

The UE shall include the V2X message in a protocol data unit and pass it to the lower layers for transmission along with the following parameters:
a) a Layer-3 protocol data unit type (see 3GPP TS 36.323 [8]) set to:
   1) IP packet, if the V2X message contains IP data; or
   2) non-IP packet, if the V2X message contains non-IP data;
b) the source Layer-2 ID set to the Layer-2 ID self-assigned by the UE for V2X communication over PC5;

c) the destination Layer-2 ID set to:
   1) the destination Layer-2 ID associated with the V2X service identifier of the V2X service in this list of V2X services authorized for V2X communication over PC5 as specified in subclause 5.2.4, if the V2X service identifier of the V2X service is included in the list of V2X services authorized for V2X communication over PC5 as specified in subclause 5.2.4; or
   2) the default destination Layer-2 ID configured to the UE for V2X communication over PC5 as specified in subclause 5.2.4, if the V2X service identifier of the V2X service is not included in the list of V2X services authorized for V2X communication over PC5 and the UE is configured with a default destination Layer-2 ID for V2X communication over PC5;
d) if the V2X message contains non-IP data, an indication to set the non-IP type field of the non-IP type PDU to the value corresponding to the V2X message family (see subclause 7.1) used by the V2X service as indicated by upper layers;
e) if the V2X message contains IP data, the source IP address set to the source IP address self-assigned by the UE for V2X communication over PC5;
f) the ProSe Per-Packet Priority set to the value corresponding to the V2X message priority received from upper layers. The mapping of V2X message priority to ProSe Per-Packet Priority is configured on the UE and is out of the scope of this specification;
g) if the UE is configured with PDB (Packet Delay Budget)-to-ProSe Per-Packet Priority mapping rules for V2X communication over PC5 as specified in subclause 5.2.4, the PDB associated with the ProSe Per-Packet Priority as specified in subclause 5.2.4;
h) if:
   1) a ProSe Per-Packet Reliability (PPPR) value is received from the upper layers; and
   2) one of the following conditions is met:
      A) the list of the V2X services authorized for ProSe Per-Packet Reliability (PPPR) is not configured; or
      B) the V2X service identifier of the V2X service for the V2X message and the received ProSe Per-Packet Reliability (PPPR) value are included in an entry of the list of the V2X services authorized for ProSe Per-Packet Reliability (PPPR);
   then the ProSe Per-Packet Reliability (PPPR) value; and
i) if the UE is configured with V2X service identifier to Tx Profile mapping rules for V2X communication over PC5 as specified in subclause 5.2.4, the Tx Profile associated with the V2X service identifier as specified in subclause 5.2.4.

Figures 5, 6:
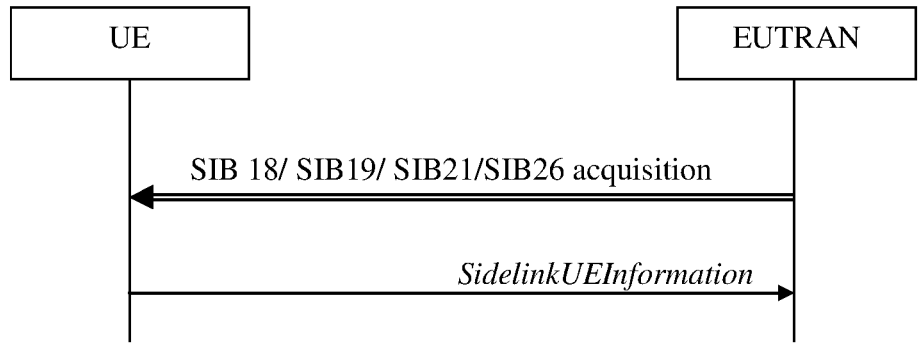
FIG. 5 is a reproduction of FIG. 5.10.2-1 of 3GPP Ts 36.331 V15.3.0.
FIG. 6 is a reproduction of FIG. 6.1.3.1a-1 of 3GPP TS 36.321 V15.3.0.

LTE specification TS 36.331 introduces UE Sidelink Information as follows:

5.10.2 Sidelink UE Information
5.10.2.1 General
[FIG. 5.10.2-1 of 3GPP TS 36.331 V15.3.0, Entitled "Sidelink UE Information", is Reproduced as FIG. 5]
The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

5.10.2.3 Actions Related to Transmission of SidelinkUEInformation Message

The UE shall set the contents of the SidelinkUEInformation message as follows:

1> if the UE initiates the procedure to indicate it is (no more) interested to receive sidelink communication or discovery or receive V2X sidelink communication or to request (configuration/release) of sidelink communication or V2X sidelink communication or sidelink discovery transmission resources (i.e. UE includes all concerned information, irrespective of what triggered the procedure):

2> if SystemInformationBlockType18 is broadcast by the PCell:

3> if configured by upper layers to receive sidelink communication:

4> include commRxInterestedFreq and set it to the sidelink communication frequency;

3> if configured by upper layers to transmit non-relay related one-to-many sidelink communication:

4> include commTxResourceReq and set its fields as follows:

5> set carrierFreq to indicate the sidelink communication frequency i.e. the same value as indicated in commRxInterestedFreq if included;

5> set destinationinfoList to include the non-relay related one-to-many sidelink communication transmission destination(s) for which it requests E-UTRAN to assign dedicated resources;

3> if configured by upper layers to transmit non-relay related one-to-one sidelink communication; and 3> if commTxResourceUC-ReqAllowed is included in SystemInformationBlockType18:

4> include commTxResourceReqUC and set its fields as follows:

5> set carrierFreq to indicate the one-to-one sidelink communication frequency i.e. the same value as indicated in commRxInterestedFreq if included;

5> set destinationinfoList to include the non-relay related one-to-one sidelink communication transmission destination(s) for which it requests E-UTRAN to assign dedicated resources;

2> if SystemInformationBlockType21 is broadcast by the PCell and SystemInformationBlockType21 includes sl-V2X-ConfigCommon:

3> if configured by upper layers to receive V2X sidelink communication:

4> include v2x-CommRxInterestedFreqList and set it to the frequency(ies) for V2X sidelink communication reception;

3> if configured by upper layers to transmit V2X sidelink communication:
    4> if configured by upper layers to transmit P2X related V2X sidelink communication:
        5> include p2x-CommTxType set to true;
    4> include v2x-CommTxResourceReq and set its fields as follows for each frequency on which the UE is configured for V2X sidelink communication transmission:
        5> set carrierFreqCommTx to indicate the frequency for V2X sidelink communication transmission;
        5> set v2x-TypeTxSync to the current synchronization reference type used on the associated carrierFreqCommTx for V2X sidelink communication transmission;
        5> set v2x-DestinationInfoList to include the V2X sidelink communication transmission destination(s) for which it requests E-UTRAN to assign dedicated resources;
[ . . . ]
The UE shall submit the SidelinkUEInformation message to lower layers for transmission.

Sidelink resource allocation and utilization mechanisms are described in the current MAC specification TS 36.321 V15.3.0 as follows:
5.14 SL-SCH Data Transfer
5.14.1 SL-SCH Data Transmission
5.14.1.1 SL Grant Reception and SCI Transmission
In order to transmit on the SL-SCH the MAC entity must have at least one sidelink grant.
[ . . . ]
Sidelink grants are selected as follows for V2X sidelink communication:
    if the MAC entity is configured to receive a sidelink grant dynamically on the PDCCH and data is available in STCH, the MAC entity shall:
        use the received sidelink grant to determine the number of HARQ retransmissions and the set of subframes in which transmission of SCI and SL-SCH occur according to subclause 14.2.1 and 14.1.1.4A of [2];
        consider the received sidelink grant to be a configured sidelink grant;
    if the MAC entity is configured by upper layers to receive a sidelink grant on the PDCCH addressed to SL Semi-Persistent Scheduling V-RNTI, the MAC entity shall for each SL SPS configuration:
        if PDCCH contents indicate SPS activation:
            use the received sidelink grant to determine the number of HARQ retransmissions and the set of subframes in which transmission of SCI and SL-SCH occur according to subclause 14.2.1 and 14.1.1.4A of [2];
            consider the received sidelink grant to be a configured sidelink grant;
        if PDCCH contents indicate SPS release:
            clear the corresponding configured sidelink grant;
    if the MAC entity is configured by upper layers to transmit using pool(s) of resources in one or multiple carriers as indicated in subclause 5.10.13.1 of [8] based on sensing, or partial sensing, or random selection only if upper layers indicates that transmissions of multiple MAC PDUs are allowed according to subclause 5.10.13.1a of [8], and the MAC entity selects to create a configured sidelink grant corresponding to transmissions of multiple MAC PDUs, and data is available in STCH associated with one or multiple carriers, the MAC entity shall for each Sidelink process configured for multiple transmissions on a selected carrier according to subclause 5.14.1.5:
    if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or
    if neither transmission nor retransmission has been performed by the MAC entity on any resource indicated in the configured sidelink grant during the last second; or
    if sl-ReselectAfter is configured and the number of consecutive unused transmission opportunities on resources indicated in the configured sidelink grant is equal to sl-ReselectAfter; or
    if there is no configured sidelink grant; or
    if the configured sidelink grant cannot accommodate a RLC SDU by using the maximum allowed MCS configured by upper layers in maxMCS-PSSCH and the MAC entity selects not to segment the RLC SDU; or
        NOTE: If the configured sidelink grant cannot accommodate the RLC SDU, it is left for UE implementation whether to perform segmentation or sidelink resource reselection.
    if transmission(s) with the configured sidelink grant cannot fulfil the latency requirement of the data in a sidelink logical channel according to the associated PPPP, and the MAC entity selects not to perform transmission(s) corresponding to a single MAC PDU; or
        NOTE: If the latency requirement is not met, it is left for UE implementation whether to perform transmission(s) corresponding to single MAC PDU or sidelink resource reselection.
    if a pool of resources is configured or reconfigured by upper layers for the selected carrier:
    clear the configured sidelink grant, if available;
    trigger the TX carrier (re-)selection procedure as specified in sub-clause 5.14.1.5;
    if the carrier is (re-)selected in the Tx carrier (re-) selection according to sub-clause 5.14.1.5, the following is performed on the selected carrier:
    select one of the allowed values configured by upper layers in restrictResourceReservationPeriod and set the resource reservation interval by multiplying 100 with the selected value;
        NOTE: How the UE selects this value is up to UE implementation.
    randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
    select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

if transmission based on random selection is configured by upper layers:

randomly select the time and frequency resources for one transmission opportunity from the resource pool, according to the amount of selected frequency resources. The random function shall be such that each of the allowed selections can be chosen with equal probability;

else:

randomly select the time and frequency resources for one transmission opportunity from the resources indicated by the physical layer according to subclause 14.1.1.6 of [2], according to the amount of selected frequency resources. The random function shall be such that each of the allowed selections can be chosen with equal probability;

use the randomly selected resource to select a set of periodic resources spaced by the resource reservation interval for transmission opportunities of SCI and SL-SCH corresponding to the number of transmission opportunities of MAC PDUs determined in subclause 14.1.1.4B of [2];

if the number of HARQ retransmissions is equal to 1 and there are available resources left in the resources indicated by the physical layer that meet the conditions in subclause 14.1.1.7 of [2] for more transmission opportunities:

randomly select the time and frequency resources for one transmission opportunity from the available resources, according to the amount of selected frequency resources. The random function shall be such that each of the allowed selections can be chosen with equal probability;

use the randomly selected resource to select a set of periodic resources spaced by the resource reservation interval for the other transmission opportunities of SCI and SL-SCH corresponding to the number of retransmission opportunities of the MAC PDUs determined in subclause 14.1.1.4B of [2];

consider the first set of transmission opportunities as the new transmission opportunities and the other set of transmission opportunities as the retransmission opportunities;

consider the set of new transmission opportunities and retransmission opportunities as the selected sidelink grant.

else:

consider the set as the selected sidelink grant;

use the selected sidelink grant to determine the set of subframes in which transmissions of SCI and SL-SCH occur according to subclause 14.2.1 and 14.1.1.4B of [2];

consider the selected sidelink grant to be a configured sidelink grant;

else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

clear the configured sidelink grant, if available;

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

use the previously selected sidelink grant for the number of transmissions of the MAC PDUs determined in subclause 14.1.1.4E3 of [2] with the resource reservation interval to determine the set of subframes in which transmissions of SCI and SL-SCH occur according to subclause 14.2.1 and 14.1.1.4E3 of [2];

consider the selected sidelink grant to be a configured sidelink grant;

else, if the MAC entity is configured by upper layers to transmit using pool(s) of resources in one or multiple carriers as indicated in subclause 5.10.13.1 of [8], the MAC entity selects to create a configured sidelink grant corresponding to transmission(s) of a single MAC PDU, and data is available in STCH associated with one or multiple carriers, the MAC entity shall for a Sidelink process on a selected carrier according to subclause 5.14.1.5:

trigger the TX carrier (re-)selection procedure as specified in sub-clause 5.14.1.5;

if the carrier is (re-)selected in the Tx carrier (re-)selection according to sub-clause 5.14.1.5, the following is performed on the selected carrier:

select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers according to [6] if CBR measurement results are available or the corresponding defaultTxConfigIndex configured by upper layers if CBR measurement results are not available;

if transmission based on random selection is configured by upper layers:
  randomly select the time and frequency resources for one transmission opportunity of SCI and SL-SCH from the resource pool, according to the amount of selected frequency resources. The random function shall be such that each of the allowed selections can be chosen with equal probability;

else:
  randomly select the time and frequency resources for one transmission opportunity of SCI and SL-SCH from the resources indicated by the physical layer according to subclause 14.1.1.6 of [2], according to the amount of selected frequency resources. The random function shall be such that each of the allowed selections can be chosen with equal probability;

if the number of HARQ retransmissions is equal to 1:
  if transmission based on random selection is configured by upper layers and there are available resources that meet the conditions in subclause 14.1.1.7 of [2] for one more transmission opportunity:
    randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
  else, if transmission based on sensing or partial sensing is configured by upper layers and there are available resources left in the resources indicated by the physical layer that meet the conditions in subclause 14.1.1.7 of [2] for one more transmission opportunity:
    randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
  consider a transmission opportunity which comes first in time as the new transmission opportunity and a transmission opportunity which comes later in time as the retransmission opportunity;
  consider both of the transmission opportunities as the selected sidelink grant;
else:
  consider the transmission opportunity as the selected sidelink grant;
use the selected sidelink grant to determine the subframes in which transmission(s) of SCI and SL-SCH occur according to subclause 14.2.1 and 14.1.1.4B of [2];

consider the selected sidelink grant to be a configured sidelink grant.
  NOTE: For V2X sidelink communication, the UE should ensure the randomly selected time and frequency resources fulfill the latency requirement.
  NOTE: For V2X sidelink communication, when there is no overlapping between the chosen configuration(s) in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.

The MAC entity shall for each subframe:
  if the MAC entity has a configured sidelink grant occurring in this subframe:
    if SL_RESOURCE_RESELECTION_COUNTER=1 and the MAC entity randomly selected, with equal probability, a value in the interval [0, 1] which is above the probability configured by upper layers in probResourceKeep:
      set the resource reservation interval equal to 0;
    if the configured sidelink grant corresponds to transmission of SCI:
      for V2X sidelink communication in UE autonomous resource selection:
        select a MCS which is, if configured, within the range that is configured by upper layers between minMCS-PSSCH and maxMCS-PSSCH included in pssch-TxConfigList and, if configured by upper layers, overlapped between minMCS-PSSCH and maxMCS-PSSCH indicated in cbr-pssch-TxConfigList for the highest priority of the sidelink logical channel(s) in the MAC PDU and the CBR measured by lower layers according to [6] if CBR measurement results are available or the corresponding defaultTxConfigIndex configured by upper layers if CBR measurement results are not available;
          NOTE: MCS selection is up to UE implementation if the MCS or the corresponding range is not configured by upper layers.
          NOTE: For V2X sidelink communication, when there is no overlapping between the chosen configuration(s) included in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.
      for V2X sidelink communication in scheduled resource allocation:
        select a MCS unless it is configured by upper layer;
      instruct the physical layer to transmit SCI corresponding to the configured sidelink grant;
      for V2X sidelink communication, deliver the configured sidelink grant, the associated HARQ information and the value of the highest priority of the sidelink logical channel(s) in the MAC PDU to the Sidelink HARQ Entity for this subframe;
    else if the configured sidelink grant corresponds to transmission of first transport block for sidelink communication:

deliver the configured sidelink grant and the associated HARQ information to the Sidelink HARQ Entity for this subframe.

NOTE: If the MAC entity has multiple configured grants occurring in one subframe and if not all of them can be processed due to the single-cluster SC-FDM restriction, it is left for UE implementation which one of these to process according to the procedure above.

5.14.1.2 Sidelink HARQ Operation
5.14.1.2.1 Sidelink HARQ Entity

The MAC entity is configured by upper layers to transmit using pool(s) of resources on one or multiple carriers as indicated in subclause 5.10.13.1 of 3GPP TS 36.331 [8], there is one Sidelink HARQ Entity at the MAC entity for each carrier for transmission on SL-SCH, which maintains a number of parallel Sidelink processes.

For sidelink communication, the number of transmitting Sidelink processes associated with the Sidelink HARQ Entity is defined in [8].

For V2X sidelink communication, the maximum number of transmitting Sidelink processes associated with each Sidelink HARQ Entity is 8. A sidelink process may be configured for transmissions of multiple MAC PDUs. For transmissions of multiple MAC PDUs, the maximum number of transmitting Sidelink processes associated with each Sidelink HARQ Entity is 2.

A delivered and configured sidelink grant and its associated HARQ information are associated with a Sidelink process. For each subframe of the SL-SCH and each Sidelink process, the Sidelink HARQ Entity shall:

if a sidelink grant corresponding to a new transmission opportunity has been indicated for this Sidelink process and there is SL data, for sidelink logical channels of ProSe destination associated with this sidelink grant, available for transmission:

obtain the MAC PDU from the "Multiplexing and assembly" entity;

deliver the MAC PDU and the sidelink grant and the HARQ information to this Sidelink process;

instruct this Sidelink process to trigger a new transmission.

else, if this subframe corresponds to retransmission opportunity for this Sidelink process:

instruct this Sidelink process to trigger a retransmission.

NOTE: The resources for retransmission opportunities are specified in subclause 14.2.1 of [2] unless specified in subclause 5.14.1.1.

5.14.1.2.2 Sidelink Process

The Sidelink process is associated with a HARQ buffer.

The sequence of redundancy versions is 0, 2, 3, 1. The variable CURRENT_IRV is an index into the sequence of redundancy versions. This variable is updated modulo 4.

New transmissions and retransmissions either for a given SC period in sidelink communication or in V2X sidelink communication are performed on the resource indicated in the sidelink grant as specified in subclause 5.14.1.1 and with the MCS selected as specified in subclause 5.14.1.1.

If the sidelink process is configured to perform transmissions of multiple MAC PDUs for V2X sidelink communication the process maintains a counter SL_RESOURCE_RESELECTION_COUNTER. For other configurations of the sidelink process, this counter is not available.

If the Sidelink HARQ Entity requests a new transmission, the Sidelink process shall:
set CURRENT_IRV to 0;
store the MAC PDU in the associated HARQ buffer;
store the sidelink grant received from the Sidelink HARQ Entity;
generate a transmission as described below.

If the Sidelink HARQ Entity requests a retransmission, the Sidelink process shall:
generate a transmission as described below.

To generate a transmission, the Sidelink process shall:
if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and if there is no Sidelink Discovery Gap for Transmission or no transmission on PSDCH at the time of the transmission; or, in case of transmissions of V2X sidelink communication, if the MAC entity is able to perform transmissions on SL-SCH and transmissions on PSDCH simultaneously at the time of the transmission:

instruct the physical layer to generate a transmission according to the stored sidelink grant with the redundancy version corresponding to the CURRENT_IRV value.

increment CURRENT_IRV by 1;
if this transmission corresponds to the last transmission of the MAC PDU:
decrement SL_RESOURCE_RESELECTION_COUNTER by 1, if available.

The transmission of V2X sidelink communication is prioritized over uplink transmission if the following conditions are met:

if the MAC entity is not able to perform uplink transmissions and transmissions of V2X sidelink communication simultaneously at the time of the transmission; and if uplink transmission is not prioritized by upper layer according to [15]; and if the value of the highest priority of the sidelink logical channel(s) in the MAC PDU is lower than thresSL-TxPrioritization if thresSL-TxPrioritization is configured.

5.14.1.3 Multiplexing and Assembly

For PDU(s) associated with one SCI, MAC shall consider only logical channels with the same Source Layer-2 ID-Destination Layer-2 ID pair.

Multiple transmissions within overlapping SC periods to different ProSe Destinations are allowed subject to single-cluster SC-FDM constraint.

In V2X sidelink communication, multiple transmissions for different Sidelink processes are allowed to be independently performed in different subframes.

5.14.1.3.1 Logical Channel Prioritization

The Logical Channel Prioritization procedure is applied when a new transmission is performed. Each sidelink logical channel has an associated priority which is the PPPP and optionally an associated PPPR. Multiple sidelink logical channels may have the same associated priority. The mapping between priority and LCID is left for UE implementation. If duplication is activated as specified in 3GPP TS 36.323 [4], the MAC entity shall map different sidelink logical channels which correspond to the same PDCP entity in duplication onto different carriers in accordance with 5.14.1.5 or onto different carriers of different carrier set, if configured by upper layer (3GPP TS 36.331 [8]), based on UE implementation.

The MAC entity shall perform the following Logical Channel Prioritization procedure either for each SCI transmitted in an SC period in sidelink communication, or for each SCI corresponding to a new transmission in V2X sidelink communication:

The MAC entity shall allocate resources to the sidelink logical channels in the following steps:
Only consider sidelink logical channels not previously selected for this SC period and the SC periods (if any) which are overlapping with this SC period, to have data available for transmission in sidelink communication;
Only consider sidelink logical channels which meet the following conditions:
allowed on the carrier where the SCI is transmitted for V2X sidelink communication, if the carrier is configured by upper layers according to 3GPP TS 36.331 [8] and 3GPP TS 24.386 [15];
having a priority whose associated threshCBR-FreqReselection is no lower than the CBR of the carrier when the carrier is (re-)selected in accordance with 5.14.1.5;
Exclude sidelink logical channel(s) not allowed on the carrier where the SCI is transmitted, if duplication is activated as specified in 3GPP TS 36.323 [4].
Step 0: Select a ProSe Destination, having the sidelink logical channel with the highest priority, among the sidelink logical channels having data available for transmission and having the same transmission format as the one selected corresponding to the ProSe Destination;
NOTE: The sidelink logical channels belonging to the same ProSe Destination have the same transmission format.
For each MAC PDU associated to the SCI:
Step 1: Among the sidelink logical channels belonging to the selected ProSe Destination and having data available for transmission, allocate resources to the sidelink logical channel with the highest priority;
Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.
The UE shall also follow the rules below during the scheduling procedures above:
the UE should not segment an RLC SDU (or partially transmitted SDU) if the whole SDU (or partially transmitted SDU) fits into the remaining resources;
if the UE segments an RLC SDU from the sidelink logical channel, it shall maximize the size of the segment to fill the grant as much as possible;
the UE should maximise the transmission of data;
if the MAC entity is given a sidelink grant size that is equal to or larger than 10 bytes (for sidelink communication) or 11 bytes (for V2X sidelink communication) while having data available for transmission, the MAC entity shall not transmit only padding.

5.14.1.3.2 Multiplexing of MAC SDUs
The MAC entity shall multiplex MAC SDUs in a MAC PDU according to subclauses 5.14.1.3.1 and 6.1.6.

5.14.1.4 Buffer Status Reporting
The sidelink Buffer Status reporting procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority and optionally the PPPR of the sidelink logical channel, and the mapping between LCG ID and priority and optionally the mapping between LCG ID and PPPR which are provided by upper layers in logicalChGroupInfoList [8]. LCG is defined per ProSe Destination.

A sidelink Buffer Status Report (BSR) shall be triggered if any of the following events occur:
if the MAC entity has a configured SL-RNTI or a configured SL-V-RNTI:
SL data, for a sidelink logical channel of a ProSe Destination, becomes available for transmission in the RLC entity or in the PDCP entity (the definition of what data shall be considered as available for transmission is specified in [3] and [4] respectively) and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";
UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";
retx-BSR-TimerSL expires and the MAC entity has data available for transmission for any of the sidelink logical channels, in which case the Sidelink BSR is referred below to as "Regular Sidelink BSR";
periodic-BSR-TimerSL expires, in which case the Sidelink BSR is referred below to as "Periodic Sidelink BSR";
else:
An SL-RNTI or an SL-V-RNTI is configured by upper layers and SL data is available for transmission in the RLC entity or in the PDCP entity (the definition of what data shall be considered as available for transmission is specified in [3] and [4] respectively), in which case the Sidelink BSR is referred below to as "Regular Sidelink BSR".
For Regular and Periodic Sidelink BSR:
if the number of bits in the UL grant is equal to or larger than the size of a Sidelink BSR containing buffer status for all LCGs having data available for transmission plus its subheader:
report Sidelink BSR containing buffer status for all LCGs having data available for transmission;
else report Truncated Sidelink BSR containing buffer status for as many LCGs having data available for transmission as possible, taking the number of bits in the UL grant into consideration.
For Padding Sidelink BSR:
if the number of padding bits remaining after a Padding BSR has been triggered is equal to or larger than the size of a Sidelink BSR containing buffer status for all LCGs having data available for transmission plus its subheader:
  report Sidelink BSR containing buffer status for all LCGs having data available for transmission;
else report Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled:
  if the MAC entity has UL resources allocated for new transmission for this TTI and the allocated UL resources can accommodate a Sidelink BSR MAC control element plus its subheader as a result of logical channel prioritization:
    instruct the Multiplexing and Assembly procedure to generate the Sidelink BSR MAC control element(s);
    start or restart periodic-BSR-TimerSL except when all the generated Sidelink BSRs are Truncated Sidelink BSRs;
    start or restart retx-BSR-TimerSL;
  else if a Regular Sidelink BSR has been triggered:
    if an uplink grant is not configured:
      a Scheduling Request shall be triggered.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart retx-BSR-TimerSL upon reception of an SL grant.

All triggered regular Sidelink BSRs shall be cancelled in case the remaining configured SL grant(s) valid for this SC Period can accommodate all pending data available for transmission in sidelink communication or in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.
  NOTE: A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.
[ . . . ]

6.1.3.1a Sidelink BSR MAC Control Elements

Sidelink BSR and Truncated Sidelink BSR MAC control elements consist of one Destination Index field, one LCG ID field and one corresponding Buffer Size field per reported target group.

The Sidelink BSR MAC control elements are identified by MAC PDU subheaders with LCIDs as specified in table 6.2.1-2. They have variable sizes.

For each included group, the fields are defined as follows (FIGS. 6.1.3.1a-1 and 6.1.3.1a-2):
  Destination Index: The Destination Index field identifies the ProSe Destination or the destination for V2X sidelink communication. The length of this field is 4 bits. The value is set to the index of the destination reported in destinationinfoList for sidelink communication or is set to one index among index(es) associated to same destination reported in v2x-DestinationInfoList for V2X sidelink communication. If multiple such lists are reported, the value is indexed sequentially across all the lists in the same order as specified in [8];
  LCG ID: The Logical Channel Group ID field identifies the group of logical channel(s) which buffer status is being reported. The length of the field is 2 bits;
  Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. The values taken by the Buffer Size field are shown in Table 6.1.3.1-1;
  R: Reserved bit, set to "0".

Buffer Sizes of LCGs are included in decreasing order of the highest priority of the sidelink logical channel belonging to the LCG irrespective of the value of the Destination Index field.

FIG. 6.1.3.1a-1 of 3GPP TS 36.321 V15.3.0, Entitled "Sidelink BSR and Truncated Sidelink BSR MAC Control Element for Even N", is Reproduced as FIG. 6

FIG. 6.1.3.1a-2 of 3GPP TS 36.321 V15.3.0, Entitled "Sidelink BSR and Truncated Sidelink BSR MAC Control Element for Odd N", is Reproduced as FIG. 7

[ . . . ]
6.1.6 MAC PDU (SL-SCH)

A MAC PDU consists of a MAC header, one or more MAC Service Data Units (MAC SDU), and optionally padding; as described in FIG. 6.1.6-4.

Both the MAC header and the MAC SDUs are of variable sizes.

A MAC PDU header consists of one SL-SCH subheader, one or more MAC PDU subheaders; each subheader except SL-SCH subheader corresponds to either a MAC SDU or padding.

The SL-SCH subheader consists of the seven header fields V/R/R/R/R/SRC/DST.

A MAC PDU subheader consists of the six header fields R/R/E/LCID/F/L but for the last subheader in the MAC PDU. The last subheader in the MAC PDU consists solely of the four header fields R/R/E/LCID. A MAC PDU subheader corresponding to padding consists of the four header fields R/R/E/LCID.

Figure 8:
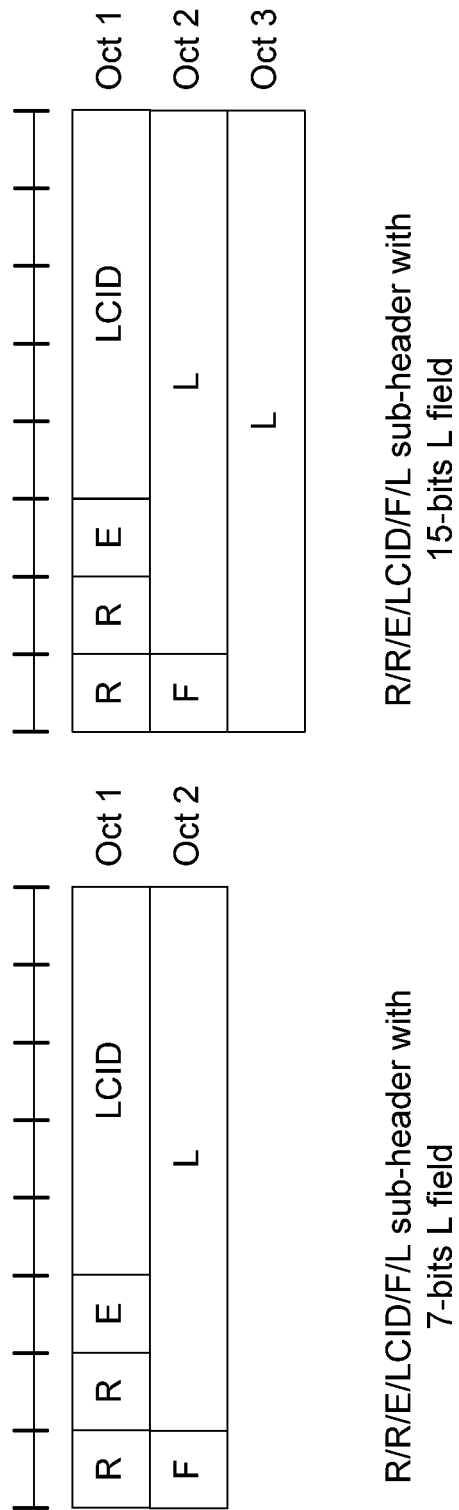
FIG. 8 is a reproduction of FIG. 6.1.6-1 of 3GPP TS 36.321 V15.3.0.

FIG. 6.1.6-1 of 3GPP TS 36.321 V15.3.0, Entitled "R/R/E/LCID/F/L MAC Subheader", is Reproduced as FIG. 8

Figure 9:
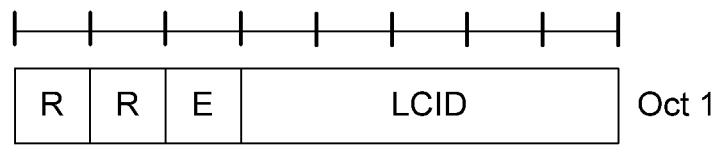
FIG. 9 is a reproduction of FIG. 6.1.6-2 of 3GPP TS 36.321 V15.3.0.

FIG. 6.1.6-2 of 3GPP TS 36.321 V15.3.0, Entitled "R/R/E/LCID MAC Subheader", is Reproduced as FIG. 9

Figure 10:
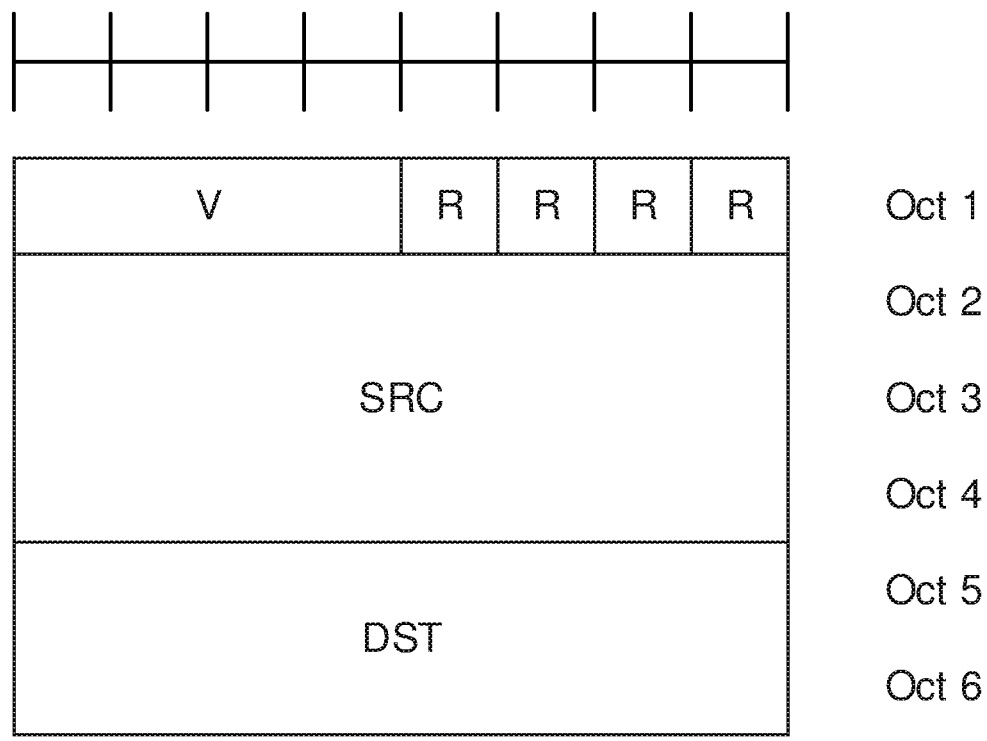
FIG. 10 is a reproduction of FIG. 6.1.6-3 of 3GPP TS 36.321 V15.3.0.

FIG. 6.1.6-3 of 3GPP TS 36321 V15.3.0, Entitled "SL-SCH MAC Subheader for V='0001' and '0010'", is Reproduced as FIG. 10

Figure 11:
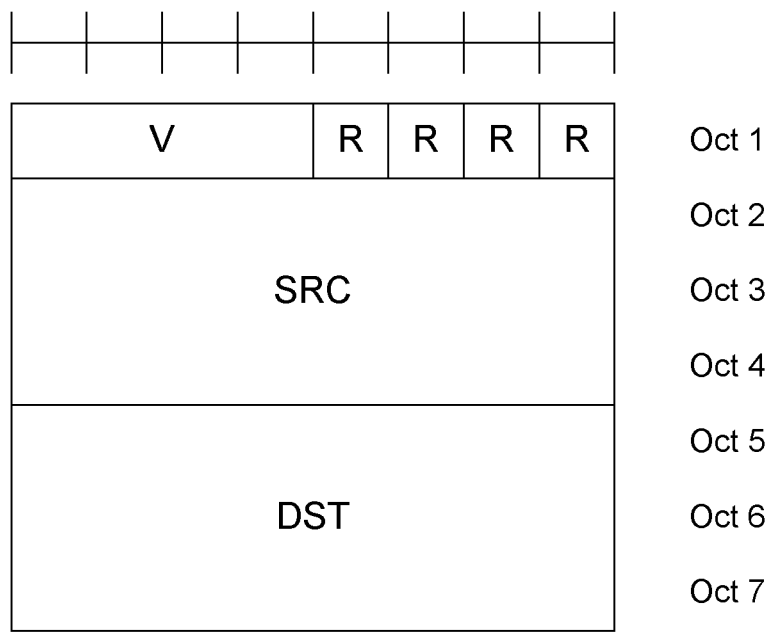
FIG. 11 is a reproduction of FIG. 6.1.6-3a of 3GPP TS 36.321 V15.3.0.

FIG. 6.1.6-3a of 3GPP TS 36.321 V15.3.0, Entitled "SL-SCH MAC Subheader for V='0011'", is Reproduced as FIG. 11

MAC PDU subheaders have the same order as the corresponding MAC SDUs and padding.

Padding occurs at the end of the MAC PDU, except when single-byte or two-byte padding is required. Padding may have any value and the MAC entity shall ignore it. When padding is performed at the end of the MAC PDU, zero or more padding bytes are allowed.

When single-byte or two-byte padding is required, one or two MAC PDU subheaders corresponding to padding are placed after the SL-SCH subheader and before any other MAC PDU subheader.

A maximum of one MAC PDU can be transmitted per TB.

Figure 12:
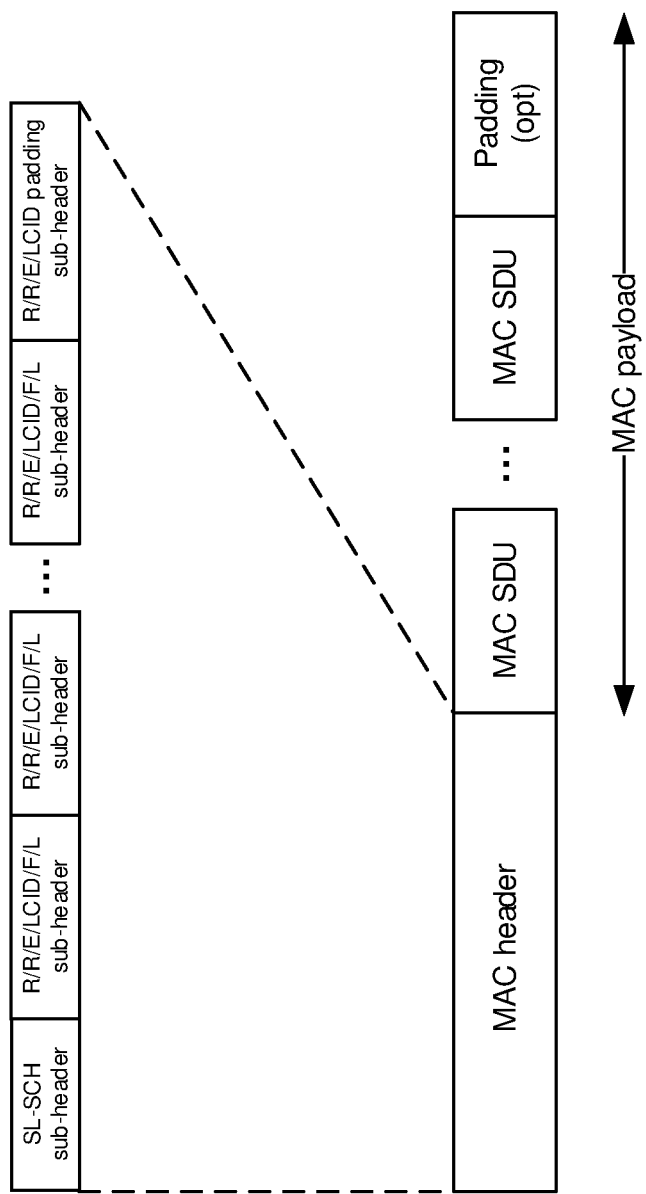
FIG. 12 is a reproduction of FIG. 6.1.6-4 of 3GPP TS 36.321 V15.3.0.

FIG. 6.1.6-4 of 3GPP TS 36.321 V15.3.0, Entitled "Example of MAC PDU Consisting of MAC Header, MAC SDUs and Padding", is Reproduced as FIG. 12

In 23.501, 5QI values and mapping with QoS characteristics are quoted.

5.7.2 5G QoS Parameters 5.7.2.1 5QI

A 5QI is a scalar that is used as a reference to 5G QoS characteristics defined in clause 5.7.4, i.e. access node-specific parameters that control QoS forwarding treatment for the QoS Flow (e.g. scheduling weights, admission thresholds, queue management thresholds, link layer protocol configuration, etc.).

Standardized 5QI values have one-to-one mapping to a standardized combination of 5G QoS characteristics as specified in Table 5.7.4-1.

The 5G QoS characteristics for pre-configured 5QI values are pre-configured in the AN.

Standardized or pre-configured 5G QoS characteristics, are indicated through the 5QI value, and are not signalled on any interface, unless certain 5G QoS characteristics are modified as specified in clauses 5.7.3.3, 5.7.3.6, and 5.7.3.7.

The 5G QoS characteristics for QoS Flows with dynamically assigned 5QI are signalled as part of the QoS profile.

NOTE: On N3, each PDU (i.e. in the tunnel used for the PDU Session) is associated with one 5QI via the QFI carried in the encapsulation header.

5.7.4 Standardized 5QI to QoS Characteristics Mapping

The one-to-one mapping of standardized 5QI values to 5G QoS characteristics is specified in table 5.7.4-1.

Table 5.7.4-1 of 3GPP TS 36.321 V15.3.0, Entitled "Standardized 5QI to QoS Characteristics Mapping", is Reproduced as FIGS. 13A-13E NOTE 1: For Standardized 5QI to QoS characteristics mapping, the table will be extended/updated to support service requirements for 5G, e.g. ultralow latency service.

NOTE 2: It is preferred that a value less than 64 is allocated for any new standardised 5QI of non-GBR Resource Type. This is to allow for option 1 to be used as described in clause 5.7.1.3 (as the QFI is limited to less than 64).

In 3GPP TS 23.786, introductions to VQI values for V2X QoS support are quoted.

6.19 Solution #19: QoS Support for eV2X Communication Over PC5 Interface 6.19.1 Functional Description 6.19.1.1 General description This solution addresses Key Issue #4 (clause 5.4) Support of PC5 QoS framework enhancement for eV2X. The QoS requirements for eV2X are different from that of the EPS V2X, and the previous defined PPPP/PPPR in TS 23.285 [5] are considered not to satisfy the needs. Specifically, there are much more QoS parameters to consider for the eV2X services. This solution proposes to use 5QI for eV2X communication over PC5 interface. This allows a unified QoS model for eV2X services over different links.

6.19.1.2 Solution Description

The new service requirements were captured in TS 22.186 [4]. The new performances KPIs were specified with the following parameters:

Payload (Bytes);
Transmission rate (Message/Sec);
Maximum end-to-end latency (ms);
Reliability (%);
Data rate (Mbps);
Minimum required communication range (meters).

Note that the same set of service requirements apply to both PC5 based V2X communication and Uu based V2X communication. As analysed in Solution #2 (clause 6.2), these QoS characteristics could be well represented with 5QI defined in TS 23.501 [7].

It is therefore possible to have a unified QoS model for PC5 and Uu, i.e. also use 5QIs for V2X communication over PC5, such that the application layer can have a consistent way of indicating QoS requirements regardless of the link used. This does not prevent the AS layer from implementing different mechanisms over PC5 and Uu to achieve the QoS requirements.

Considering the 5GS V2X capable UEs, there are three different types of traffic: broadcast, multicast, and unicast. The UE-PC5-AMBR is applied to all types of traffic and is used for the RAN for capping the UE PC5 transmission in the resources management.

For unicast type of traffic, it is clear that the same QoS Model as that of Uu can be utilized, i.e. each of the unicast link could be treated as a bearer, and QoS flows could be associated with it. All the QoS characteristics defined in 5QI and the additional parameter of data rate could apply. In addition, the Minimum required communication range could be treated as an additional parameter specifically for PC5 use.

For broadcast traffic, there is no bearer concept. Therefore, each of the message may have different characteristics according to the application requirements. The 5QI should then be used in the similar manner as that of the PPPP/PPPR, i.e. to be tagged with each of the packet. 5QI is able to represent all the characteristics needed for the PC5 broadcast operation, e.g. latency, priority, reliability, etc. A group of V2X broadcast specific 5QIs (i.e. VQIs) could be defined for PC5 use.

NOTE 1: The 5QI used for PC5 may be different from that used for Uu even for the same V2X service, e.g. the PDB for the PC5 can be longer than that for the Uu as it is a direct link. The 5QIs used for PC5 is named VQI for differentiation.

NOTE 2: A mapping between the EPS V2X QoS parameters, e.g. PPPP and PPPR, with the new Vials, e.g. similar to the non-GBR 5QIs defined in TS 23.501 [7], will be defined in normative phase for broadcast operation.

NOTE 3: The working assumption is that NR PC5 design support the use of V2X 5QIs.

NOTE 4: AS layer may handle unicast, groupcast and broadcast traffic by taking all their priorities, e.g. indicated by VQI, into account.

6.19.1.3 V2X 5QI (VQI) Values for PC5 Broadcast Use

A set of new Vials for V2X use will be defined in normative phase reflecting the service requirements documented in TS 22.186 [4].

NOTE 1: The working assumption is that non-standardized VQI is not supported in this release.

NOTE 2: Whether per packet or per QoS flow QoS Model is used depends on RAN decision.

In RAN1#94 chairman's note, the agreements of NR V2X are quoted.

Agreements:

At least two sidelink resource allocation modes are defined for NR-V2X sidelink communication Mode 1: Base station schedules sidelink resource(s) to be used by UE for sidelink transmission(s)

Mode 2 UE determines (i.e. base station does not schedule) sidelink transmission resource(s) within sidelink resources configured by base station/network or pre-configured sidelink resources Notes:

eNB control of NR sidelink and gNB control of LTE sidelink resources will be separately considered in corresponding agenda items.

Mode-2 definition covers potential sidelink radio-layer functionality or resource allocation sub-modes (subject to further refinement including merging of some or all of them) where a) UE autonomously selects sidelink resource for transmission b) UE assists sidelink resource selection for other UE(s)

c) UE is configured with NR configured grant (type-1 like) for sidelink transmission d) UE schedules sidelink transmissions of other UEs RAN1 to continue study details of resource allocation modes for NR-V2X sidelink communication In 3GPP RAN2#104, the agreements of NR V2X are quoted. R2-1816515 Summary of Email Discussion [103bis #36] [NR/V2X] CP aspects for NR sidelink design

---

4: RAN2 will support the case a UE can be configured to perform both mode-1 and mode-2 at the same time assuming RAN1 does not have concern on it. FFS on the scenario which it is applicable.

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

One or multiple of following assumptions for network side may be used hereafter:

Downlink timing of TRPs in the same cell are synchronized.

RRC layer of network side is in BS.

One or multiple of following assumptions for UE side may be used hereafter:

There are at least two UE (RRC) states: connected state (or called active state) and non-connected state (or called inactive state or idle state). Inactive state may be an additional state or belong to connected state or non-connected state.

In LTE, a UE could be configured as network scheduling mode (i.e. mode3), and a sidelink logical channel of a destination could belong to a LCG (Logical Channel Group). The UE may need to transmit sidelink BSR (Buffer Status Report) for reporting different LCGs of different destinations in network scheduling mode. The detail (e.g. format, field) of sidelink BSR could refer to 3GPP TS 36.321. In NR, both network scheduling mode (i.e. mode 1) and UE autonomous resource selection mode (i.e. mode2) could be supported in V2X sidelink.

Moreover, as discussed in the 3GPP RAN2 email discussion, a UE could be configured with Mode1 and Mode2 at same time. The UE supporting different modes at same time could be for supporting different service requirements. However, if NR sidelink follows LTE design for sidelink BSR reporting, the UE could report unnecessary information (e.g. buffer size of mode 2) to a base station. Moreover, the redundant information may even cause incorrect scheduling if the base station cannot correctly differentiate buffer sizes of different modes.

For a UE configured with both scheduling mode and selection mode, how to establish association between resource allocation modes, destination, LCG, and/or buffer size for preventing any potential issue is discussed below.

To solve the issue(s) mentioned above, one general concept of the invention is a UE could be configured with an association between (sidelink) data and transmission resource(s) by a base station. The UE could be configured with an association between sidelink data and resource allocation mode(s) by the base station.

Additionally or alternatively, the UE could report available amount of the data via a sidelink Buffer Status Report (BSR) if the data is configured to be able to be transmitted via resources scheduled by the base station. Additionally or alternatively, the UE could not report available amount of the data via the sidelink Buffer Status Report (BSR) if the data is configured to be not able to be transmitted via resources scheduled by the base station.

The UE could report available amount (buffer status) of the sidelink data via a sidelink Buffer Status Report (BSR)

if the sidelink data is configured to be able to be transmitted via resources scheduled by the base station (resource allocation mode 1). Additionally or alternatively, the UE may not report available amount of the sidelink data via the sidelink Buffer Status Report (BSR) if the sidelink data is configured to be not able to be transmitted via resource allocation mode 1 (e.g. configured to be only able to be transmitted via resources selected with resource allocation mode 2). Additionally or alternatively, the UE may not report available amount of the data via sidelink Buffer Status Report (BSR) if the data is configured to be able to be transmitted via resources selected by the UE.

Figure 14:
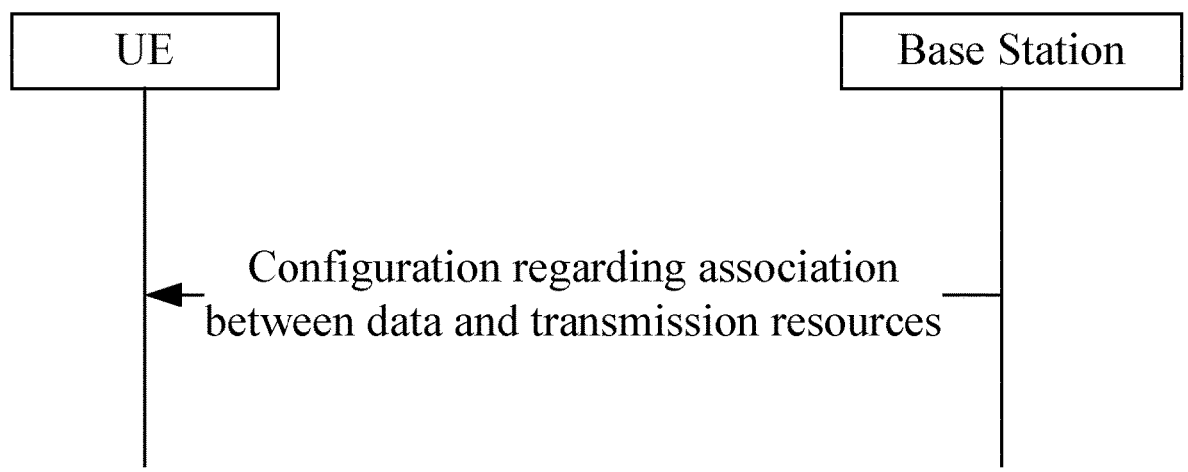
FIG. 14 is a diagram according to one exemplary embodiment.

In one example, as shown in FIG. 14, a UE could receive a first message from a base station. The first message could contain configuration(s) of association between data and transmission resource(s). The UE could associate data with transmission resource(s) based on the configuration(s).

Figure 15:
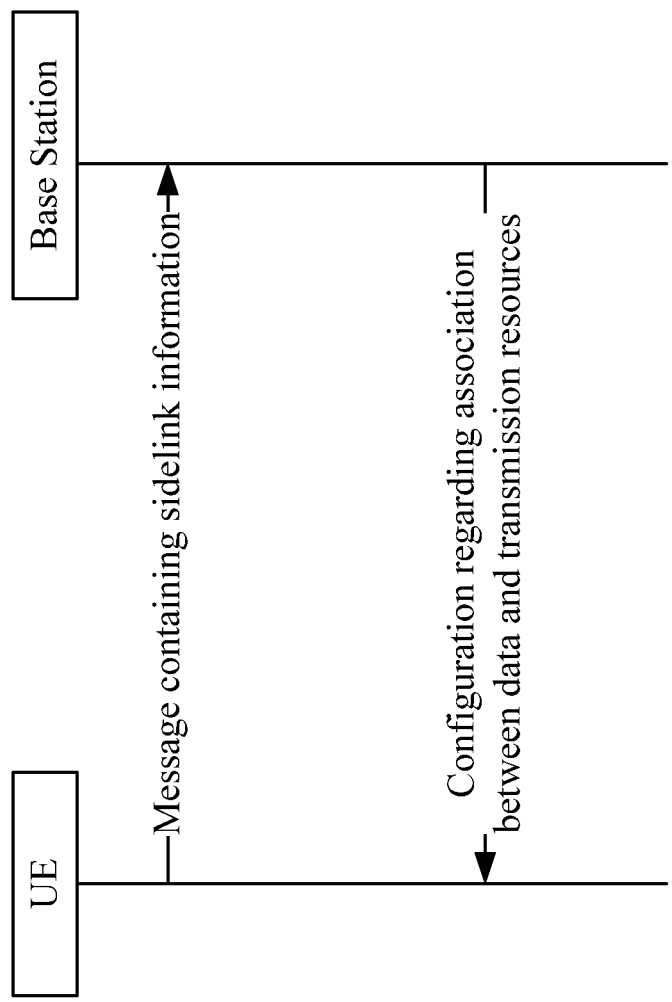
FIG. 15 is a diagram according to one exemplary embodiment.

In another example, as shown in FIG. 15, a UE could transmit a first message to a base station. The first message could contain information associated with sidelink communication. The base station could transmit a second message to the UE. The second message could contain configuration(s) for association between data and transmission resource(s).

Figure 16:
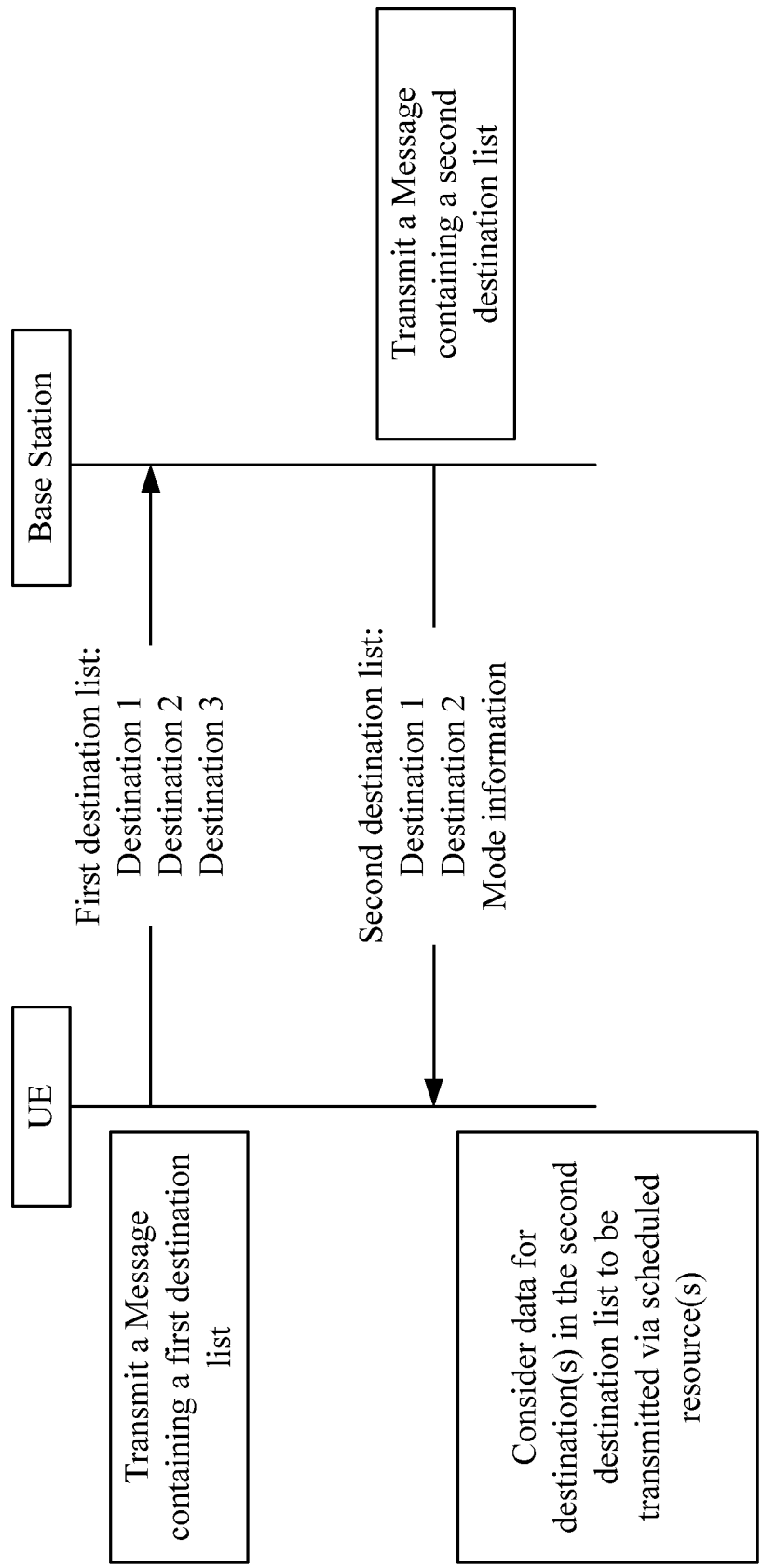
FIG. 16 is a diagram according to one exemplary embodiment.

Another general concept of the invention is that a configuration indicating an association between data and transmission resources could be based on:
  destination(s) of or is associated with the data
  logical channel group(s) the data belongs to or is associated with the data
  sidelink logical channel(s) associated with the data
  QoS requirement(s) of the data
    For example, PPPP
    For example, PPPR
  5QI index(es) of logical channel(s) associated with the data
  VQI index(es) of the data In one example, as illustrated in FIG. 16, a UE could transmit a first message to a base station. The first message could contain a first list of destination(s) for V2X sidelink communication (e.g. Destination 1, 2 and 3). The base station could transmit a second message to the UE. The second message could contain a second list of destination(s) and other mode information. The second list of destination(s) could be a subset of the first list of destination(s) (e.g. Destination 1 and 2).

Additionally or alternatively, the second message could contain a list of destination index(es) and other mode information. The list of destination index(es) could be associated with the first list of destination(s) in the first message transmitted by the UE. The UE could consider data associated with the destination(s) included in the second list of destination(s) to be able to be transmitted via resources scheduled by the base station (e.g. transmission Mode 1).

Figure 17:
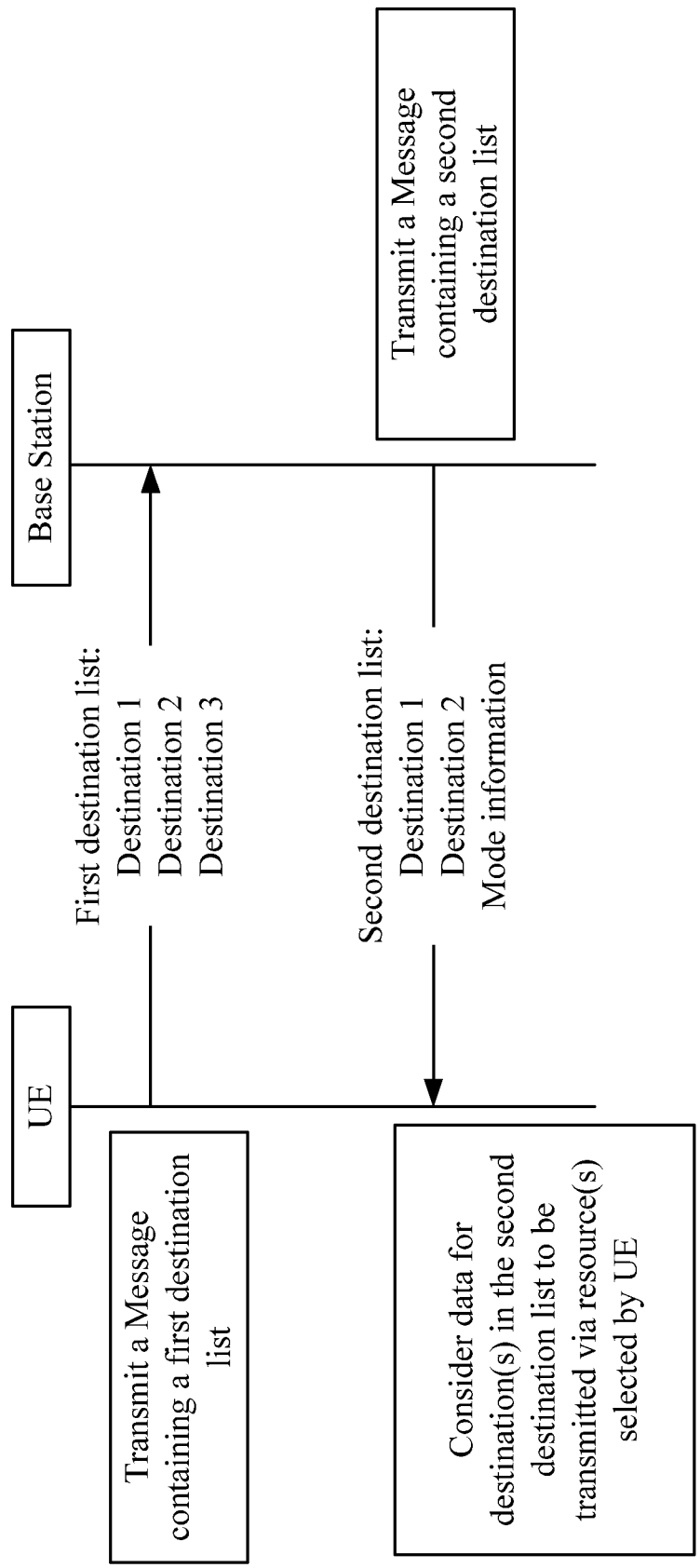
FIG. 17 is a diagram according to one exemplary embodiment.

Additionally or alternatively, the UE could consider data associated with the destination(s) included in the second list of destination(s) to be not able to be transmitted via resources scheduled by the base station (e.g. transmission Mode 1). Additionally or alternatively, the UE could consider the destination(s) included in the second list of destination(s) to be transmitted via resource(s) selected by the UE (e.g. transmission Mode 2), as shown in FIG. 17. Additionally or alternatively, the UE could consider the destination(s) included in the second list of destination(s) to be not able to be transmitted via resource(s) selected by the UE (e.g. transmission Mode 2).

Figure 18:
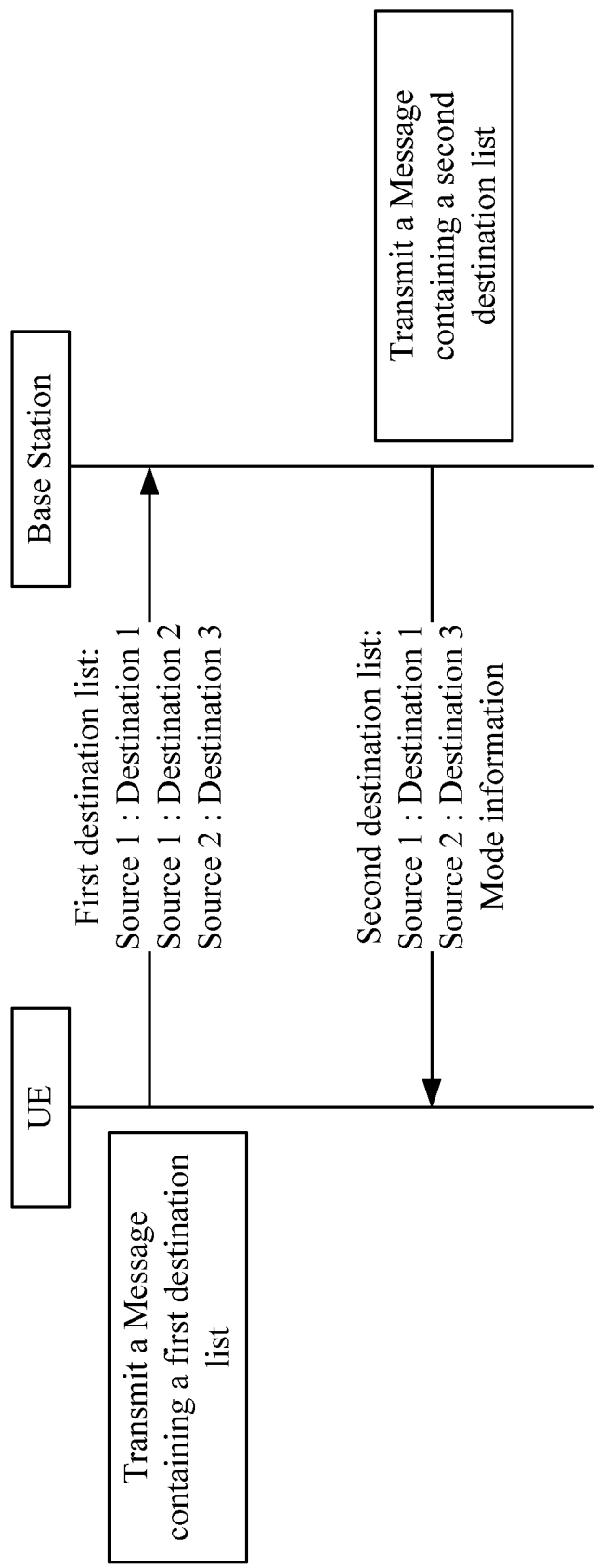
FIG. 18 is a diagram according to one exemplary embodiment.

In one embodiment, the first message could contain source-destination pair(s), as shown in FIG. 18. In another example, a UE could transmit a first message to a base station. The first message transmitted by the UE could contain sidelink information (e.g. destination(s) for V2X sidelink communication, carrier frequency(s)), and/or a first list of destination(s) for V2X sidelink communication.

The base station could transmit a second message to the UE. The second message could contain a second list of destination(s) and an at least one transmission mode configuration for each destination.

Figure 19:
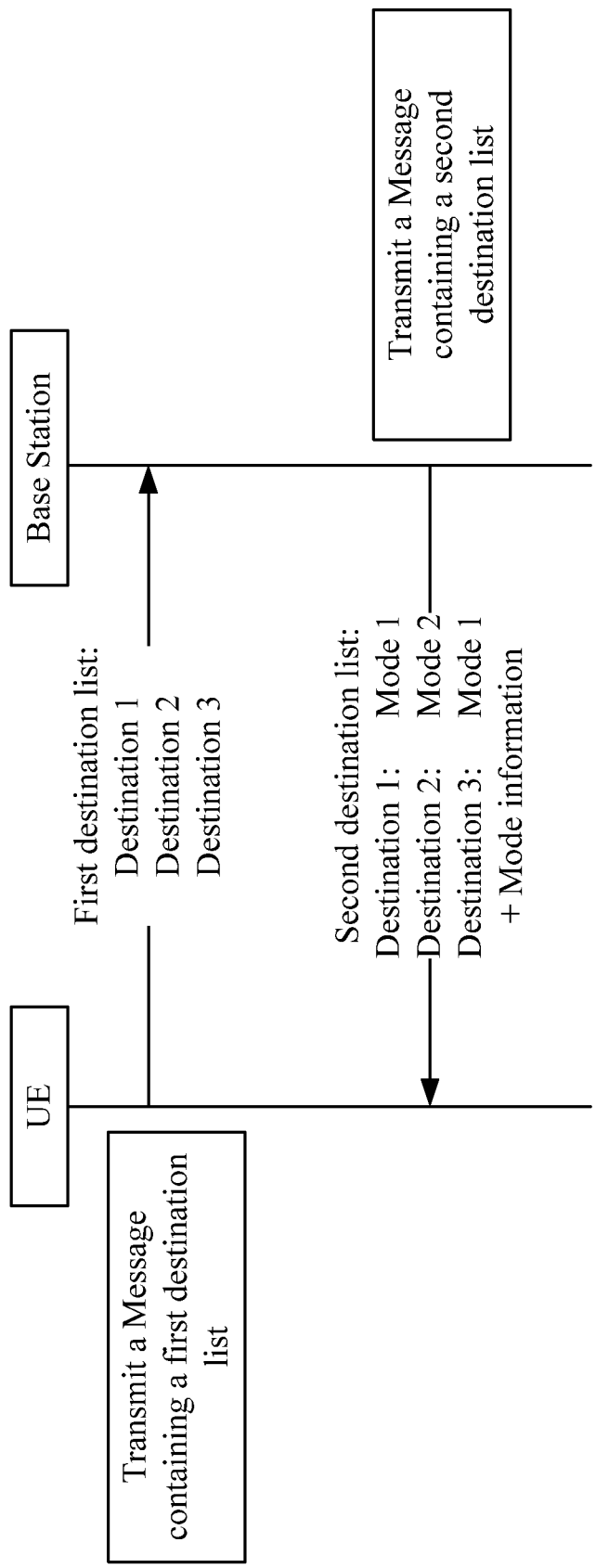
FIG. 19 is a diagram according to one exemplary embodiment.
Figure 20:
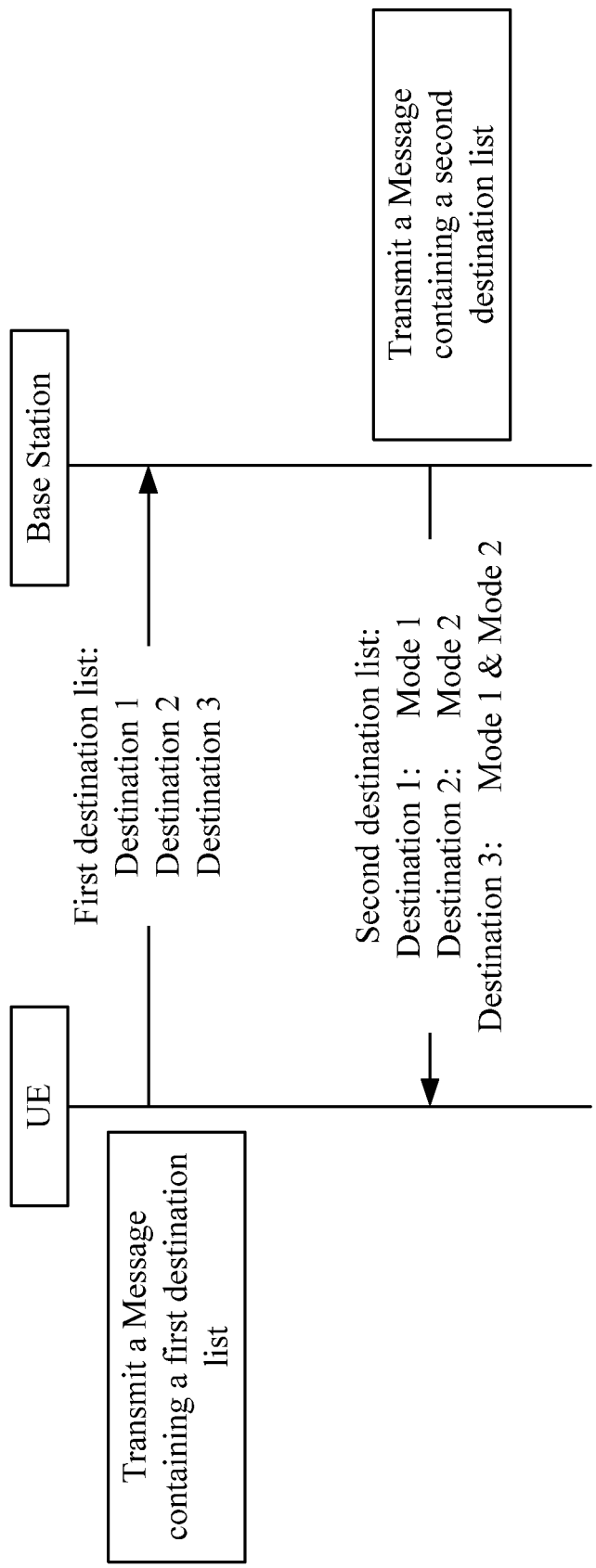
FIG. 20 is a diagram according to one exemplary embodiment.

In one embodiment, as illustrated in FIG. 19, the UE could consider data associated with Destination 1 and Destination 3 configured to be transmitted via resources scheduled by the based station and data associated with Destination 2 configured to be transmitted via resources selected by the UE. In one embodiment, as illustrated in FIG. 20, the UE could consider data associated with Destination 1 configured to be transmitted via resources scheduled by the based station and data associated with Destination 2 configured to be transmitted via resources selected by the UE, and data associated with Destination 3 configured to be transmitted via resources scheduled by the base station or selected by the UE.

Figure 21:
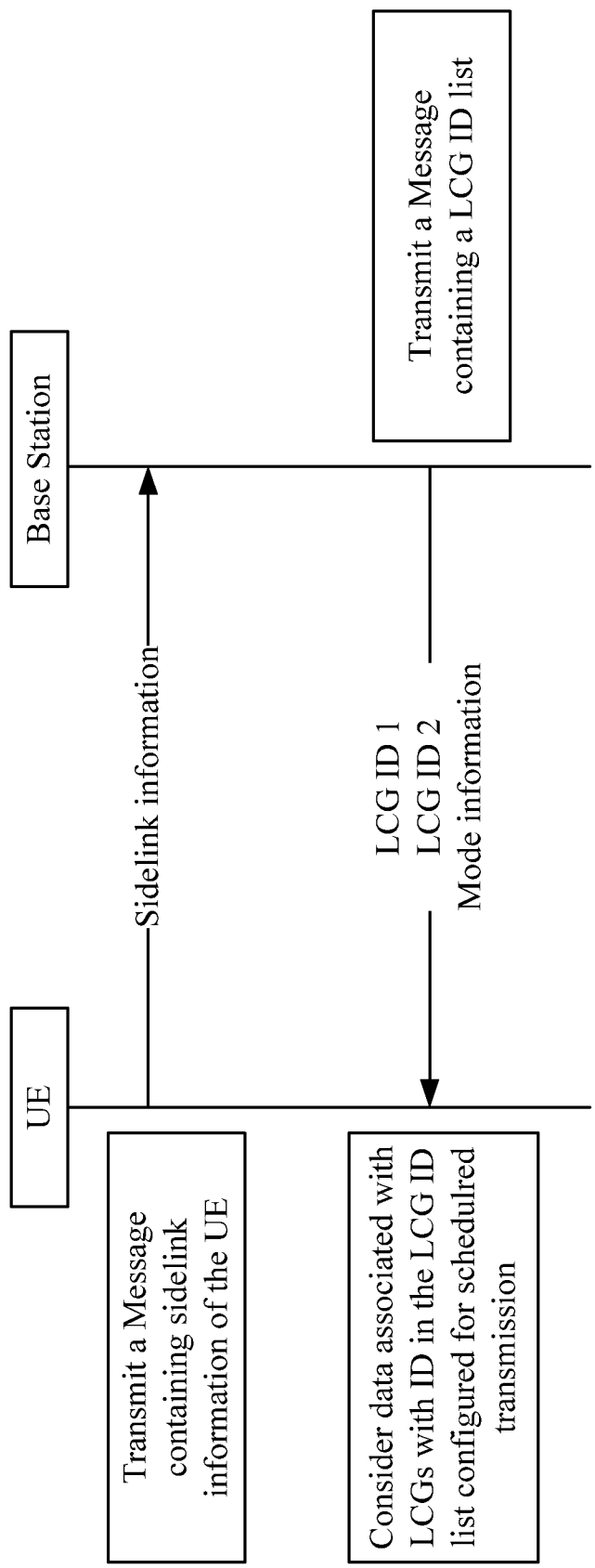
FIG. 21 is a diagram according to one exemplary embodiment.

In another example, as illustrated in FIG. 21, a UE could transmit a first message to a base station. The first message transmitted by the UE could contain sidelink information (e.g. destination(s) for V2X sidelink communication, carrier frequency(s)), sidelink information of the UE, and/or a first list of destination(s) for V2X sidelink communication.

In one embodiment, the base station could transmit a second message to the UE. The second message could contain a list of logical channel group (LCG) index(es). The UE could consider data associated with logical channel group(s) with logical channel group index(es) configured to be able to be transmitted via resource(s) scheduled by the base station.

Figure 22:
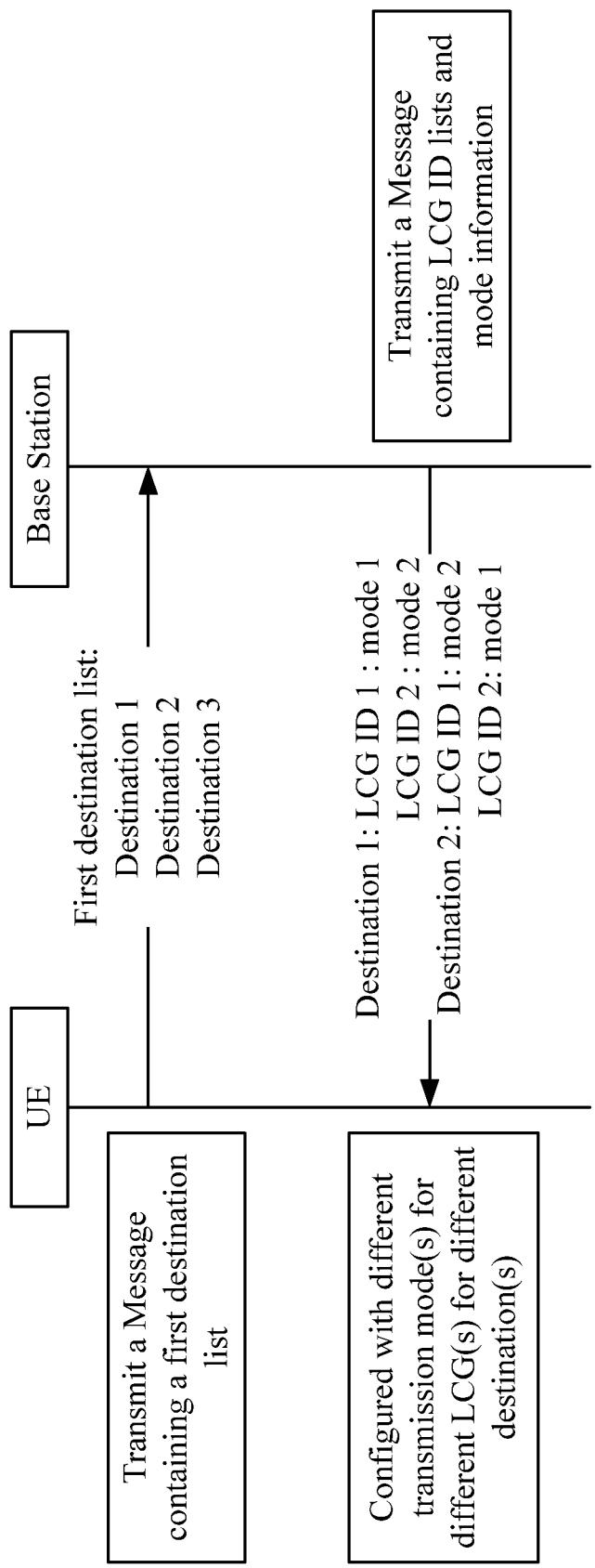
FIG. 22 is a diagram according to one exemplary embodiment.

Additionally or alternatively, as shown in FIG. 22, the second message could contain at least one list of logical channel group index(es) and associated mode information. Each list of at least one of logical channel group index(es) and mode information could be configured for at least one destination. Additionally or alternatively, the second message could contain a value indicating a threshold of transmission mode configuration of logical channel groups for destination(s).

Figure 23:
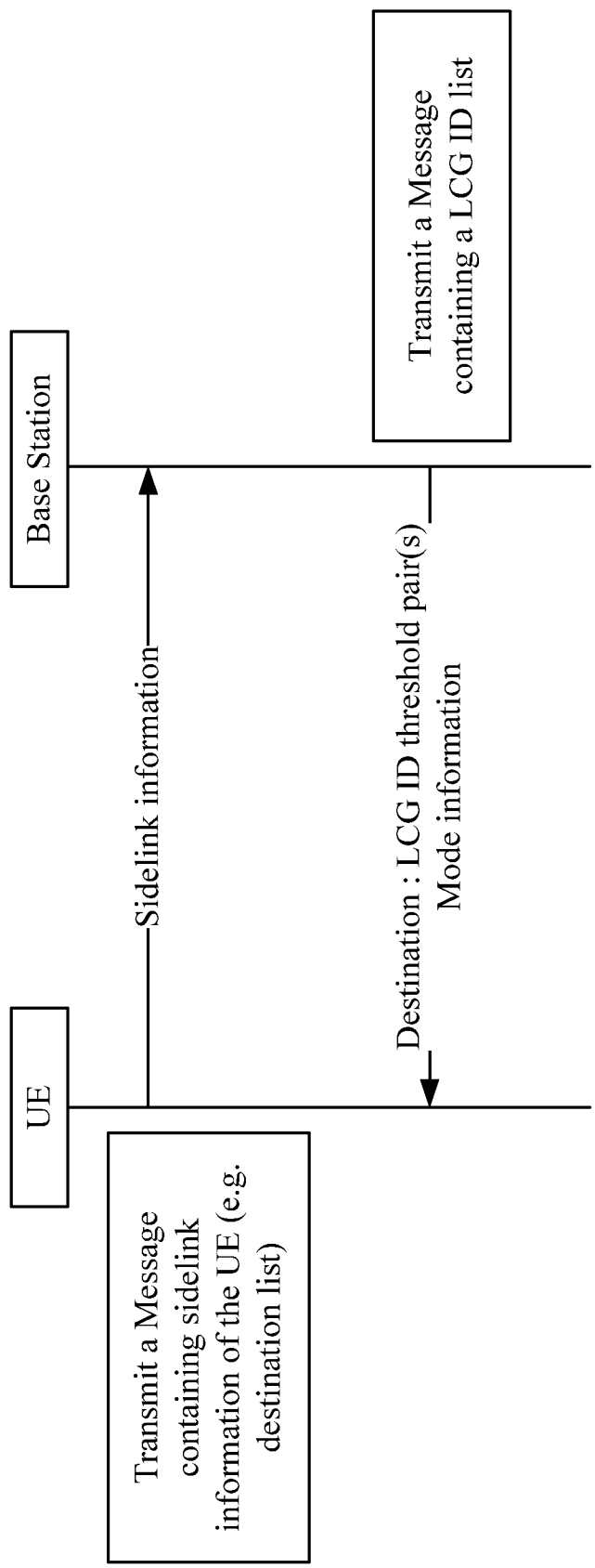
FIG. 23 is a diagram according to one exemplary embodiment.

In another example, as shown in FIG. 23, a UE could transmit a first message to a base station. The first message transmitted by the UE could contain sidelink information (e.g. destination(s) for V2X sidelink communication, carrier frequency(s)), a first list of destination(s) for V2X sidelink communication.

In one embodiment, the base station could transmit a second message to the UE. The second message could contain a value indicating a threshold of transmission mode configuration of logical channel groups for destination(s). The UE could consider data associated with logical channel group(s) with logical channel group index(es) lower than (or equal to) the value configured to be able to be transmitted via resource(s) scheduled by the base station. Additionally or alternatively, the UE could consider data associated with logical channel group(s) with logical channel group index(es) lower than (or equal to) the value configured to be not able to be transmitted via resource(s) selected by the UE. Additionally or alternatively, the UE could consider data associated with logical channel group(s) with logical channel group index(es) higher than (or equal to) the value configured to be able to be transmitted via resource(s) scheduled by the base station.

Figure 24:
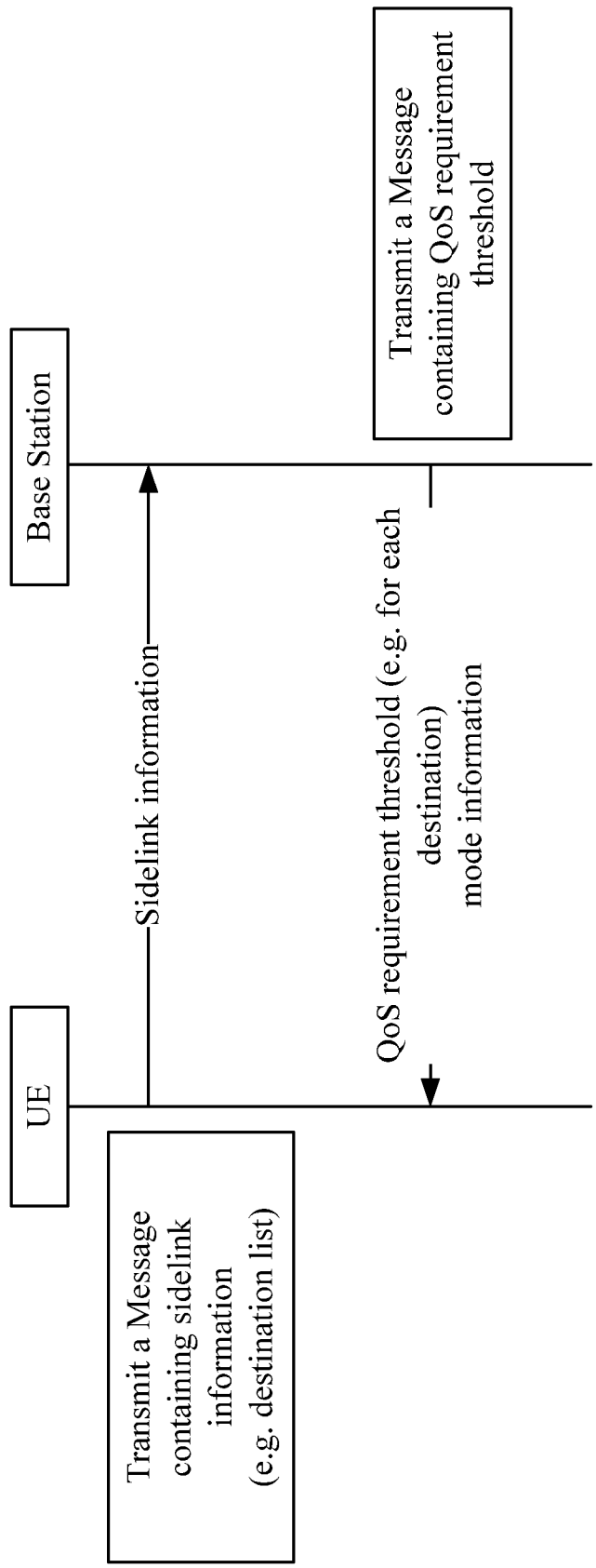
FIG. 24 is a diagram according to one exemplary embodiment.

In another example, as shown in FIG. 24, a UE could transmit a first message to a base station. The first message could contain sidelink information of the UE (e.g. a first list of destination(s) for V2X sidelink communication).

The base station could transmit a second message to the UE. The second message could contain value(s) indicating a threshold of QoS requirement(s) to associate transmission mode configuration with sidelink logical channel(s). The value(s) could contain a priority level, a reliability level, and/or a packet delay budget.

The UE could consider data associated with logical channel(s) of which QoS requirement(s) is higher than (or equal to) the associated threshold(s) to be able to be transmitted via resources scheduled by the base station. Additionally or alternatively, the UE could consider data associated with logical channel(s) of which QoS requirement(s) is lower than (or equal to) the associated threshold(s) to be able to be transmitted via resources selected by the UE.

In one embodiment, the first message could be a RRC message (e.g. SidelinkUEinformation). The second message could be a RRC message (e.g. RRCConnectionReconfiguration). The second list of destination(s) could be a subset of the first list of destination(s).

Figure 25:
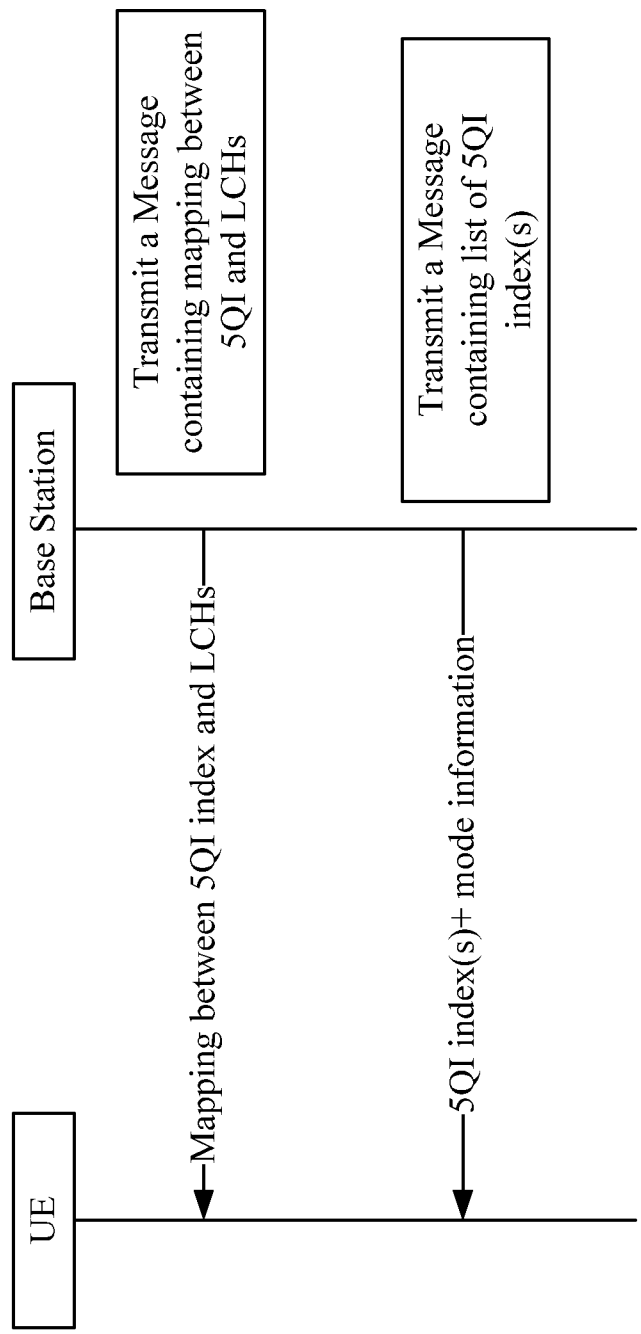
FIG. 25 is a diagram according to one exemplary embodiment.

In another example, as shown in FIG. 25, a base station could transmit a first message to a UE. The first message could contain a configuration of 5QI index(es) for each sidelink logical channel. The base station could transmit a second message to the UE. The second message could contain a list of 5QI index(es).

The UE could consider data associated with sidelink logical channel(s) configured with 5QI index(es) included in the list to be able to be transmitted via resources scheduled by the base station. Additionally or alternatively, the UE could consider data associated with sidelink logical channel(s) configured with 5QI index(es) included in the list to be not able to be transmitted via resources scheduled by the base station. Additionally or alternatively, the UE could consider data associated with sidelink logical channel(s) configured with 5QI index(es) included in the list to be able to be transmitted via resources selected by the UE.

Another general concept of the invention is that a base station could transmit a first message to a UE. The first message could contain a mapping configuration between sidelink logical channel(s) and logical channel group(s). A sidelink logical channel could be configured with at most one logical channel group.

The UE could consider data associated with the sidelink logical channel(s) that are configured with a logical channel group to be able to be transmitted via resources scheduled by the base station. Additionally or alternatively, the UE could consider data associated with the sidelink logical channel(s) that are not configured with a logical channel group to be transmitted via resources selected by the UE. Additionally or alternatively, the UE could consider data associated with the sidelink logical channel(s) that are configured with a logical channel group to be transmitted via resources obtained using a default mode. The default mode could be resource allocation mode 2.

Another general concept of the invention is that a UE could transmit a sidelink Buffer Status Report, wherein the sidelink Buffer Status Report could contain a bitmap indicating whether buffer size information of a certain destination(s) in a group of destination(s) is reported. The sidelink information transmitted by the UE could be sidelinkUEinformation. The sidelink information transmitted by the UE could contain a list of destination(s), a list of carrier frequency(s), and/or desired resource allocation mode(s) (for a destination).

In one embodiment, the mode information transmitted by the base station could contain mapping between LCG ID(s) and resource allocation mode(s) (for a destination), mapping between destination(s) and resource allocation mode(s), and/or mapping between QoS requirement(s) and resource allocation mode(s). The destination(s) could be destination Layer-2 ID(s). The destination index(es) could be associated with destination Layer-2 ID(s). The resource allocation mode(s) could be network scheduling mode (e.g. mode 1) or UE autonomous resource selection mode (e.g. mode 2). The resources scheduled by the base station could be resources configured for mode 1. The resources selected by UE could be resources configured for mode 2. The transmission resource(s) could be (V2X) sidelink transmission resource(s). The transmission resource(s) could be scheduled by the base station. The transmission resource(s) could be selected by the UE.

Figure 26:
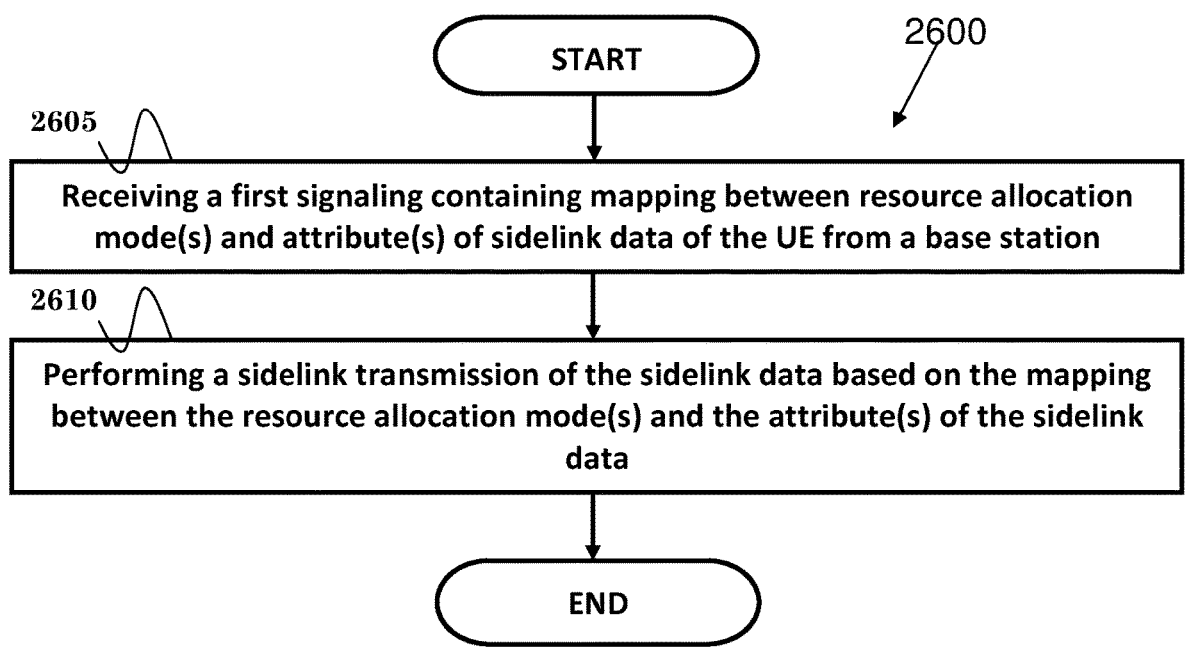
FIG. 26 is a flow chart according to one exemplary embodiment.

FIG. 26 is a flow chart 2600 according to one exemplary embodiment from the perspective of a UE. In step 2605, the UE receives a first signaling containing mapping between resource allocation mode(s) and attribute(s) of sidelink data of the UE from a base station. In step 2610, the UE performs a sidelink transmission of the sidelink data based on the mapping between the resource allocation mode(s) and the attribute(s) of the sidelink data.

In one embodiment, the attribute(s) of the sidelink data could include: (i) a destination index corresponding to a destination identity associated with the sidelink data, (ii) a Sidelink Logical channel associated with the sidelink data, (iii) a logical channel group (LCG) ID of the sidelink data, (iv) Quality of Service (QoS) parameter(s) associated with the sidelink data, (v) PQI (PC5 QoS Identifier) or VQI (V2X 5G QoS Identifier) value(s) associated with the sidelink data, and/or (vi) Side Link Radio Bearer (SLRB) associated with the sidelink data.

In one embodiment, the resource allocation mode(s) could include network scheduling mode and/or UE autonomous resource selection mode. The UE could determine to use the network scheduling mode to transmit the sidelink data if the attribute(s) of the sidelink data is associated with the network scheduling mode indicated in the first signaling. Furthermore, the UE could determine to use the UE autonomous resource selection mode to transmit the sidelink data if the attribute(s) of the sidelink data is associated with the UE autonomous resource selection mode indicated in the first signaling.

In one embodiment, the UE could transmit a sidelink information of the UE to the base station, wherein the sidelink information of the UE contains desired resource allocation mode(s) for at least one destination identity. The UE could include buffer status associated with the sidelink data in a sidelink buffer status report (SL BSR) for which the attribute(s) of the sidelink data is associated with the network scheduling mode. Alternatively, the UE may not include buffer status associated with the sidelink data in a sidelink buffer status report (SL BSR) for which the attribute(s) of the sidelink data is associated with the UE autonomous resource selection mode.

In one embodiment, the attribute(s) of the sidelink data could be associated with (both) the network scheduling mode and UE autonomous resource selection mode indicated in the first signaling. The UE could trigger a first sidelink buffer status report in response to the sidelink data becoming available for sidelink transmission. The UE could transmit a first MAC control element associated with the first sidelink buffer status report to a base station. The UE could perform a sidelink transmission to a second device transmitting all or part of the sidelink data via sidelink resource(s) selected by performing at least UE autonomous resource selection mode. The UE could trigger a second sidelink buffer status report in response to the sidelink transmission or in response to selection of the sidelink resource(s). The UE could transmit a second MAC control element associated with the second sidelink buffer status report to the base station.

In one embodiment, the UE could include a portion of data size of the sidelink data in a first MAC control element associated with the first sidelink buffer status report. The portion of data size could be a value smaller than or equal to the total size value of sidelink data available for sidelink transmission.

In one embodiment, the attribute(s) of the sidelink data could be associated with the network scheduling mode and UE autonomous resource selection mode indicated in the first signaling. The UE could trigger a first sidelink buffer status report in response to the sidelink data becoming available for sidelink transmission. The UE could perform a sidelink transmission to a second device transmitting all or part of the sidelink data via sidelink resource(s) selected by performing at least UE autonomous resource selection. The UE could cancel the first sidelink buffer status report in response to the sidelink transmission. The first device could cancel the first sidelink buffer status report when the first device selects the sidelink resource(s) that can accommodate the all or part of the sidelink data.

Referring back to FIGS. 3 and 4, in one exemplary embodiment of a UE, the device 300 includes a program code 312 stored in the memory 310. The CPU 308 could execute program code 312 to enable the UE (i) to receive a first signaling containing mapping between resource allocation mode(s) and attribute(s) of sidelink data of the UE from a base station, and (ii) to perform a sidelink transmission of the sidelink data based on the mapping between the resource allocation mode(s) and the attribute(s) of the sidelink data. Furthermore, the CPU 308 can execute the program code 312 to perform all of the above-described actions and steps or others described herein.

Figure 27:
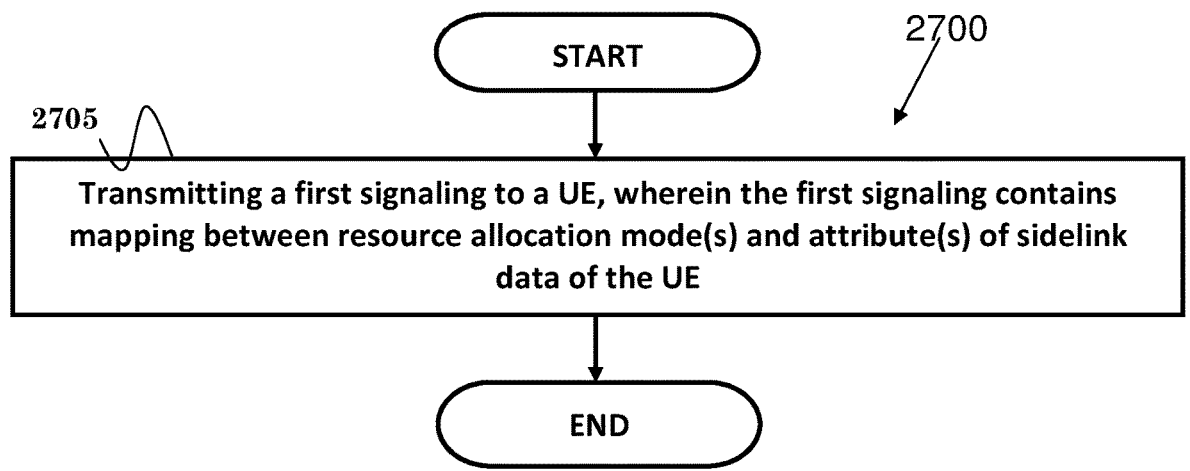
FIG. 27 is a flow chart according to one exemplary embodiment.

FIG. 27 is a flow chart 2700 according to one exemplary embodiment from the perspective of a network node. In step 2705, the network node transmits a first signaling to a UE, wherein the first signaling contains mapping between resource allocation mode(s) and attribute(s) of sidelink data of the UE.

In one embodiment, the network node could receive a sidelink information of the UE from the UE, wherein the sidelink information of the UE contains desired resource allocation mode(s) for at least one destination identity. The network node could configure the UE with the first signaling based on the sidelink information of the UE.

In one embodiment, the attribute(s) of the sidelink data could include: (i) a destination index corresponding to a destination identity associated with the sidelink data, (ii) a Sidelink Logical channel associated with the sidelink data, (iii) a logical channel group (LCG) ID of the sidelink data, (iv) Quality of Service (QoS) parameter(s) associated with the sidelink data, (v) PQI (PC5 QoS Identifier) or VQI (V2X 5G QoS Identifier) value(s) associated with the sidelink data, and/or (vi) Side Link Radio Bearer (SLRB) associated with the sidelink data.

In one embodiment, the resource allocation mode(s) could include network scheduling mode and/or UE autonomous resource selection mode. The network node could be a base station (e.g. gNB).

Referring back to FIGS. 3 and 4, in one exemplary embodiment of a network node, the device 300 includes a program code 312 stored in the memory 310. The CPU 308 could execute program code 312 to enable the network node to transmit a first signaling to a UE, wherein the first signaling contains mapping between resource allocation mode(s) and attribute(s) of sidelink data of the UE. Furthermore, the CPU 308 can execute the program code 312 to perform all of the above-described actions and steps or others described herein.

Figure 28:
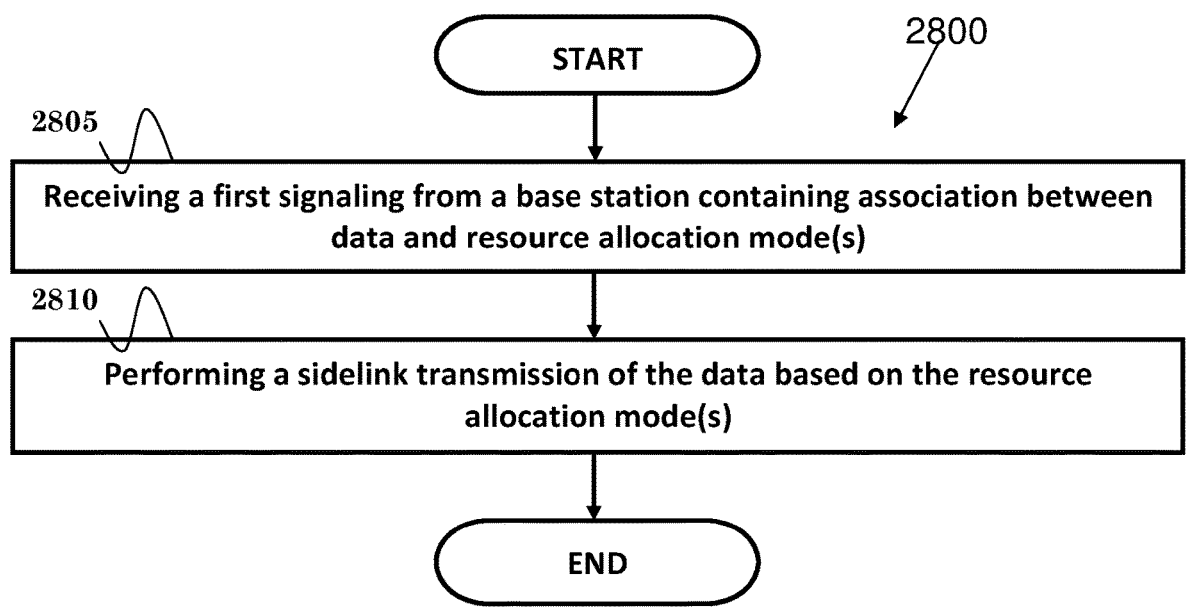
FIG. 28 is a flow chart according to one exemplary embodiment.

FIG. 28 is a flow chart 2800 according to one exemplary embodiment from the perspective of a UE. In step 2805, the UE receives a first signaling from a base station containing association between data and resource allocation mode(s). The first signaling from the base station could contain mode information. The mode information could contain a resource allocation mode and/or mapping between the resource allocation mode and attribute(s) of the data.

In step 2810, the UE performs a sidelink transmission of the data based on the resource allocation mode(s). In one embodiment, the UE could transmit a sidelink information of the UE to the base station. The sidelink information of the UE contains a list of carrier frequency(s), a list of destination identity or identities, and/or desired resource allocation mode(s) for at least one destination identity.

In one embodiment, the UE could consider using the resource allocation mode to transmit the data based on the mapping between the resource allocation mode and the attribute(s) of the data. The attribute(s) of data could include an destination identity of the data or an destination index associated with the destination identity of the data, LCG (Logical Channel Group) ID (Identity) of the data, QoS (Quality of Service) parameter(s) associated with the data, and/or 5QI or VQI value(s) of the data.

In one embodiment, the first signaling from the base station could contain a list of destination identity or identities. Each destination identity in the list of destination identity or identities could be associated with one resource allocation mode. The UE could consider using a network scheduling mode to transmit the data if the destination identity of the data is associated with the network scheduling mode indicated in the first signaling. The UE could consider using a UE autonomous resource selection mode to transmit the data if the destination identity of the data is associated with the UE autonomous resource selection mode indicated in the first signaling.

In one embodiment, the first signaling from the base station could contain a list of destination index(es) for one resource allocation mode. Each destination index in the list of destination index(es) is associated with at least one resource allocation mode. The UE could consider using a network scheduling mode to transmit the data associated with a destination identity if a destination index corresponding to the destination identity is associated with the network scheduling mode indicated in the first signaling. The UE could consider using an UE autonomous resource selection mode to transmit the data associated with a destination identity if a destination index corresponding to the destination identity is associated with the UE autonomous resource selection mode indicated in the first signaling.

In one embodiment, the first signaling from the base station could contain a list of LCG ID(s). Each LCG ID in the list of LCG ID(s) is associated with one resource allocation mode. The UE could consider using a network scheduling mode to transmit the data associated with a LCG if the LCG is associated with the network scheduling mode indicated in the first signaling. Furthermore, the UE could consider using a UE autonomous resource selection mode to transmit the data associated with a LCG if the LCG is associated with the UE autonomous resource selection mode indicated in the first signaling.

In one embodiment, the first signaling from the base station could contain at least one threshold value used to determine one resource allocation mode for the data based on comparison between the threshold and a LCG ID of the data. In one embodiment, the UE could consider using a network scheduling mode to transmit the data associated with a LCG ID if the LCG ID is higher than (or equal to) the threshold value for which the network scheduling mode is used. The UE could consider using a UE autonomous resource selection mode to transmit the data associated with a LCG ID if the LCG ID is higher than (or equal to) the threshold value for which the UE autonomous resource selection mode is used.

Alternatively, the UE could consider using a network scheduling mode to transmit the data associated with a LCG ID if the LCG ID is lower than (or equal to) the threshold value for which the network scheduling mode is used. The UE could consider a UE autonomous resource selection mode to transmit the data associated with a LCG ID if the LCG ID is lower than (or equal to) the threshold value for which the autonomous resource selection mode is used.

In one embodiment, the first signaling from the base station could contain a mapping between sidelink logical channel(s) and logical channel group(s) for one resource allocation mode. The UE could consider using a network scheduling mode to transmit the data associated with a sidelink logical channel if the sidelink logical channel is associated with a logical channel group and the network scheduling mode is used for the logical channel group. The UE could consider using a UE autonomous resource selection mode to transmit the data associated with a sidelink logical channel if the sidelink logical channel is associated with a logical channel group and the UE autonomous resource selection mode is used for the logical channel group.

In one embodiment, the first signaling from the base station could contain at least one list of sidelink logical channel ID(s) for one resource allocation mode. The UE could consider using a network scheduling mode to transmit the data associated with a sidelink logical channel ID if the logical channel ID is associated with the network scheduling mode indicated by the first signaling. The UE could consider using a UE autonomous resource selection mode to transmit the data associated with a sidelink logical channel ID if the sidelink logical channel ID is associated with the UE autonomous resource selection mode indicated by the first signaling.

In one embodiment, the first signaling from the base station could contain a list of QoS-related value(s) for one resource allocation mode. The UE could consider using a network scheduling mode to transmit the data associated with a QoS-related value if the QoS-related value is associated with the network scheduling mode indicated by the first signaling. The UE could consider using a UE autonomous resource selection mode to transmit the data associated with a QoS-related value if the QoS-related value is associated with the UE autonomous resource selection mode indicated by the first signaling. The QoS-related value(s) could be PPPP (ProSe Per-Packet Priority), PPPR (ProSe Per-Packet Reliability), and/or 5QI or VQI index(es). The destination identity could be a destination Layer-2 ID. The destination index(es) could be associated with an order of the list of destination identity or identities in the sidelink information of the UE.

In one embodiment, the data could be sidelink data. The resource allocation mode could a network scheduling mode and/or a UE autonomous resource selection mode. The signaling information of the UE could be SidelinkUEinformation.

In one embodiment, the base station could schedule sidelink resource(s) for the UE for sidelink transmission if the network scheduling mode is used for the sidelink transmission. Transmission of the data based on the network scheduling mode could be transmitted via resources scheduled by the base station or via resources selected by the UE. The network scheduling mode could be resource allocation mode 1. The UE autonomous resource selection mode could be resource allocation mode 2.

Referring back to FIGS. 3 and 4, in one exemplary embodiment of a UE, the device 300 includes a program code 312 stored in the memory 310. The CPU 308 could execute program code 312 to enable the UE (i) to receive a first signaling from a base station containing association between data and resource allocation mode(s), and (ii) to perform a sidelink transmission of the data based on the resource allocation mode(s). Furthermore, the CPU 308 can execute the program code 312 to perform all of the above-described actions and steps or others described herein.

According to 3GPP TR 23.786, it is possible to have a unified QoS model for PC5 and Uu, i.e. also use 5QIs for V2X communication over PC5, such that the application layer can have a consistent way of indicating QoS requirements regardless of the link used. For unicast type of traffic, the same QoS Model as that of Uu can be utilized, i.e. each of the unicast link could be treated as a bearer, and QoS flows could be associated with it. All the QoS characteristics defined in 5QI and the additional parameter of data rate could apply. In addition, the Minimum required communication range could be treated as an additional parameter specifically for PC5 use.

For broadcast traffic, there could be no bearer concept. Therefore, each of the message may have different characteristics according to the application requirements. The 5QI should then be used in the similar manner as that of the PPPP or PPPR, i.e. to be tagged with each of the packet. 5QI is able to represent all the characteristics needed for the PC5 broadcast operation, e.g. latency, priority, reliability, etc. A group of V2X broadcast specific 5QIs (i.e. VQIs) could be defined for PC5 use. Basically, the 5QIs used for PC5 (for V2X service) could be named as VQI.

Based on above description, there could be two QoS models for V2X service, one is packet per QoS flow and the other is packet per 5QI/VQI. In the following, details for both QoS models are introduced.

1. QoS Model 1: Packet is Per QoS Flow

The UE could initialize a V2X service. Basically, the UE could be configured with a QoS profile for the V2X service. The QoS profile could be provided by a network node (e.g. V2X Control Function) or preconfigured in the UE. In the QoS profile, PC5 QoS parameters used to associate a packet of the V2X service with a QoS flow could be included. The PC5 QoS parameters could include, for example, a 5QI and/or a VQI. The PC5 QoS parameters could include, for example, a PPPP and/or PPPR. Based on the QoS profile, the UE could map the packet of the V2X service to the QoS flow (when or after the packet is received from upper layer of the UE e.g. application layer).

The gNB could be aware of the QoS profile for the V2X service on the UE based on assistance information received from the UE or a network node (i.e. core network). In one embodiment, the assistance information could include the (part of) QoS profile. Based on the assistance information, the gNB could configure the UE with AS configuration used for sidelink communication for the V2X service.

In one embodiment, the AS configuration could include at least one of following information:

- A list of SLRB used for sidelink transmission or reception of the V2X service—The list of SLRB could include or configure a default SLRB. Alternatively, the list of SLRB could include or configure at least a non-default SLRB.
- A list of QoS flow used for sidelink transmission or reception of the V2X service
- An association between QoS flow and SLRB
  - With such association, the UE could map a QoS flow to a SLRB. In one embodiment, one QoS flow in the list could be mapped to a default SLRB or to a non-default SLRB. Alternatively, one QoS flow in the list could be mapped to neither a default SLRB nor a non-default SLRB. In this situation, the UE could map this QoS flow to the default SLRB.
  - In one embodiment, the UE could create a QoS flow which is not in the list. In this situation, the UE could map this QoS flow to a default SLRB. Multiple QoS flows in the list could be mapped to one SLRB.
- An association between SLRB and logical channel group (LCG)
  - With such association, the UE could map a SLRB to a LCG. In general, a SLRB for a QoS flow associated with critical/important 5QI/VQI will be mapped to a LCG associated with higher priority, and a SLRB for a QoS flow associated with not critical/important 5QI/VQI will be mapped to a LCG associated with lower priority.
  - In one embodiment, a SLRB may not be mapped to a LCG. In this situation, the UE may not report buffer status for this SLRB in a SL BSR to the gNB. The UE could perform sidelink transmission of traffic on this SLRB based on (only) Mode2 sidelink resources.
  - For a SLRB mapped to a LCG, the UE could report buffer status for this SLRB in a SL BSR to the gNB. And the gNB could allocate the UE with Mode1 sidelink resources for transmitting the SLRB based on the SL BSR.
- An indication used to indicate if the UE can perform sidelink transmission based on Mode2 sidelink resources for a SLRB or a logical channel group (LCG) (that implies this SLRB or LCG can be also transmitted based on Mode1 sidelink resource, and the other SLRB or LCG can be transmitted based on only Mode1 sidelink resource), or based on only Mode1 sidelink resources for the SLRB or the LCG (that implies the other SLRB or LCG can be transmitted based on Mode1/Mode2 sidelink resource)
  - For example, there are a first SLRB or LCG and a second SLRB or LCG on the UE. The first SLRB or LCG is not indicated that it can be transmitted based on Mode2 sidelink resources. The second SLRB or LCG is indicated that it can be transmitted based on Mode2 sidelink resources. By this way, the gNB could (just or only) allocate the UE with Mode1 sidelink resources for transmitting the first SLRB/LCG.

In one embodiment, the gNB could (also) allocate the UE with Mode1 sidelink resources for transmitting the second SLRB or LCG. The UE can use the Mode1 sidelink resources for transmitting the first SLRB or LCG (and the second SLRB or LCG). The UE can use Mode2 sidelink resources for transmitting the second SLRB or LCG if the Mode 1 sidelink resources are not enough for transmitting the second SLRB or LCG or the UE has no Mode 1 sidelink resources for transmitting the second SLRB or LCG. In this situation, the buffer size of the second SLRB or LCG could be changed, and the UE would not need to trigger (a regular) SL BSR to indicate the gNB that the buffer size of the second SLRB or LCG is changed (i.e. pending traffic for transmission become less). However, the UE may be able to indicate the gNB that the buffer size of the second SLRB or LCG is changed via a periodic SL BSR or a padding SL BSR.

Basically, the SLRB or LCG may not indicated that it can be transmitted based on Mode2 sidelink resources could be used to transmit a QoS flow associated with critical or important 5QI or VQI. The UE may not use Mode2 sidelink resources for transmitting such SLRB/LCG (e.g. the first SLRB or LCG in the example). In other words, the UE could (only) use Mode1 sidelink resources for transmitting such SLRB or LCG (e.g. the first SLRB/LCG in the example).

If the UE has an UL resources for an uplink transmission to the gNB and the UL resources can accommodate a SL BSR including buffer status for both the first LCG and the second LCG, the UE could include the buffer status for both the first LCG and the second LCG in the SL BSR; Otherwise, the UE could prioritize to include the first LCG in the SL BSR (because buffer status of a SLRB served by only Mode1 sidelink resource should be prioritized than buffer status of a SLRB served by Mode2 sidelink resource).

- An association between a SR configuration and a SLRB or a QoS flow
  - In one embodiment, a SLRB associated with a QoS flow for critical or important 5QI or VQI could be configured with a SR configuration. Multiple SLRBs could be configured with same SR configuration. A SLRB associated with a QoS flow for non-critical or unimportant 5QI or VQI may not be configured with any SR configuration.
  - In one embodiment, a QoS flow associated with critical or important 5QI or VQI could be configured with a SR configuration. Multiple QoS flows could be configured with same SR configuration. A QoS flow not associated with critical or important 5QI or VQI may not be configured with any SR configuration.
  - The UE could trigger or perform a SR transmission to the gNB based on a SR configuration if or when a SLRB has data available for transmission and the SR configuration is associated with the SLRB.
  - The UE could trigger or perform a SR transmission to the gNB based on a SR configuration if or when the UE has data, which is associated with a QoS flow, available for transmission and the SR configuration is associated with the QoS flow.

Figure 29:
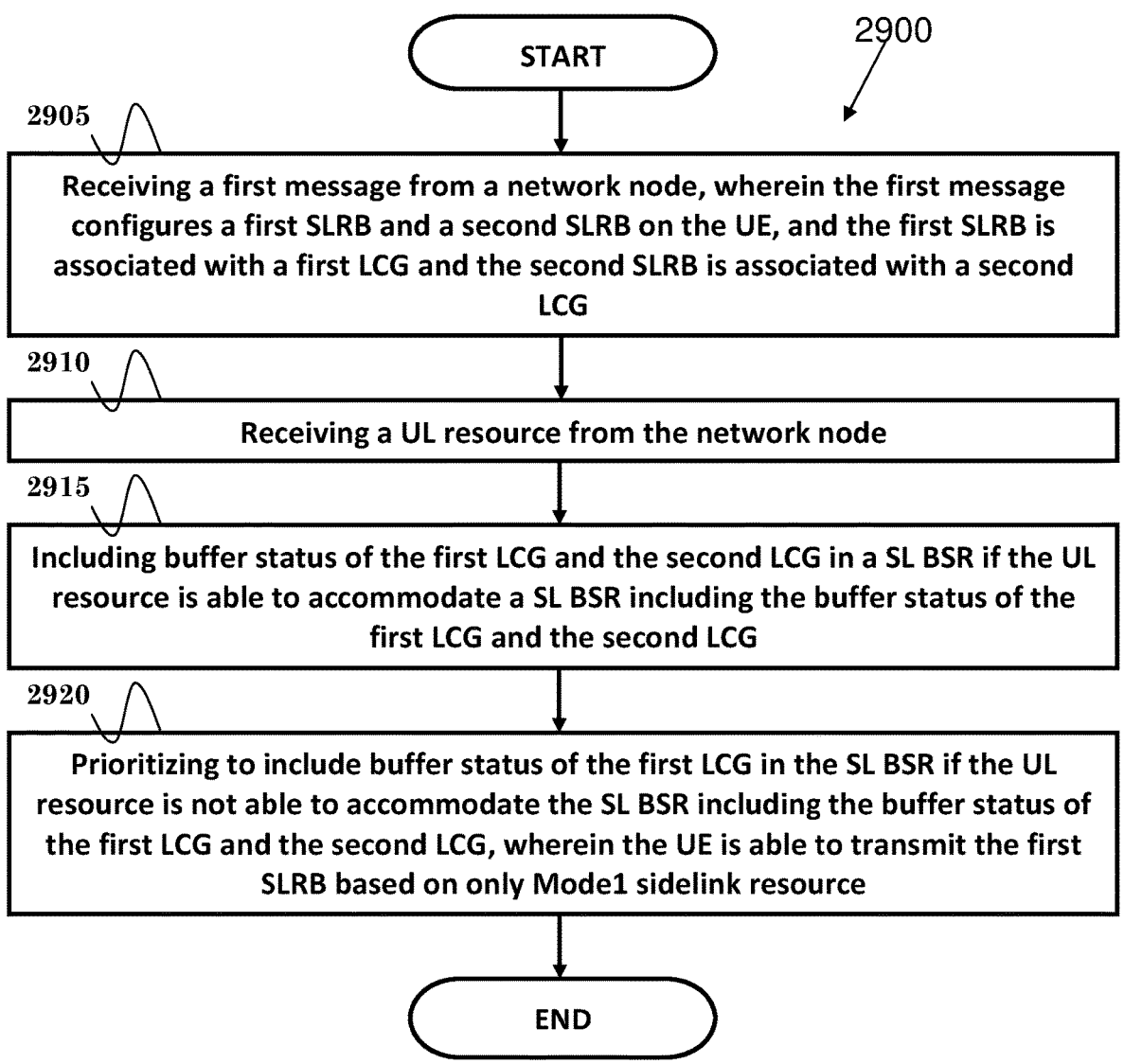
FIG. 29 is a flow chart according to one exemplary embodiment.

FIG. 29 is a flow chart 2900 according to one exemplary embodiment from the perspective of a UE for reporting buffer status for sidelink transmission. In step 2905, the UE receives a first message from a network node, wherein the first message configures a first SLRB and a second SLRB on the UE, and the first SLRB is associated with a first LCG and the second SLRB is associated with a second LCG. In step 2910, the UE receives a UL (Uplink) resource from the network node. In step 2915, the UE includes buffer status of the first LCG and the second LCG in a SL BSR if the UL resource is able to accommodate a SL BSR including the buffer status of the first LCG and the second LCG. In step 2920, the UE prioritizes to include buffer status of the first LCG in the SL BSR if the UL resource is not able to accommodate the SL BSR including the buffer status of the first LCG and the second LCG, wherein the UE is able to transmit the first SLRB based on only Mode1 sidelink resource.

In one embodiment, the UE could transmits the SL BSR to the network node based on the UL resources. The UE may be able to transmit the second SLRB based on Mode1 sidelink resource or Mode2 sidelink resource.

In one embodiment, the UE could prioritize to include the buffer status of the first LCG in the SL BSR because buffer status of a SLRB served by only Mode1 sidelink resource has higher prioritized than buffer status of a SLRB served by Mode2 sidelink resource.

In one embodiment, the first message could be a RRC (Radio Resource Control) message. The network node could be a base station (e.g. gNB).

Referring back to FIGS. 3 and 4, in one exemplary embodiment of a UE for reporting buffer status for sidelink transmission, the device 300 includes a program code 312 stored in the memory 310. The CPU 308 could execute program code 312 to enable the UE (i) to receive a first message from a network node, wherein the first message configures a first SLRB and a second SLRB on the UE, and the first SLRB is associated with a first LCG and the second SLRB is associated with a second LCG, (ii) to receive a UL (Uplink) resource from the network node, (iii) to include buffer status of the first LCG and the second LCG in a SL BSR if the UL resource is able to accommodate a SL BSR including the buffer status of the first LCG and the second LCG, and (iv) to prioritize to include buffer status of the first LCG in the SL BSR if the UL resource is not able to accommodate the SL BSR including the buffer status of the first LCG and the second LCG, wherein the UE is able to transmit the first SLRB based on only Mode1 sidelink resource. Furthermore, the CPU 308 can execute the program code 312 to perform all of the above-described actions and steps or others described herein.

2. QoS Model 2: Packet is Per 5QI/VQI

The UE could initialize a V2X service. Basically, the UE could be configured with a QoS profile for the V2X service. The QoS profile could be provided by a network node (e.g. V2X Control Function) or preconfigured in the UE. In the QoS profile, PC5 QoS parameters could be included. The PC5 QoS parameters could include e.g a 5QI and/or a VQI. The PC5 QoS parameters could include (e.g. a PPPP and/or PPPR).

The gNB may be aware of the QoS profile for the V2X service on the UE based on assistance information received from the UE or a network node (i.e. core network). In one embodiment, the assistance information could include the (part of) QoS profile. Based on the assistance information, the gNB could configure the UE with AS configuration used for sidelink communication for the V2X service.

In one embodiment, the AS configuration could include at least one of following information:
  A list of SLRB used for sidelink transmission/reception of the V2X service
    The list of SLRB could include or configure a default SLRB and/or at least a non-default SLRB.
  A list of PC5 QoS parameters used for sidelink transmission/reception of the V2X service
  An association between PC5 QoS parameter and SLRB
    With such association, the UE could map a packet to a SLRB based on the PC5 QoS parameter. One PC5 QoS parameter in the list could be mapped to a default SLRB or to a non-default SLRB.
    Alternatively, one PC5 QoS parameter in the list could be mapped to neither a default SLRB nor a non-default SLRB. In this situation, the UE could map this PC5 QoS parameter to the default SLRB.
    The UE could be (pre-)configured with a PC5 QoS parameter which is not included in the list. In this situation, the UE could map this PC5 QoS parameter to a default SLRB. Multiple PC5 QoS parameters in the list could be mapped to one SLRB.
  An association between SLRB and logical channel group (LCG)
    With such association, the UE could map a SLRB to a LCG. In general, a SLRB for a PC5 QoS parameter used for critical or important V2X service will be mapped to a LCG associated with higher priority, and a SLRB for a PC5 QoS parameter for not critical or important V2X service will be mapped to a LCG associated with lower priority.
    In one embodiment, a SLRB may not be mapped to a LCG. In this situation, the UE may not report buffer status for this SLRB in a SL BSR to the gNB. The UE could perform sidelink transmission of traffic on this SLRB based on (only) Mode2 sidelink resources.
    For a SLRB mapped to a LCG, the UE could report buffer status for this SLRB in a SL BSR to the gNB. And the gNB could (just or only) allocate the UE with Mode1 sidelink resources for transmitting the SLRB based on the SL BSR.
  An indication used to indicate if the UE can perform sidelink transmission based on Mode2 sidelink resources for a SLRB or a logical channel group (LCG) (that implies this SLRB or LCG can be also transmitted based on Mode1 sidelink resource, and the other SLRB or LCG can be transmitted based on only Mode1 sidelink resource), or based on only Mode1 sidelink resources for the SLRB or the LCG (that implies the other SLRB or LCG can be transmitted based on Mode1 or Mode2 sidelink resource)
    For example, there could be a first SLRB or LCG and a second SLRB or LCG on the UE. The first SLRB or LCG may not indicate that it can be transmitted based on Mode2 sidelink resources. The second SLRB or LCG could indicate that it can be transmitted based on Mode2 sidelink resources. By this way, the gNB could (just or only) allocate the UE with Mode1 sidelink resources for transmitting the first SLRB or LCG. In one embodiment, the gNB could (also) allocate the UE with Mode1 sidelink resources for transmitting the second SLRB or LCG. The UE can use the Mode1 sidelink resources for transmitting the first SLRB or LCG (and the second SLRB or LCG). The UE can use Mode2 sidelink resources for transmitting the second SLRB or LCG if the Mode 1 sidelink resources is not enough for transmitting the second SLRB or LCG or the UE has no Mode 1 sidelink resources for transmitting the second SLRB or LCG. In this situation, the buffer size of the second SLRB or LCG could be changed. The UE may not need to trigger (a regular) SL BSR to indicate the gNB that the buffer size of the second SLRB or LCG is changed (i.e. pending traffic for transmission become less). However, the UE may be able to indicate the gNB that the buffer size of the second SLRB or LCG is changed via a periodic SL BSR or a padding SL BSR.

Basically, the SLRB or LCG not indicated that it can be transmitted based on Mode2 sidelink resources could be used to transmit a packet associated with critical or important PC5 QoS parameters. The UE may not use Mode2 sidelink resources for transmitting such SLRB or LCG (e.g. the first SLRB or LCG in the example). In other words, the UE could (only) use Mode1 sidelink resources for transmitting such SLRB or LCG (e.g. the first SLRB or LCG in the example).

If the UE has an UL resources for an uplink transmission to the gNB and the UL resources can accommodate a SL BSR including buffer status for both the first LCG and the second LCG, the UE includes the buffer status for both the first LCG and the second LCG in the SL BSR; Otherwise, the UE could prioritize to include the first LCG in the SL BSR (because buffer status of a SLRB served by only Mode1 sidelink resource should be prioritized than buffer status of a SLRB served by Mode2 sidelink resource).

An association between a SR configuration and a SLRB or a PC5 QoS parameter

In one embodiment, a SLRB associated with a critical or important PC5 QoS parameter could be configured with a SR configuration. Multiple SLRBs could be configured with same SR configuration. A SLRB not associated with a critical or important PC5 QoS parameters may not be configured with any SR configuration.

A critical or important PC5 QoS parameter could be configured with a SR configuration. Multiple PC5 QoS parameters could be configured with same SR configuration. A non-critical or unimportant PC5 QoS parameter may not be configured with any SR configuration.

The UE could trigger or perform a SR transmission to the gNB based on a SR configuration if or when a SLRB has data available for transmission and the SR configuration is associated with the SLRB.

The UE could trigger or perform a SR transmission to the gNB based on a SR configuration if or when the UE has data, which is associated with a PC5 QoS parameter, available for transmission and the SR configuration is associated with the PC5 QoS parameter.

If a UE is configured with Mode 1 and Mode 2 at the same time, and sidelink data associated with a service could be transmitted via both Mode 1 and Mode 2 resources, several issues may occur regarding accurate network resource scheduling.

Figure 30:
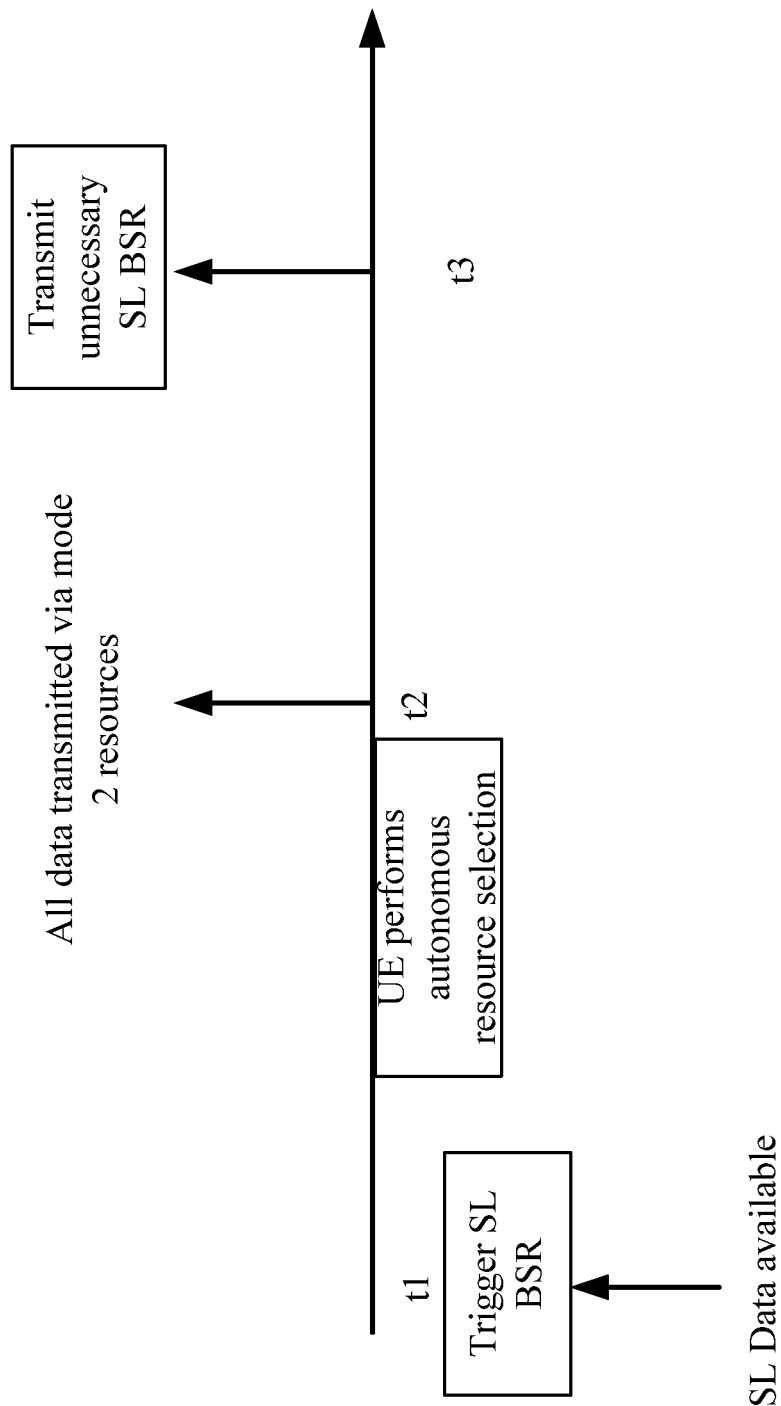
FIG. 30 is a diagram according to one exemplary embodiment.

One exemplary issue is shown in FIG. 30. A sidelink buffer status report is triggered at a timing t1 when sidelink data, for a sidelink logical channel of a (ProSe) Destination, becomes available and the data belongs to a sidelink logical channel with higher priority than priorities of the sidelink logical channels which belong to any LCG belonging to the same destination and for which data is already available for transmission (or there is currently no data available for transmission for any of the sidelink logical channels belonging to the same (ProSe) Destination). The UE selects sidelink transmission resources via Mode 2 and transmit all of the sidelink data available at a timing t2. The UE then transmits a redundant sidelink buffer status report MAC control element (e.g. buffer size=0) to a base station at t3.

Figure 31:
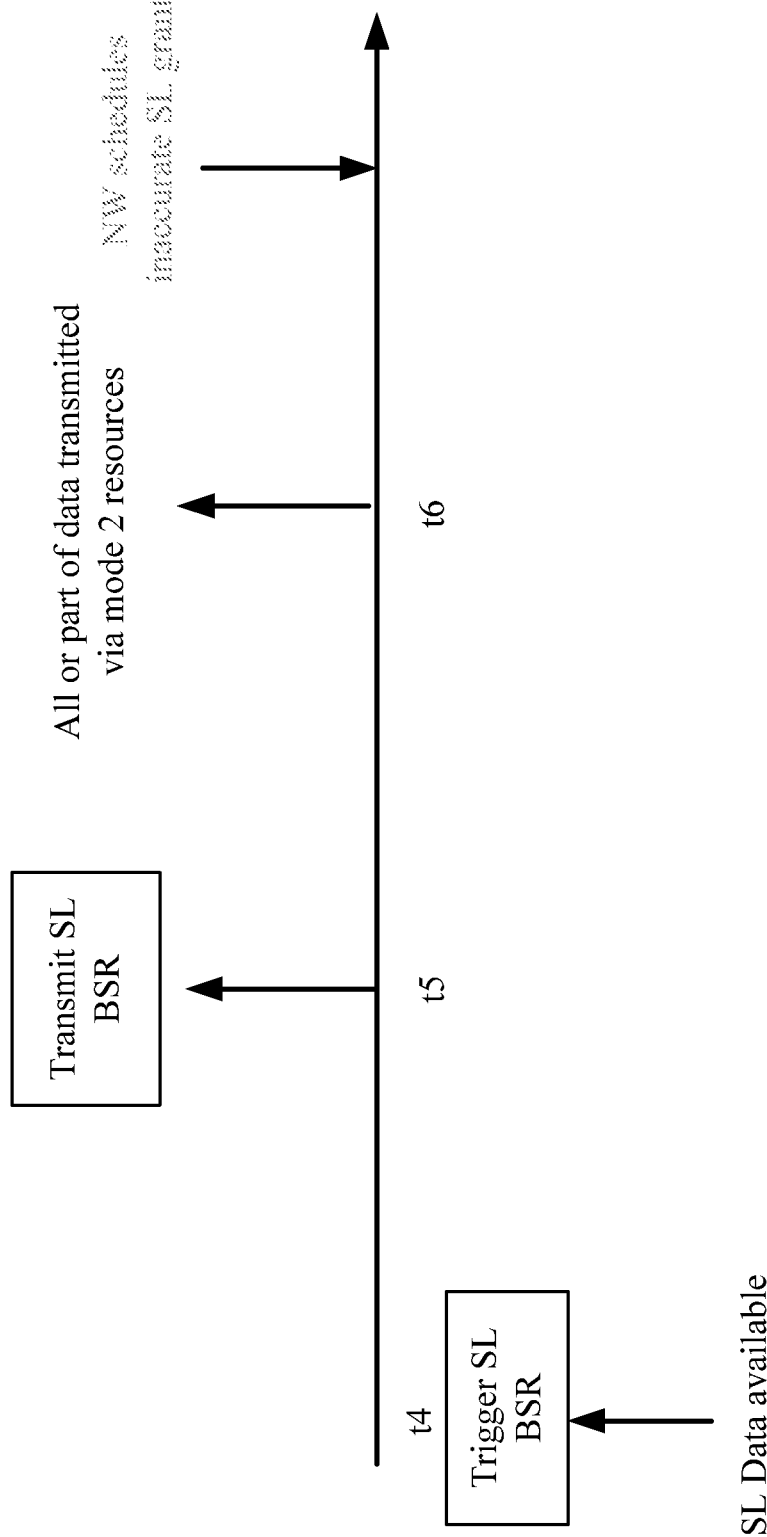
FIG. 31 is a diagram according to one exemplary embodiment.

Another exemplary issue is shown in FIG. 31. A sidelink buffer status report is triggered at a timing t4 when sidelink data, for a sidelink logical channel of a (ProSe) Destination, becomes available and the data belongs to a sidelink logical channel with higher priority than priorities of the sidelink logical channels which belong to any LCG belonging to the same destination and for which data is already available for transmission (or there is currently no data available for transmission for any of the sidelink logical channels belonging to the same (ProSe) Destination). The UE transmits the sidelink Buffer Status Report MAC control element to a base station at a timing t5. The UE then selects sidelink transmission resources via Mode 2 and transmits all (or part of) the sidelink data at a timing t6 before receiving sidelink grant scheduled by the base station. The base station, without knowing the UE already transmitted the sidelink data, may schedule inaccurate sidelink grant for the UE, e.g. redundant sidelink grant or sidelink grant scheduling more resources than needed. It may induce resource waste.

In LTE sidelink buffer status reporting, if number of bits in an UL grant is smaller than a size of a Sidelink BSR containing buffer status for all LCGs having data available for transmission plus its subheader, a UE could report Truncated Sidelink BSR containing buffer status for as many LCGs having data available for transmission as possible, taking the number of bits in the UL grant into consideration. In LTE sidelink buffer status report MAC control element (MAC CE), buffer sizes of LCGs are included in decreasing order of the highest priority of the sidelink logical channel belonging to the LCG irrespective of the value of the Destination Index field.

In NR sidelink, sidelink buffer status reporting is supported for NR sidelink broadcast, groupcast and unicast in NR MAC. Different cast types (e.g. broadcast, groupcast and unicast) may have different priorities. Including data status in buffer status report MAC CE without considering cast type(s) corresponding to the data may cause the UE not able to report data sizes of important data to a base station.

In addition, since a sidelink buffer status report may not be able to accommodate data size(s) information for all destination(s) with data available due to number of bits in an UL grant, it may be helpful to include an indication (e.g. a bitmap) to indicate the buffer status for all (or part of) destination associated with a UE in a buffer status report.

To solve the issue(s) mentioned above, one general concept of the invention is that a UE could cancel a triggered sidelink buffer status report when (or in response to) the UE transmits all pending data available for sidelink transmission using sidelink resources associated with UE autonomous resource selection mode, wherein the UE is configured to (be able to) perform network scheduling mode and UE autonomous resource selection mode for sidelink transmission at a same time.

In one embodiment, the UE could cancel all triggered pending scheduling request(s) corresponding to the triggered sidelink buffer status report. The correspondence could be determined based on a scheduling request configuration index included in a configuration of sidelink logical channel. Alternatively, the UE could cancel all pending scheduling request(s) for sidelink buffer status report(s).

Additionally or alternatively, the UE could transmit all sidelink data available for sidelink transmission using both sidelink resource(s) associated with UE autonomous resource selection mode and sidelink resource(s) associated with network scheduling mode. Additionally or alternatively, the UE could cancel the triggered sidelink buffer status report when the UE selects sidelink resources using UE autonomous resource selection mode, and the sidelink resources could accommodate all sidelink data available for sidelink transmission.

In one embodiment, the UE could cancel all triggered pending scheduling request(s) corresponding to the triggered sidelink buffer status report. The correspondence could be determined based on a scheduling request configuration index included in a configuration of sidelink logical channel or sidelink radio bearer. Alternatively, the correspondence could be determined based on a scheduling request configuration index included in a configuration of a sidelink destination. Alternatively, the UE could cancel all pending scheduling request(s) for sidelink buffer status report(s).

In one embodiment, the sidelink resource could be a sidelink grant corresponding to single MAC (Medium Access Control) PDU (Packet Data Unit) transmission. Alternatively, the sidelink resources are a sidelink grant corresponding to multiple MAC PDU transmissions.

Figure 32:
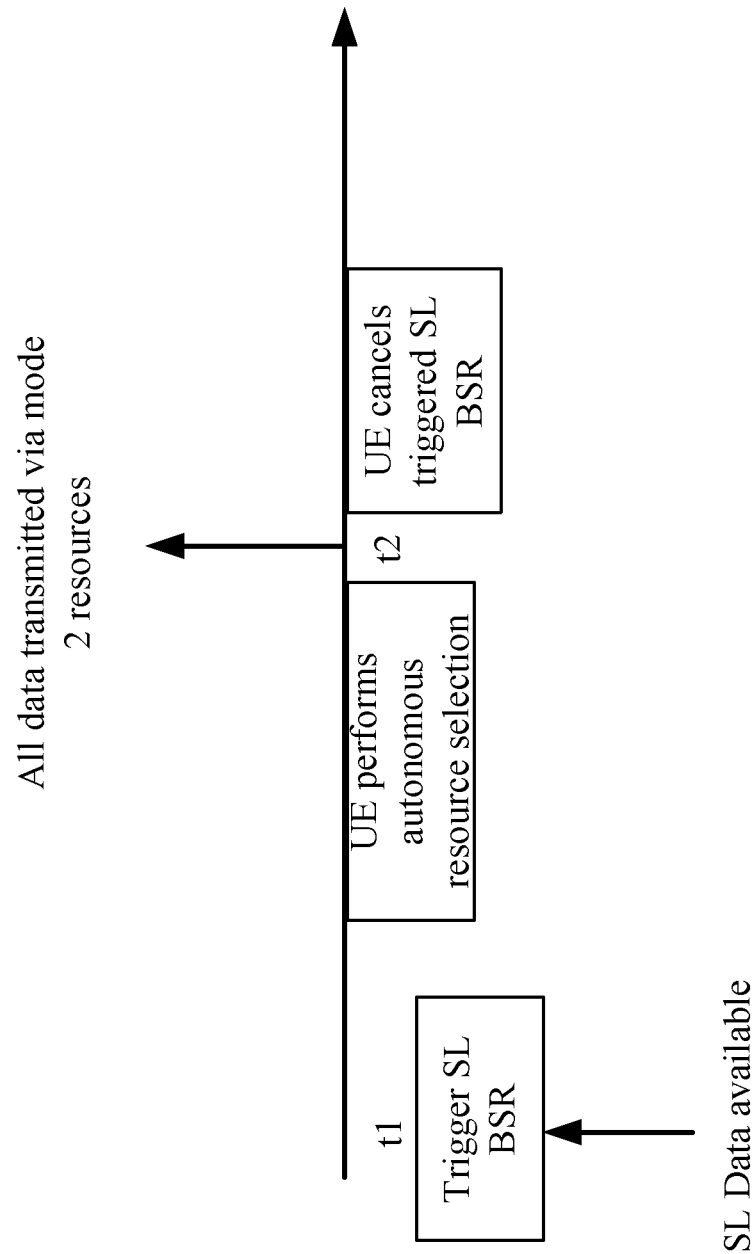
FIG. 32 is a diagram according to one exemplary embodiment.

An example of the general concept is illustrated in FIG. 32. A UE configured to (be able to) perform both network scheduling mode and UE autonomous resource selection mode for sidelink transmission at a same time triggers a sidelink buffer status report in response to sidelink (SL) data available at a timing t1. The UE selects resource(s) for sidelink transmission according to UE autonomous resource selection mode and transmit all sidelink data available at a timing t2. After transmitting all the sidelink data available when the trigger SL BSR was triggered, the UE cancels the triggered SL BSR.

Another general concept of the invention is that after transmitting a first sidelink buffer status report, a UE could trigger a second sidelink buffer status report in response to a change in the size of data available for sidelink transmission. The change could be caused by the UE transmitting data available for sidelink transmission using resource(s) associated with at least UE autonomous resource selection mode.

In one embodiment, the change could be over a threshold (e.g. a threshold configured by a base station or a threshold predefined). The threshold could be boundary of buffer size index reported in last sidelink BSR MAC CE. The threshold may be a percentage (e.g. 50%) or a specific amount of data (e.g. 1000 bytes).

In one embodiment, the change may mean that remaining data available for sidelink transmission is lower than a threshold. The threshold may be a percentage (e.g. 10%) or a specific amount of data (e.g. 200 bytes). The change may be caused by the UE transmitting the data available for sidelink transmission using resource(s) associated with UE autonomous resource selection mode.

Another general concept of the invention is that after transmitting a first sidelink buffer status report to a base station, a UE could trigger a second sidelink buffer status report when the UE transmits all sidelink data available for sidelink transmission, wherein the UE is configured with network scheduling mode and UE autonomous resource selection mode at a same time. In one embodiment, the second sidelink buffer status report is a regular sidelink BSR. The second sidelink buffer status report could trigger a scheduling request.

More specifically, the UE could transmit all sidelink data available for sidelink transmission using sidelink resource(s) selected using UE autonomous resource selection mode. Additionally or alternatively, the UE could transmit all sidelink data available for sidelink transmission using both sidelink resource(s) selected via UE autonomous resource selection mode and sidelink resource(s) scheduled by the base station via network scheduling mode. Additionally or alternatively, after transmitting a first sidelink buffer status report, the UE could trigger a second sidelink buffer status report when the UE selects sidelink resource(s) that could accommodate all sidelink data available for sidelink transmission.

In one embodiment, the sidelink resource could be a sidelink grant corresponding to single MAC PDU transmission. Alternatively, the sidelink resources are a sidelink grant corresponding to multiple MAC PDU transmissions. Additionally or alternatively, after transmitting a first sidelink buffer status report to a base station, a UE could trigger a second sidelink buffer status report when the UE transmits part of sidelink data available for sidelink transmission, wherein the UE is configured with network scheduling mode and UE autonomous resource selection mode at a same time. In one embodiment, the part of sidelink data available for sidelink transmission could be partially or completely taken into account in the first sidelink buffer status report.

More specifically, the UE could transmit the part of sidelink data available for sidelink transmission using sidelink resource(s) selected using UE autonomous resource selection mode. Additionally or alternatively, the UE could transmit the part of sidelink data available for sidelink transmission using both sidelink resource(s) selected via UE autonomous resource selection mode and sidelink resource(s) scheduled by the base station via network scheduling mode. Additionally or alternatively, after transmitting a first sidelink buffer status report, the UE could trigger a second sidelink buffer status report when the UE selects sidelink resource(s) using UE autonomous resource selection mode that could accommodate the part of sidelink data available for sidelink transmission.

Figure 33A:
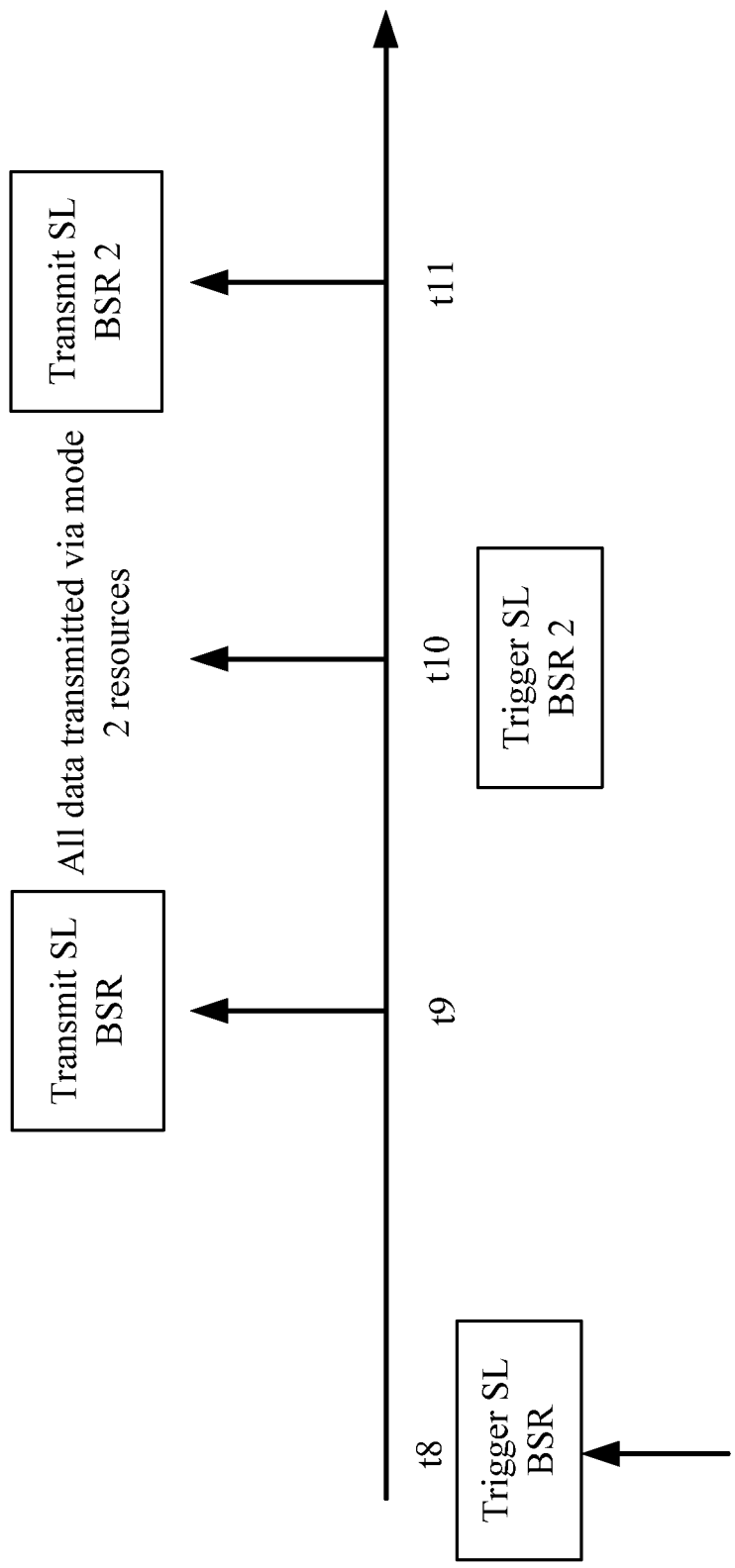
FIGS. 33A and 33B are diagrams according to one exemplary embodiment.
Figure 33B:
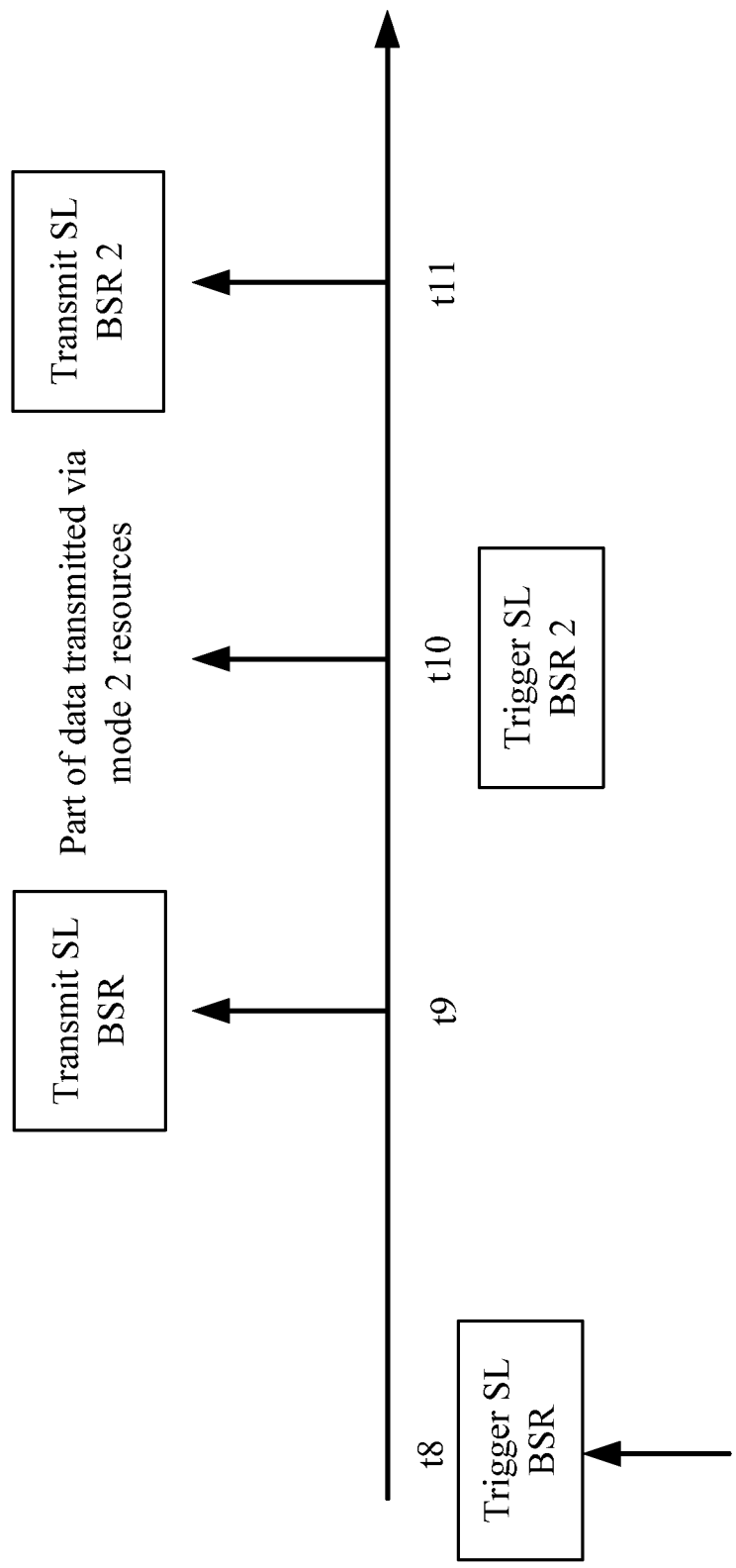

An example of the general concept could be illustrated in FIGS. 33A and 33B. A UE could trigger a first sidelink BSR in response to sidelink data available for sidelink transmission at a timing t8. After transmitting the first sidelink BSR MAC CE at a timing t9, the UE could transmit all or part of sidelink data available for sidelink transmission at t10. The UE could then trigger a second sidelink BSR and transmits a second sidelink BSR MAC CE at t11.

The sidelink data available for transmission could be pending on the UE before the first sidelink BSR is triggered, after the first sidelink BSR is triggered, or after the first sidelink BSR is transmitted.

Figure 34:
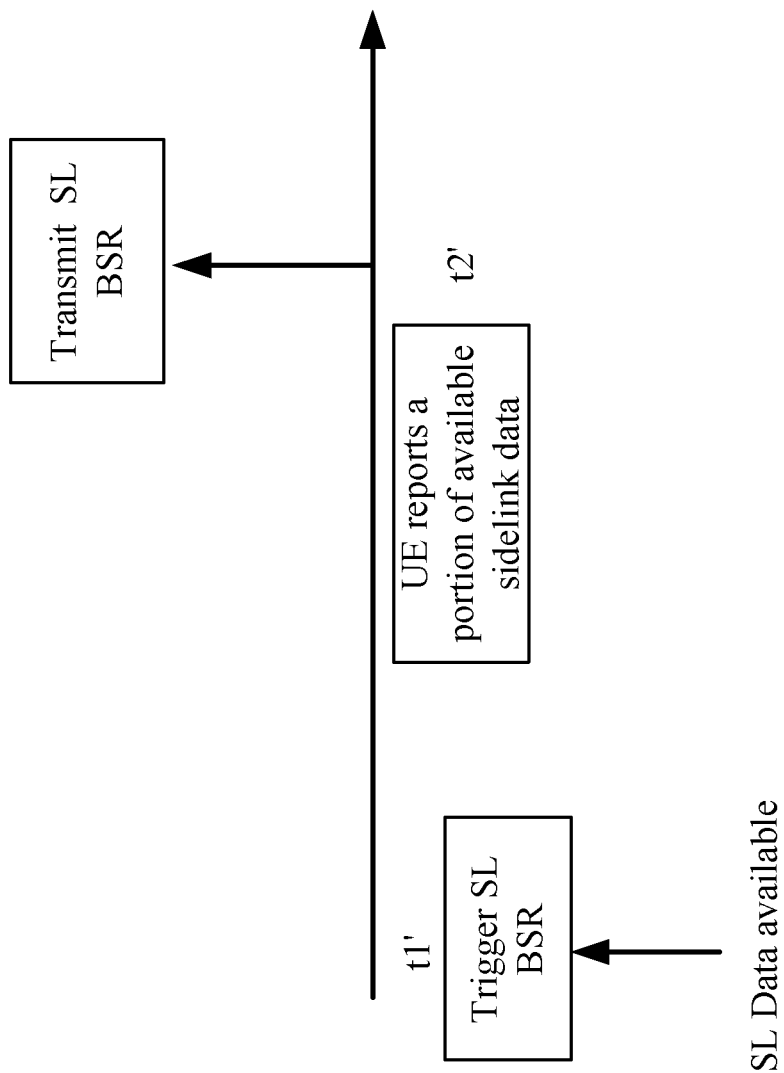
FIG. 34 is a diagram according to one exemplary embodiment.

Another general concept of the invention is that a UE could report size of a proportion or portion of pending sidelink data in a sidelink buffer status report, wherein the UE is configured to (be able to) perform network scheduling mode and UE autonomous resource selection mode at a same time. An example of the general concept is shown in FIG. 34. In one embodiment, the proportion or portion of pending sidelink data may not be transmitted based on sidelink resources determined by UE autonomous resource selection mode. The proportion or portion of pending sidelink data could be reported if the UE has sidelink data (for a destination and/or a sidelink logical channel) over a threshold (e.g. 1000 bytes).

In one embodiment, the size of the proportion or portion of pending sidelink data could be a value equal to the threshold or will not be over the threshold. The sidelink data could be transmitted via both resource(s) associated with UE autonomous resource selection mode and network scheduling mode.

Another general concept of the invention is that a UE could not trigger a sidelink buffer status report if the UE is configured to (be able to) perform network scheduling mode and UE autonomous resource selection mode at a same time. In one embodiment, the sidelink buffer status report could refer to regular sidelink BSR. Additionally or alternatively, the UE may not trigger a sidelink buffer status report in response to sidelink data becoming available for transmission, wherein the sidelink data could be transmitted via resource(s) associated with (both) network scheduling mode and UE autonomous resource selection mode. The sidelink data could be associated with at least one sidelink logical channel. The at least one sidelink logical channel could be associated with (both) network scheduling mode and UE autonomous resource selection mode.

Another general concept of the invention is that a base station could configure a same resource allocation mode for available carrier(s) of a same service (for a UE). For example, sidelink data associated with a service could be transmitted via a set of carrier(s). The base station could configure the same resource allocation mode for all carrier(s) in the set of carrier(s). The base station may not configure different resource allocation mode for carrier(s) associated with at least one same service.

Another general concept of the invention is that a UE could include data information of available data available for sidelink transmission in a sidelink buffer status report according to a specific order, wherein the order could be at least based on cast type(s) associated with the data. For example, the UE could include data information of data associated with unicast before data information of data associate with broadcast. Furthermore, the UE could include data information of data associated with unicast before data information of data associated with groupcast. In addition, the UE could include data information of data associated with groupcast before data information of data associated with broadcast.

As another example, the UE could include data information of data associated with broadcast before data information of data associate with unicast. Furthermore, the UE could include data information of data associated with groupcast before data information of data associated with unicast. In addition, the UE could include data information of data associated with broadcast before data information of data associated with groupcast.

In one embodiment, the data could be sidelink data. Data information could be buffer size of data available for sidelink transmission. Data information could be destination identity associated with the data. The cast type(s) could be any of unicast, broadcast, or groupcast.

Another general concept of the invention is that a UE could transmit a MAC control element (e.g. sidelink buffer status report), wherein the MAC control element includes a bitmap, with each destination identity in a set of destination identity(s) corresponding to a bit in the bitmap. Each destination identity in the set of destination identity(s) could be corresponding to a destination Layer-2 ID associated with a service identifier configured in the UE. The service identifier could be a V2X service identifier. In one embodiment, sidelink data associated with the destination Layer-2 ID may be delivered via sidelink broadcast transmission.

Each destination identity in the set of destination identity(s) could be corresponding to a destination Layer-2 ID associated with a group identifier configured in the UE. The group identifier could be a V2X sidelink group identifier. In one embodiment, sidelink data associated with the destination Layer-2 ID may be delivered via sidelink groupcast transmission.

Each destination identity in the set of destination identity(s) could be corresponding to a destination Layer-2 ID associated with a device identifier. In one embodiment, sidelink data associated with the destination Layer-2 ID may be delivered via sidelink unicast transmission.

An example could be shown in FIG. 35. A UE could have available sidelink data associated with destination with destination identity 1 and 3. The UE could assemble a MAC control element including a bitmap indicating there are data available for destination with destination index 1 and 3 (e.g. set the corresponding bit value to '1') and no data available for other destination (e.g. set the corresponding bit value to '0'). The resource allocation mode could be network scheduling mode. In one embodiment, the network scheduling mode could mean Mode 1.

The resource allocation mode could be UE autonomous resource selection mode. In one embodiment, the UE autonomous resource selection mode could mean Mode 2. The UE autonomous resource selection mode could mean any of Mode 2(a), 2(c), or 2(d). In one embodiment, the UE autonomous resource selection mode could mean UE resource determination mode.

All or any of above concepts could be combined to a new embodiment and/or a new concept.

Figure 36:
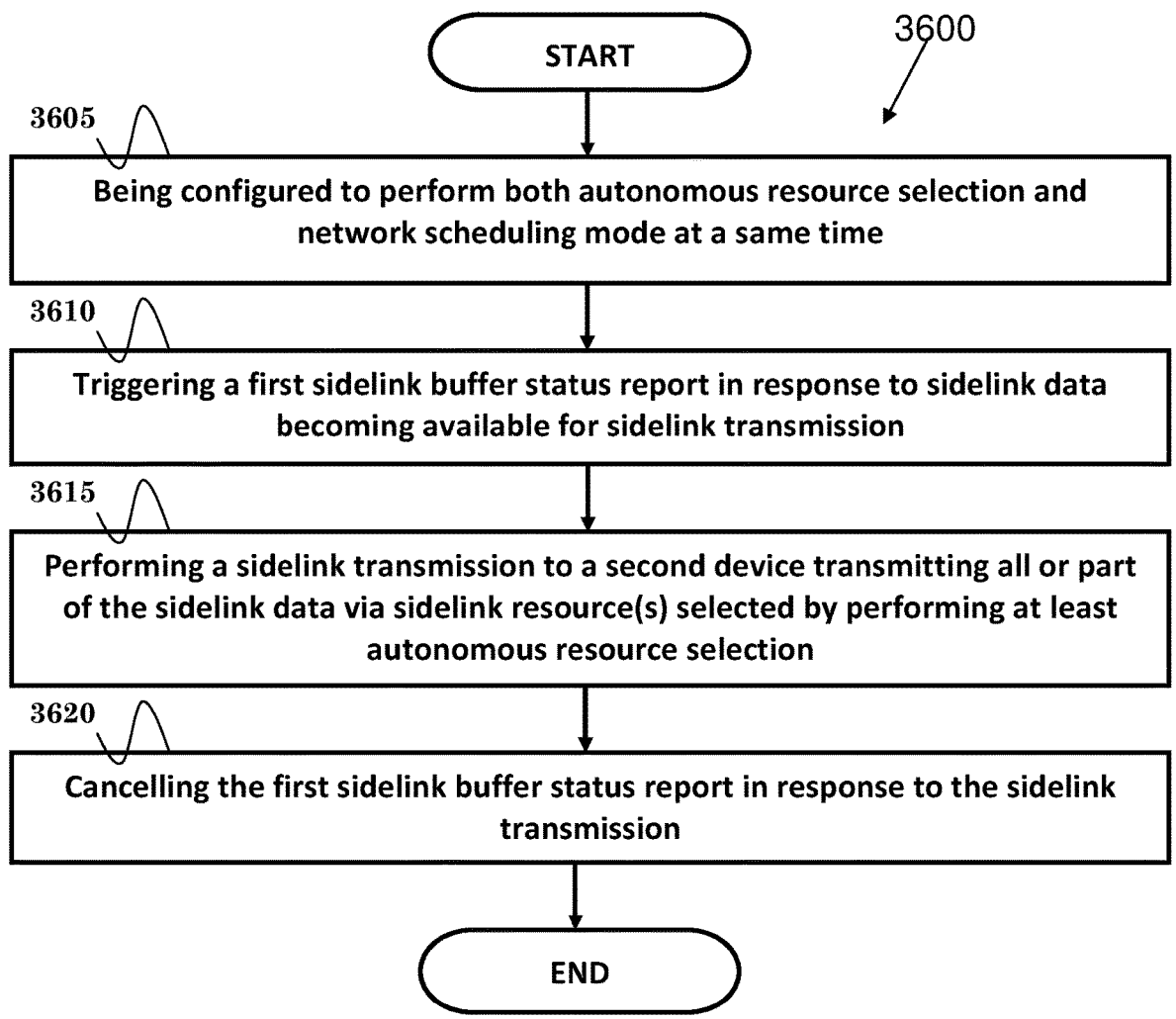
FIG. 36 is a flow chart according to one exemplary embodiment.

FIG. 36 is a flow chart 3600 according to one exemplary embodiment from the perspective of a first device performing sidelink communication. In step 3605, the first device is configured to perform both UE autonomous resource selection and network scheduling mode at a same time. In step 3610, the first device triggers a first sidelink buffer status report in response to sidelink data becoming available for sidelink transmission. In step 3615, the first device performs a sidelink transmission to a second device transmitting all or part of the sidelink data via sidelink resource(s) selected by performing at least UE autonomous resource selection. In step 3620, the first device cancels the first sidelink buffer status report in response to the sidelink transmission.

In one embodiment, the first device could cancel the first sidelink buffer status report when transmitting part (or all) of the sidelink data via sidelink resource(s) associated with UE autonomous resource selection.

Referring back to FIGS. 3 and 4, in one exemplary embodiment of a first device performing sidelink communication, the device 300 includes a program code 312 stored in the memory 310. The CPU 308 could execute program code 312 to enable the first device (i) to be configured to perform both UE autonomous resource selection and network scheduling mode at a same time, (ii) to trigger a first sidelink buffer status report in response to sidelink data becoming available for sidelink transmission, (iii) to perform a sidelink transmission to a second device transmitting all or part of the sidelink data via sidelink resource(s) selected by performing at least UE autonomous resource selection, and (iv) to cancel the first sidelink buffer status report in response to the sidelink transmission. Furthermore, the CPU 308 can execute the program code 312 to perform all of the above-described actions and steps or others described herein.

Figure 37:
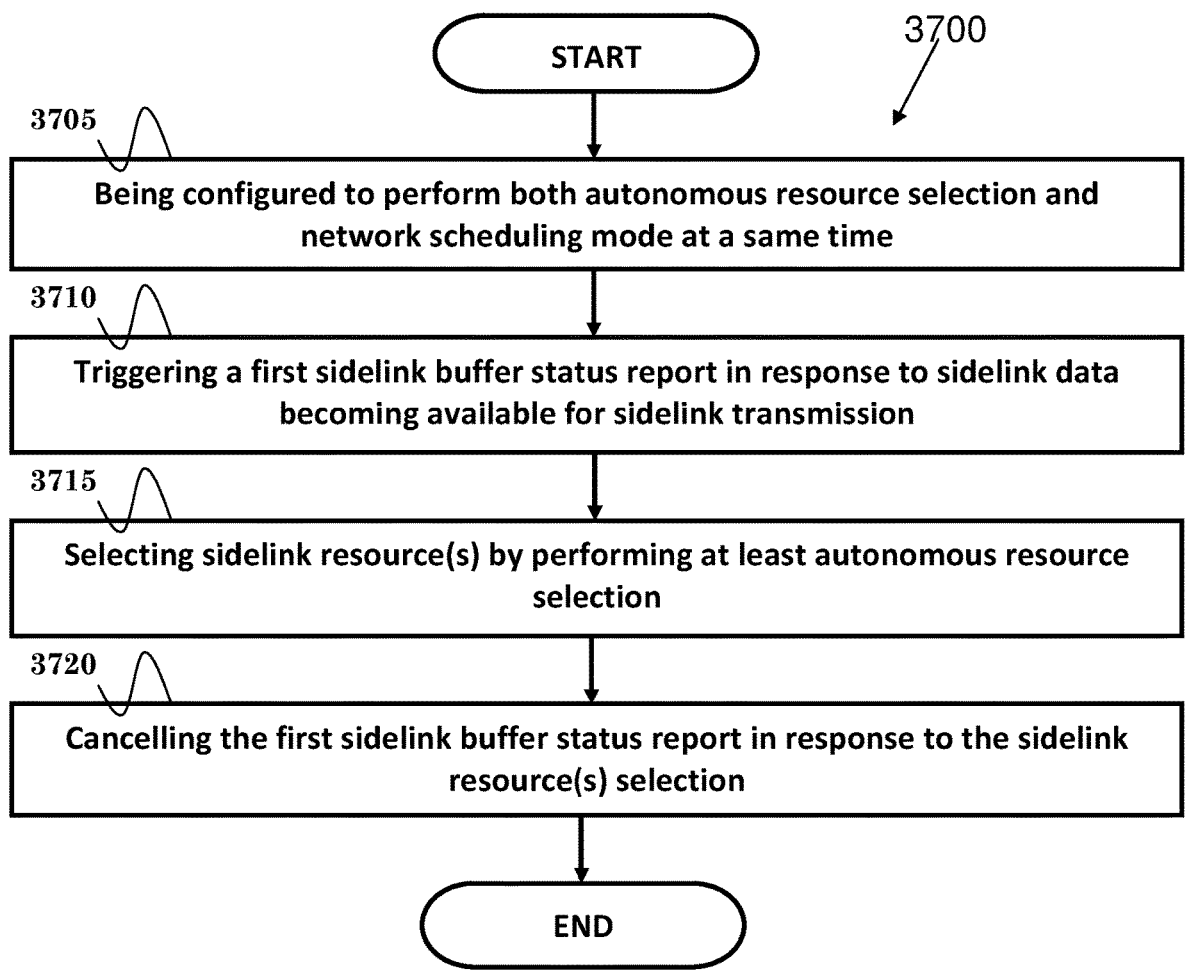
FIG. 37 is a flow chart according to one exemplary embodiment.

FIG. 37 is a flow chart 3700 according to one exemplary embodiment from the perspective of a first device performing sidelink communication. In step 3705, the first device is configured to perform both UE autonomous resource selection and network scheduling mode at a same time. In step 3710, the first device triggers a first sidelink buffer status report in response to sidelink data becoming available for sidelink transmission. In step 3715, the first device selects sidelink resource(s) by performing at least UE autonomous resource selection. In step 3720, the first device cancels the first sidelink buffer status report in response to the sidelink resource(s) selection.

In one embodiment, the first device could cancel the first sidelink buffer status report when the first device selects sidelink resource(s) that can accommodate part (or all) of the sidelink data by at least performing UE autonomous resource selection.

In one embodiment, the first device could trigger the first sidelink buffer status report in order to transmit a first buffer status report MAC control element to a base station. If the first device cancels the first sidelink buffer status report, the first device may not transmit the first sidelink buffer status report MAC control element associated with the first sidelink buffer status report to the base station.

Referring back to FIGS. 3 and 4, in one exemplary embodiment of a first device performing sidelink communication, the device 300 includes a program code 312 stored in the memory 310. The CPU 308 could execute program code 312 to enable the first device (i) to be configured to perform both UE autonomous resource selection and network scheduling mode at a same time, (ii) to trigger a first sidelink buffer status report in response to sidelink data becoming available for sidelink transmission, (iii) to select sidelink resource(s) by performing at least UE autonomous resource selection, and (iv) to cancel the first sidelink buffer status report in response to the sidelink resource(s) selection. Furthermore, the CPU 308 can execute the program code 312 to perform all of the above-described actions and steps or others described herein.

Figure 38:
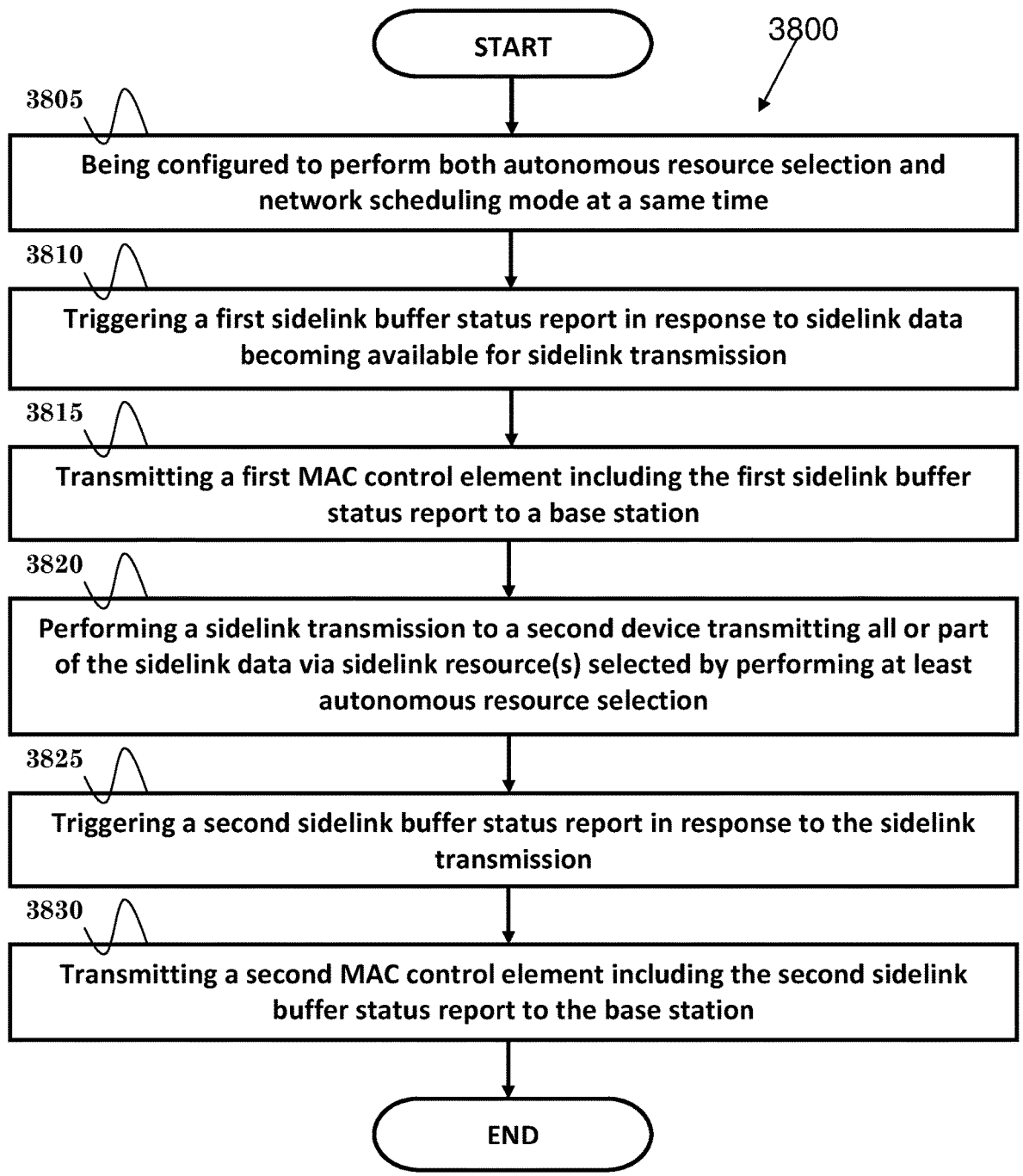
FIG. 38 is a flow chart according to one exemplary embodiment.

FIG. 38 is a flow chart 3800 according to one exemplary embodiment from the perspective of a first device performing sidelink communication. In step 3805, the first device is configured to perform both UE autonomous resource selection and network scheduling mode at a same time. In step 3810, the first device triggers a first sidelink buffer status report in response to sidelink data becoming available for sidelink transmission. In step 3815, the first device transmits a first MAC control element including the first sidelink buffer status report to a base station. In step 3820, the first device performs a sidelink transmission to a second device transmitting all or part of the sidelink data via sidelink resource(s) selected by performing at least UE autonomous resource selection. In step 3825, the first device triggers a second sidelink buffer status report in response to the sidelink transmission. In step 3830, the first device transmits a second MAC control element including the second sidelink buffer status report to the base station.

In one embodiment, the first device could trigger the second sidelink buffer status report when the first device transmits part (or all) of the sidelink data via sidelink resource(s) associated with UE autonomous resource selection.

Referring back to FIGS. 3 and 4, in one exemplary embodiment of a first device performing sidelink communication, the device 300 includes a program code 312 stored in the memory 310. The CPU 308 could execute program code 312 to enable the first device (i) to be configured to perform both UE autonomous resource selection and network scheduling mode at a same time, (ii) to trigger a first sidelink buffer status report in response to sidelink data becoming available for sidelink transmission, (iii) to transmit a first MAC control element including the first sidelink buffer status report to a base station, (iv) to perform a sidelink transmission to a second device transmitting all or part of the sidelink data via sidelink resource(s) selected by performing at least UE autonomous resource selection, (v) to trigger a second sidelink buffer status report in response to the sidelink transmission, and (vi) to transmit a second MAC control element including the second sidelink buffer status report to the base station. Furthermore, the CPU 308 can execute the program code 312 to perform all of the above-described actions and steps or others described herein.

Figure 39:
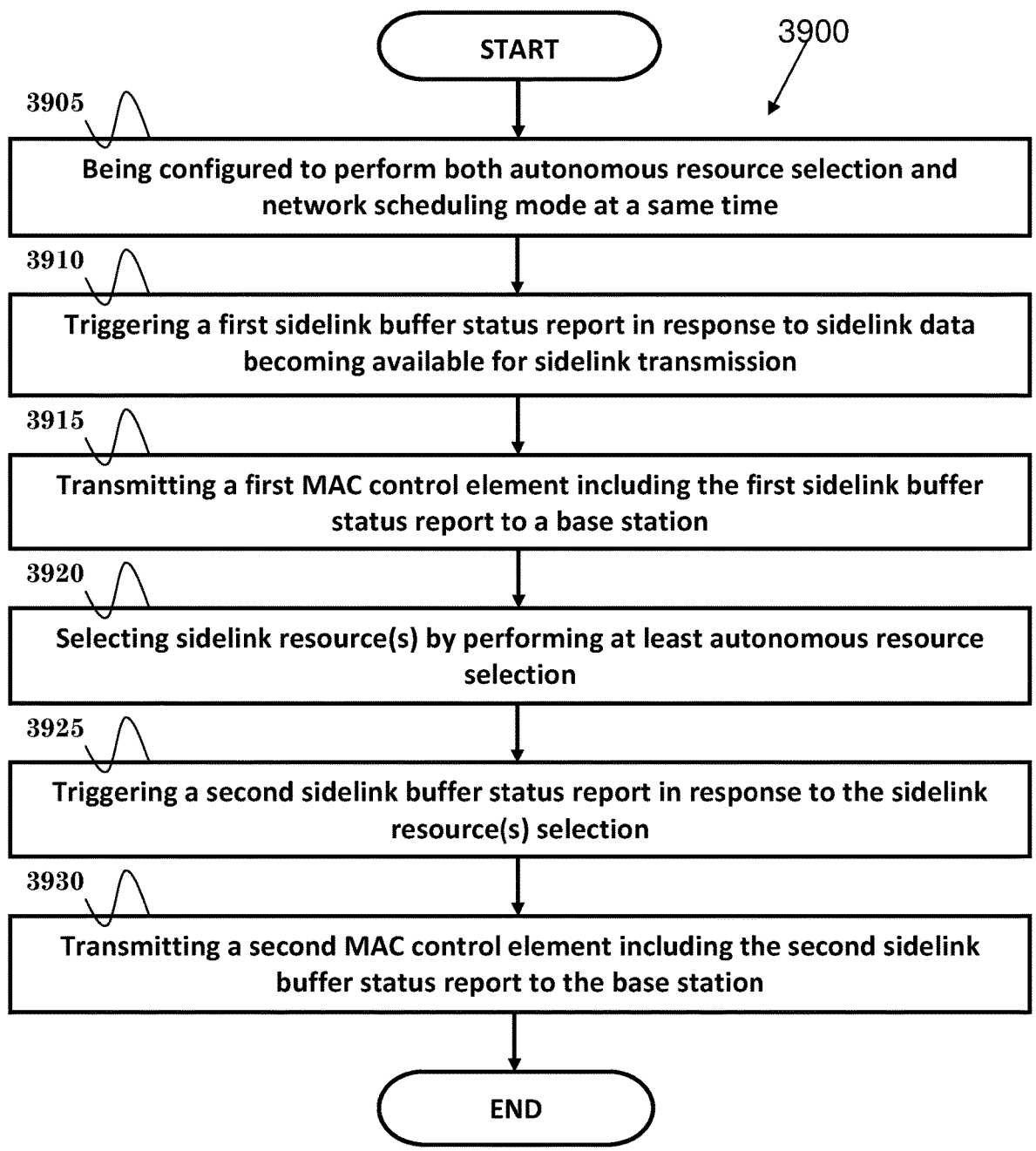
FIG. 39 is a flow chart according to one exemplary embodiment.

FIG. 39 is a flow chart 3900 according to one exemplary embodiment from the perspective of a first device performing sidelink communication. In step 3905, the first device is configured to perform both UE autonomous resource selection and network scheduling mode at a same time. In step 3910, the first device triggers a first sidelink buffer status report in response to sidelink data becoming available for sidelink transmission. In step 3915, the first device transmits a first MAC control element including the first sidelink buffer status report to a base station. In step 3920, the first device selects sidelink resource(s) by performing at least UE autonomous resource selection. In step 3925, the first device triggers a second sidelink buffer status report in response to the sidelink resource(s) selection. In step 3930, the first device transmits a second MAC control element including the second sidelink buffer status report to the base station.

In one embodiment, the first device could trigger the second sidelink buffer status report when the first device selects sidelink resource(s) that can accommodate part (or all) of the sidelink data by performing at least UE autonomous resource selection.

Referring back to FIGS. 3 and 4, in one exemplary embodiment of a UE first device performing sidelink communication, the device 300 includes a program code 312 stored in the memory 310. The CPU 308 could execute program code 312 to enable the first device (i) to be configured to perform both UE autonomous resource selection and network scheduling mode at a same time, (ii) to trigger a first sidelink buffer status report in response to sidelink data becoming available for sidelink transmission, (iii) to transmit a first MAC control element including the first sidelink buffer status report to a base station, (iv) to select sidelink resource(s) by performing at least UE autonomous resource selection, (v) to trigger a second sidelink buffer status report in response to the sidelink resource(s) selection, and (vi) to transmit a second MAC control element including the second sidelink buffer status report to the base station. Furthermore, the CPU 308 can execute the program code 312 to perform all of the above-described actions and steps or others described herein.

Figure 40:
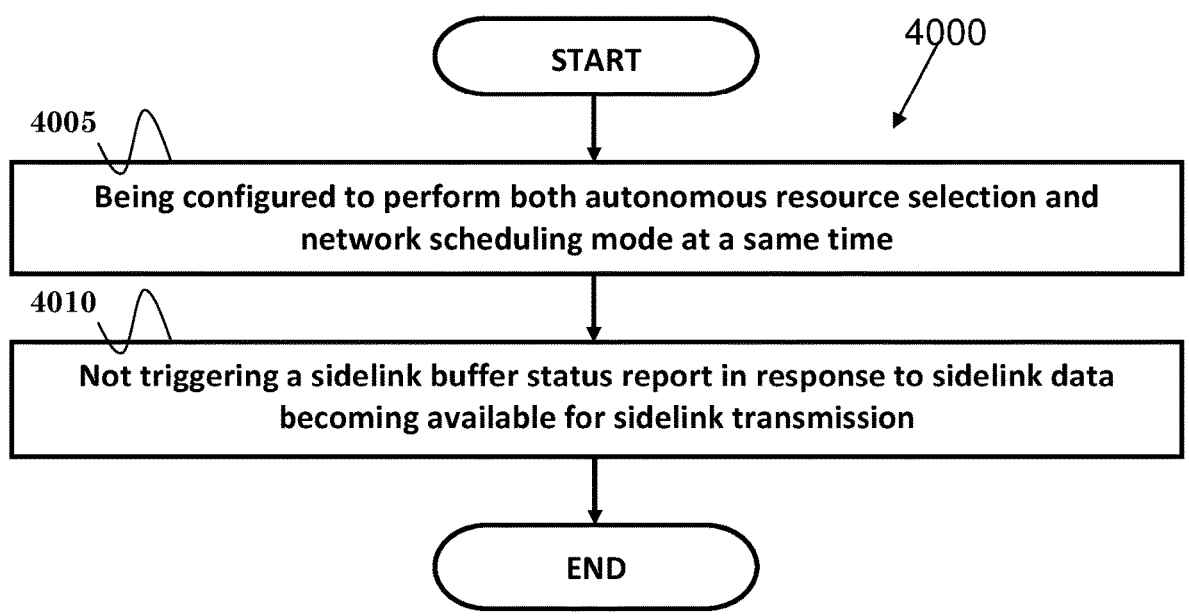
FIG. 40 is a flow chart according to one exemplary embodiment.

FIG. 40 is a flow chart 4000 according to one exemplary embodiment from the perspective of a first device performing sidelink communication. In step 4005, the first device is configured to perform both UE autonomous resource selection and network scheduling mode at a same time. In step 4010, the first device does not trigger a sidelink buffer status report in response to sidelink data becoming available for sidelink transmission.

In one embodiment, if the first device triggers a sidelink buffer status report, the first device may transmit a sidelink buffer status report MAC control element to a base station.

Referring back to FIGS. 3 and 4, in one exemplary embodiment of a first device performing sidelink communication, the device 300 includes a program code 312 stored in the memory 310. The CPU 308 could execute program code 312 to enable the first device (i) to be configured to perform both UE autonomous resource selection and network scheduling mode at a same time, and (ii) to not trigger a sidelink buffer status report in response to sidelink data becoming available for sidelink transmission. Furthermore, the CPU 308 can execute the program code 312 to perform all of the above-described actions and steps or others described herein.

Figure 41:
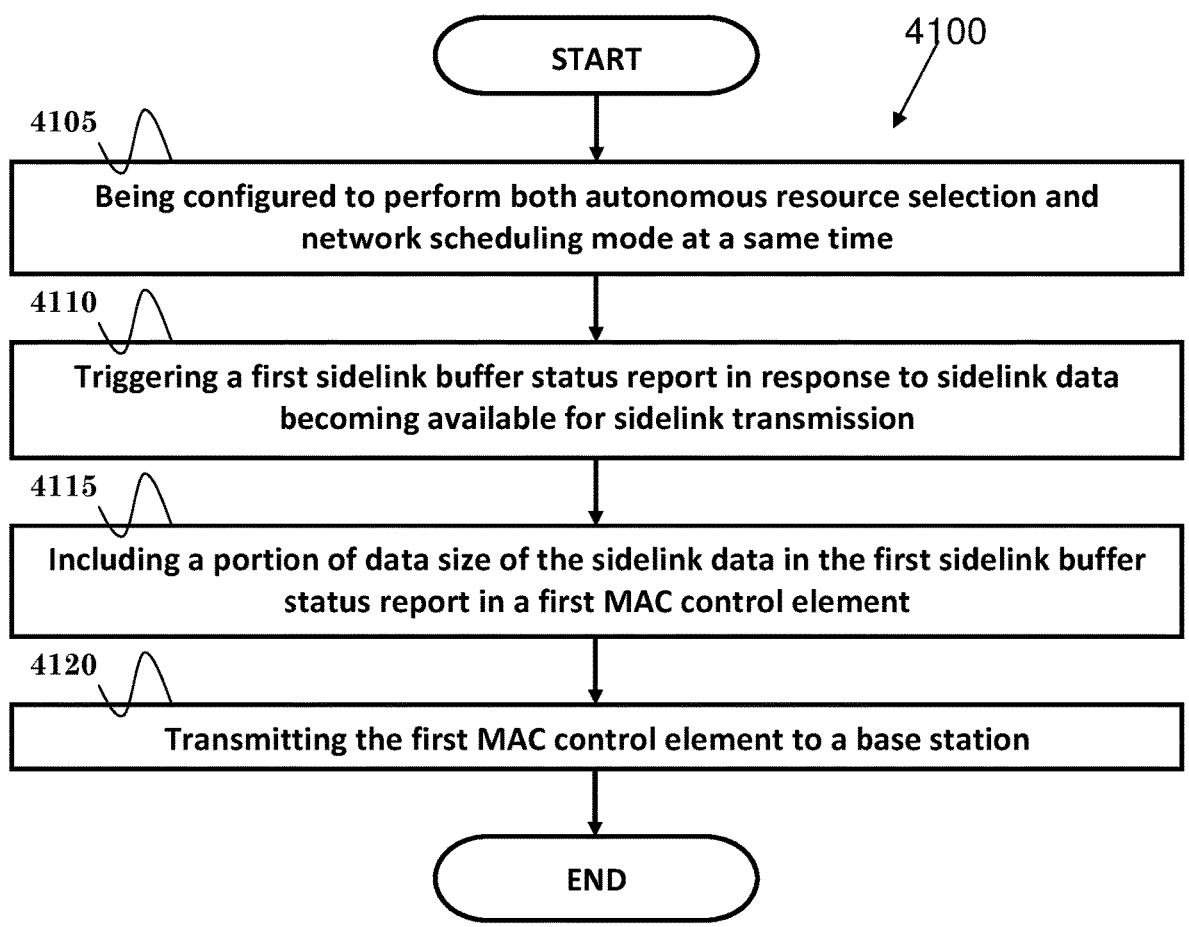
FIG. 41 is a flow chart according to one exemplary embodiment.

FIG. 41 is a flow chart 4100 according to one exemplary embodiment from the perspective of a first device performing sidelink communication. In step 4105, the first device is configured to perform both UE autonomous resource selection and network scheduling mode at a same time. In step 4110, the first device triggers a first sidelink buffer status report in response to sidelink data becoming available for sidelink transmission. In step 4115, the first device includes a portion of data size of the sidelink data in the first sidelink buffer status report in a first MAC control element. In step 4120, the first device transmits the first MAC control element to a base station.

In one embodiment, the portion of data size of the sidelink data could be a value smaller than or equal to the total size value of sidelink data available for sidelink transmission.

Referring back to FIGS. 3 and 4, in one exemplary embodiment of a first device performing sidelink communication, the device 300 includes a program code 312 stored in the memory 310. The CPU 308 could execute program code 312 to enable the first device (i) to be configured to perform both UE autonomous resource selection and network scheduling mode at a same time, (ii) to trigger a first sidelink buffer status report in response to sidelink data becoming available for sidelink transmission, (iii) to include a portion of data size of the sidelink data in the first sidelink buffer status report in a first MAC control element, and (iv) to transmit the first MAC control element to a base station. Furthermore, the CPU 308 can execute the program code 312 to perform all of the above-described actions and steps or others described herein.

Figure 42:
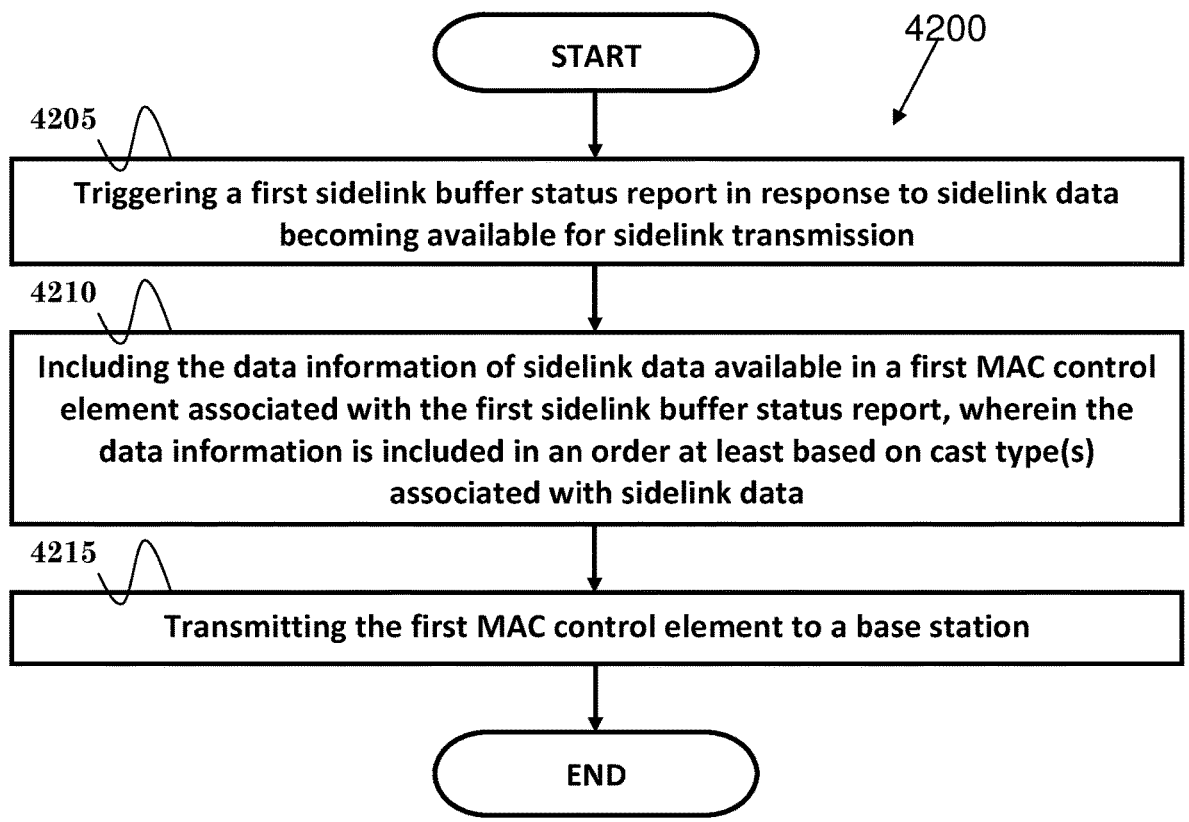
FIG. 42 is a flow chart according to one exemplary embodiment.

FIG. 42 is a flow chart 4200 according to one exemplary embodiment from the perspective of a first device performing sidelink communication. In step 4205, the first device triggers a first sidelink buffer status report in response to sidelink data becoming available for sidelink transmission. In step 4210, the first device includes the data information of sidelink data available in a first MAC control element associated with the first sidelink buffer status report, wherein the data information is included in an order at least based on cast type(s) associated with sidelink data. In step 4215, the first device transmits the first MAC control element to a base station.

Referring back to FIGS. 3 and 4, in one exemplary embodiment of a first device performing sidelink communication, the device 300 includes a program code 312 stored in the memory 310. The CPU 308 could execute program code 312 to enable the first device (i) to trigger a first sidelink buffer status report in response to sidelink data becoming available for sidelink transmission, (ii) to include the data information of sidelink data available in a first MAC control element associated with the first sidelink buffer status report, wherein the data information is included in an order at least based on cast type(s) associated with sidelink data, and (iii) to transmit the first MAC control element to a base station. Furthermore, the CPU 308 can execute the program code 312 to perform all of the above-described actions and steps or others described herein.

Figure 43:
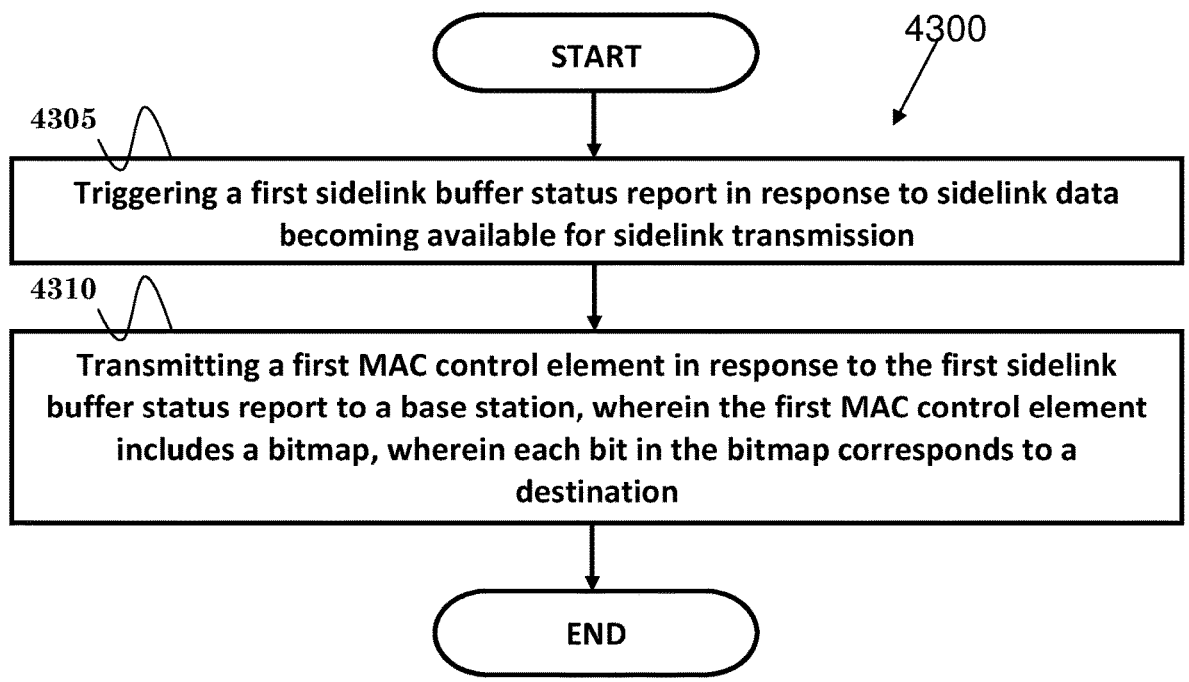
FIG. 43 is a flow chart according to one exemplary embodiment.

FIG. 43 is a flow chart 4300 according to one exemplary embodiment from the perspective of a first device performing sidelink communication. In step 4305, the first device triggers a first sidelink buffer status report in response to sidelink data becoming available for sidelink transmission. In step 4310, the first device transmits a first MAC control element in response to the first sidelink buffer status report to a base station, wherein the first MAC control element includes a bitmap, wherein each bit in the bitmap corresponds to a destination. In one embodiment, each bit in the bitmap indicates whether there is available sidelink data associated with the corresponding destination for the first device.

Referring back to FIGS. 3 and 4, in one exemplary embodiment of a first device performing sidelink communication, the device 300 includes a program code 312 stored in the memory 310. The CPU 308 could execute program code 312 to enable the first device (i) to trigger a first sidelink buffer status report in response to sidelink data becoming available for sidelink transmission, and (ii) to transmit a first MAC control element in response to the first sidelink buffer status report to a base station, wherein the first MAC control element includes a bitmap, wherein each bit in the bitmap corresponds to a destination. Furthermore, the CPU 308 can execute the program code 312 to perform all of the above-described actions and steps or others described herein.

Figure 44:
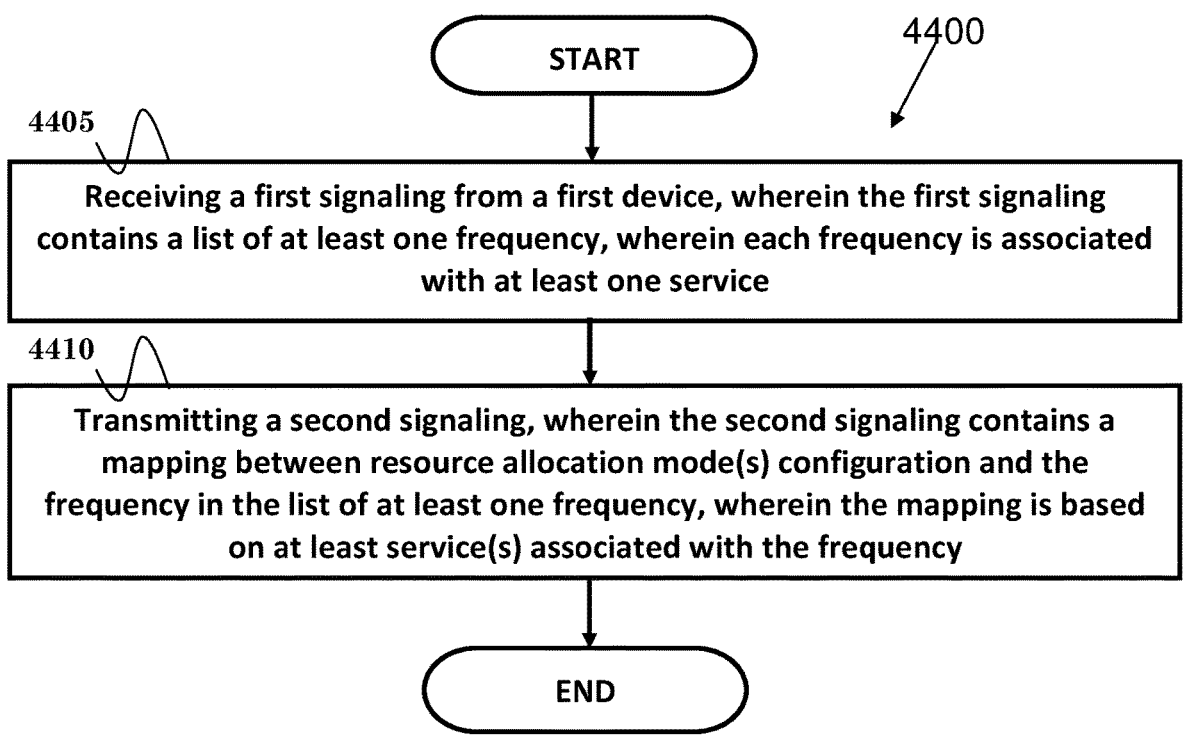
FIG. 44 is a flow chart according to one exemplary embodiment.

FIG. 44 is a flow chart 4400 according to one exemplary embodiment from the perspective of a base station. In step 4405, the base station receives a first signaling from a first device, wherein the first signaling contains a list of at least one frequency, wherein each frequency is associated with at least one service. In step 4410, the base station transmits a second signaling, wherein the second signaling contains a mapping between resource allocation mode(s) configuration and the frequency(s) in the list of at least one frequency, wherein the mapping is based on at least service(s) associated with the frequency(s).

In one embodiment, the base station may not configure different resource allocation mode(s) for different frequencies that are associated with at least one same service. Furthermore, the base station could configure different resource allocation mode(s) for different frequencies with no overlapped associated service(s).

Referring back to FIGS. 3 and 4, in one exemplary embodiment of a base station, the device 300 includes a program code 312 stored in the memory 310. The CPU 308 could execute program code 312 to enable the base station (i) to receive a first signaling from a first device, wherein the first signaling contains a list of at least one frequency, wherein each frequency is associated with at least one service, and (ii) to transmit a second signaling, wherein the second signaling contains a mapping between resource allocation mode(s) configuration and the frequency(s) in the list of at least one frequency, wherein the mapping is based on at least service(s) associated with the frequency(s). Furthermore, the CPU 308 can execute the program code 312 to perform all of the above-described actions and steps or others described herein.

In the context of the embodiments illustrated in FIGS. 36-44 and described in the text above, in one embodiment, the first MAC control element could be a sidelink buffer status report MAC control element. The sidelink data can be transmitted via resource(s) associated with network scheduling mode or via resource(s) associated with UE autonomous resource selection mode.

In one embodiment, the network scheduling mode could be Mode 1. The UE autonomous resource selection mode could be Mode 2. The base station could schedule sidelink resource(s) to be used by the first device for sidelink transmission(s) in the network scheduling mode. The first device could determine sidelink transmission resource(s) within sidelink resources configured by a base station or network or pre-configured sidelink resources in UE autonomous resource selection mode. The resource allocation mode could be network scheduling mode or UE autonomous resource selection mode.

In one embodiment, the cast type(s) could be any of unicast, broadcast, or groupcast. The service could be V2X service. The destination could be a ProSe destination.

In one embodiment, the data information could include buffer size of the sidelink data, associated destination identity(s) of the sidelink data, and/or associated logical channel group of the sidelink data.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclo-

The invention claimed is:

1. A method of a UE (User Equipment), comprising:
    transmitting a QoS profile for a sidelink QoS flow and a destination identity of a destination associated with the QoS profile to a base station;
    receiving a configuration of mapping between the sidelink QoS flow and a Sidelink Radio Bearer (SLRB) from the base station;
    receiving a first signaling for configuring mapping between resource allocation mode(s) and attribute(s) of sidelink data of the UE from the base station, wherein the mapping between the resource allocation mode(s) and the attribute(s) of the sidelink data comprises a mapping of a logical channel group (LCG) identity (ID) associated with the SLRB and the resource allocation mode(s) for the destination; and
    performing a sidelink transmission of the sidelink data to the destination based on the mapping between the resource allocation mode(s) and the attribute(s) of the sidelink data, wherein the resource allocation mode(s) includes at least one of network scheduling mode or UE autonomous resource selection mode.

2. The method of claim 1, wherein the UE determines to use the network scheduling mode to transmit the sidelink data if the attribute(s) of the sidelink data is associated with the network scheduling mode indicated in the first signaling.

3. The method of claim 1, wherein the UE determines to use the UE autonomous resource selection mode to transmit the sidelink data if the attribute(s) of the sidelink data is associated with the UE autonomous resource selection mode indicated in the first signaling.

4. The method of claim 1, wherein the UE transmits a sidelink information of the UE to the base station, wherein the sidelink information of the UE contains desired resource allocation mode(s) for at least the destination identity.

5. The method of claim 1, wherein the UE includes buffer status associated with the sidelink data in a sidelink buffer status report (SL BSR) for which the attribute(s) of the sidelink data is associated with network scheduling mode.

6. The method of claim 1, wherein the UE does not include buffer status associated with the sidelink data in a sidelink buffer status report (SL BSR) for which the attribute(s) of the sidelink data is associated with UE autonomous resource selection mode.

7. The method of claim 1, wherein the mapping between the resource allocation mode(s) and the attribute(s) of the sidelink data comprises a mapping of a Sidelink Logical channel ID associated with the sidelink data and the resource allocation mode(s).

8. The method of claim 1, wherein the mapping between the resource allocation mode(s) and the attribute(s) of the sidelink data comprises a mapping of the SLRB and the resource allocation mode(s).

9. A method of a network node, comprising:
    receiving a QoS profile for a sidelink QoS flow and a destination identity of a destination associated with the QoS profile from a UE (User Equipment);
    generating a configuration of mapping between the sidelink QoS flow and a Sidelink Radio Bearer (SLRB) based on the QoS profile received from the UE;
    transmitting the configuration of mapping between the sidelink QoS flow and the SLRB to the UE;
    transmitting a first signaling to the UE, wherein the first signaling is for configuring mapping between resource allocation mode(s) and attribute(s) of sidelink data of the UE,
    wherein the mapping between the resource allocation mode(s) and the attribute(s) of the sidelink data comprises a mapping of a logical channel group (LCG) identity (ID) associated with the SLRB and the resource allocation mode(s) for the destination, and
    wherein the resource allocation mode(s) includes at least one of network scheduling mode or UE autonomous resource selection mode.

10. The method of claim 9, wherein the network node receives a sidelink information of the UE from the UE, wherein the sidelink information of the UE contains desired resource allocation mode(s) for at least the destination identity.

11. The method of claim 10, wherein the network node configures the UE with the first signaling based on the sidelink information of the UE.

12. The method of claim 9, wherein the network node is a base station.

13. The method of claim 9, wherein the attribute(s) of the sidelink data is associated with the network scheduling mode and the UE autonomous resource selection mode indicated in the first signaling.

14. The method of claim 9, wherein the mapping between the resource allocation mode(s) and the attribute(s) of the sidelink data comprises a mapping of a Sidelink Logical channel ID associated with the sidelink data and the resource allocation mode(s).

15. The method of claim 9, wherein the mapping between the resource allocation mode(s) and the attribute(s) of the sidelink data comprises a mapping of the SLRB and the resource allocation mode(s).

* * * * *